US012252573B2

United States Patent
Koenigs et al.

(10) Patent No.: US 12,252,573 B2
(45) Date of Patent: Mar. 18, 2025

(54) HETEROCYCLE-HETEROCYCLE-BASED GROUP IV TRANSITION METAL CATALYSTS FOR OLEFIN POLYMERIZATION

(71) Applicant: Dow Global Technologies LLC, Midland, MI (US)

(72) Inventors: David Koenigs, Richwood, TX (US); David D. Devore, Midland, MI (US); Brad C. Bailey, Midland, MI (US); Endre Szuromi, Richwood, TX (US); Robert D. Grigg, Midland, MI (US); David M. Pearson, Lake Jackson, TX (US); Nolan T. McDougal, Houston, TX (US); John B. Etienne, Mt. Pleasant, MI (US); Sukrit Mukhopadhyay, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 933 days.

(21) Appl. No.: 17/415,365

(22) PCT Filed: Dec. 20, 2019

(86) PCT No.: PCT/US2019/067813
§ 371 (c)(1),
(2) Date: Jun. 17, 2021

(87) PCT Pub. No.: WO2020/132422
PCT Pub. Date: Jun. 25, 2020

(65) Prior Publication Data
US 2022/0056164 A1 Feb. 24, 2022

Related U.S. Application Data

(60) Provisional application No. 62/783,515, filed on Dec. 21, 2018.

(51) Int. Cl.
C08F 4/64 (2006.01)
C07F 7/00 (2006.01)
C07F 9/572 (2006.01)
C08F 4/659 (2006.01)
C08F 210/16 (2006.01)

(52) U.S. Cl.
CPC ............ C08F 4/65908 (2013.01); C07F 7/00 (2013.01); C07F 9/5728 (2013.01); C08F 4/64044 (2013.01); C08F 210/16 (2013.01)

(58) Field of Classification Search
CPC ...... C08F 4/64044; C08F 210/16; C07F 7/00; C07F 9/572
See application file for complete search history.

(56) References Cited

FOREIGN PATENT DOCUMENTS

| CN | 101575387 A | 11/2009 |
|---|---|---|
| JP | 2012072365 A | 4/2012 |
| JP | 2013166875 A | 8/2013 |

OTHER PUBLICATIONS

International Search Report and Written Opinion pertaining to PCT/US2019/067813, dated Apr. 28, 2020.
Calhorda et al., "Bis(q-cyclopentadieny1)-molybdenum (and -tungsten or -titanium) Complexes with Chelate midazole Derivatives and Related Ligands", J.Chem. Soc., Dalton Trans., 1980, 1443-1447.
Cho et al., "Polymerization of Methyl Acrylate by a 2,6-Bis (2-benzimidazyl)pyridine Zirconium Dichloride/MAO Catalyst System", Macrmol. Chem. Phys., 2006, 207, 1965-1971.
Aharonovich et al., "Chemoselectivity Diversity in the Reaction of LiNC6F5SiMe3 with Nitriles and the Synthesis, Structure, and Reactivity of Zirconium Mono- and Tris[2-(2-pyridyl)tetrafluorobenzimidazolate] Complexes", Inorg. Chem., 2010, 49, 9217-9229.
Zhao et al., "Titanium and zirconium amido complexes supported by imidazole-containing ligands: syntheses, characterization and catalytic activities", RSC Adv., 2012, 2, 144-150.
Li et al., "NMR Spectroscopy and X-Ray Characterisation of Cationic N-Heteroaryl-Pyridylamido ZrIV Complexes: A Further Level of Complexity for the Elusive Active Species of Pyridylamido Olefin Polymerisation Catalysts", Chem. Eur. J., 2014, 20, 232-244.
Li et al., "Isospecific polymerization of propene by new indolylpyridylamido Zr(IV) catalysts", J. Mol. Cata., 2013, 370, 28-34.
Communication Pursuant to Article 94(3) EPC dated Feb. 28, 2024, pertaining to EP Patent Application No. 19 842 503.5, 6 pgs.
Chinese Office Action dated Oct. 31, 2023, pertaining to CN Patent Application No. 201980087535.8, 16 pgs.
Japanese Office Action dated Nov. 21, 2023, pertaining to JP Patent Application No. 2021-534190, 16 pgs.
Chinese Office Action dated Dec. 19, 2022, pertaining to Chinese Patent Application No. 201980087535.8 9 pages.
Chinese Search Report dated Dec. 19, 2022, pertaining to Chinese Patent Application No. 201980087535.8 4 pages.
Glagab, Hamdi Ali "Zr(IV) complexes of some heterocyclic ligands: synthesis, characterization, and ethylene polymerization activity" Turkish Journal of Chemistry, vol. 40, No. 5, Jan. 1, 2016 pp. 1-21.
Communication pursuant to Article 94(3) EPC, dated Feb. 16, 2023, pertaining to EP patent application No. 19842503 5 pages.
Chinese Office Action and Search Report, dated May 30, 2023, pertaining to Chinese Patent Application No. 201980087535.8 12 pages.
Chinese Office Action dated Sep. 23, 2024, pertaining to CN Patent Application No. 201980087535.8, 7 pgs.

Primary Examiner — Caixia Lu
(74) Attorney, Agent, or Firm — Dinsmore & Shohl LLP

(57) ABSTRACT

The polymerization process of this disclosure includes includes polymerizing ethylene and one or more olefins in the presence of a catalyst system under olefin polymerization conditions to form an ethylene-based polymer. The catalyst system comprising a metal-ligand complex according to formula (I).

13 Claims, No Drawings

HETEROCYCLE-HETEROCYCLE-BASED GROUP IV TRANSITION METAL CATALYSTS FOR OLEFIN POLYMERIZATION

CROSS-REFERENCE TO RELATED APPLICATIONS

This application is a National Stage Entry under 35 U.S.C. § 371 of International Patent Application No. PCT/US2019/067813, filed Dec. 20, 2019, which claims priority to U.S. Provisional Patent Application No. 62/783,515, filed on Dec. 21, 2018, the entire disclosures of which are hereby incorporated by reference.

TECHNICAL FIELD

Embodiments of the present disclosure generally relate to olefin polymerization catalyst systems and processes and, more specifically the catalyst systems include heterocycle-based group IV transition metal catalysts for olefin polymerization.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutene. Hydrogen may also be added to the reactor. The catalyst systems for producing ethylene-based may typically comprise a chromium-based catalyst system, a Ziegler-Natta catalyst system, and/or a molecular (either metallocene or non-metallocene) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

There is an ongoing need to create catalyst systems or procatalysts highly selective toward the α-olefin during ethylene and α-olefin copolymerization reactions. Additionally, the catalyst system should have high efficiency, high reactivity, and a versatile ability to produce polymers with a high or low molecular weight at high temperature (such as greater than 140° C. or approximately 190° C.).

According to some embodiments, a polymerization process includes polymerizing ethylene and one or more olefins in the presence of a catalyst system under olefin polymerization conditions to form an ethylene-based polymer. In one or more embodiments, the catalyst system includes a metal-ligand complex according to formula (I):

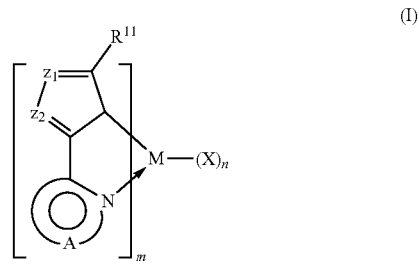

In formula (I), M is a metal chosen from titanium, zirconium, or hafnium, the metal having a formal oxidation state of +2, +3, or +4; each X is a monodentate or bidentate ligand independently chosen from unsaturated ($C_2$-$C_{20}$)hydrocarbyl, unsaturated ($C_2$-$C_{50}$)heterohydrocarbyl, ($C_1$-$C_{50}$) hydrocarbyl, ($C_6$-$C_{50}$)aryl, ($C_6$-$C_{50}$)heteroaryl, cyclopentadienyl, substituted cyclopentadienyl, ($C_4$-$C_{12}$)dienyl, halide, —N($R^N$)$_2$, and —NCOR$^C$. Subscript n is 2 and subscript m is 2 or subscript n is 3, and subscript m is 1.

In formula (I), each A is independently chosen from —C($R^{3a}$)C($R^{4a}$)C($R^{5a}$)C($R^{6a}$)—, —C($R^{3a}$)C($R^{4a}$)C($R^{5a}$)N—, —C($R^{3a}$)C($R^{4a}$)NC($R^{6a}$)—, —C($R^{3a}$)NC($R^{5a}$)C($R^{6a}$)—, —NC($R^{4a}$)NC($R^{6a}$)— or —NC($R^{4a}$)C($R^{5a}$)C($R^{6a}$)—, in which optionally $R^{3a}$ and $R^{4a}$, or $R^{4a}$ and $R^{5a}$, or $R^{5a}$ and $R^{6a}$ may be covalently connected to form an aromatic ring or a non-aromatic ring. In some embodiments of formula (I), —C($R^{3b}$)C($R^{4b}$)G- or -GC($R^{4c}$)C($R^{5c}$)—, wherein G may be N($R^{3c}$), N($R^{5b}$), O or S, and optionally $R^{3b}$ and $R^{4b}$, or $R^{4c}$ and $R^{5c}$ may be covalently connected to form an aromatic ring or a non-aromatic ring. In formula (I), each $z_1$ is independently selected from N or C($R^1$), and $R^1$ and $R^{11}$ may not be covalently connected to form an aromatic ring or a non-aromatic ring; each $z_2$ is independently selected from N or C($R^2$), and $R^1$ and $R^2$ may be covalently connected to form an aromatic ring or a non-aromatic ring.

In formula (I), each $R^{11}$, $R^1$, $R^2$, $R^{3a}$, $R^{3b}$, $R^{3c}$, $R^{4a}$, $R^{4b}$, $R^{4c}$, $R^{5a}$, $R^{5c}$, and $R^{6a}$ is independently selected from the group consisting of ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, —P(O)($R^P$)$_2$, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen, and —H, wherein each $R^N$, $R^C$, and $R^P$ is independently selected from the group consisting of ($C_1$-$C_{20}$)hydrocarbyl, ($C_1$-$C_{20}$)heterohydrocarbyl, and —H. When $z_1$ is CR$^1$ and $z_2$ is CR$^2$, and R$^1$ and R$^2$ are not covalently connected to form an aromatic ring or a non-aromatic ring, m is 1 and n is 3.

DETAILED DESCRIPTION

Specific embodiments of catalyst systems will now be described. It should be understood that the catalyst systems of this disclosure may be embodied in different forms and should not be construed as limited to the specific embodiments set forth in this disclosure.

Common abbreviations are listed below:

Me: methyl; Et: ethyl; Ph: phenyl; Bn: benzyl; t-Bu: tert-butyl; AcOH: acetic acid; EtOAc: ethyl acetate; $NH_4OAc$: ammonium acetate; MMAO: modified methylaluminoxane; GC: gas chromatography; LC: liquid chromatography; NMR: nuclear magnetic resonance; MS: mass spectrometry; mmol: millimoles; mL: milliliters; M: molar; min: minutes; h: hours; d: days; DEZ: diethylzinc; $M_n$: number average molecular weight; $M_w$: weight average molecular weight; PDI: polydispersity index.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.) A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active species. As used herein, the terms "cocatalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl ($—C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl. Examples of $(C_1-C_{10})$alkyl include all isomers of butyl, pentyl, hexyl, heptyl, nonyl, and decyl.

The term "$(C_6-C_{50})$aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{15})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl include: substituted $(C_1-C_{20})$aryl; substituted $(C_6-C_{18})$aryl; 2,4-bis($[C_{20}]$alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl.

Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$CH$_2$—), 2-methylpropan-1,3-diyl (i.e. —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$)—, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis (methylene)bicyclo [2.2.2]octane.

The term "$(C_3-C_{50})$cycloalkylene" means a cyclic diradical (i.e., the radicals are on ring atoms) of from 3 to 50 carbon atoms that either is unsubstituted or is substituted by one or more $R^S$.

The term "heteroatom," refers to an atom other than hydrogen or carbon. Examples of groups containing one or more than one heteroatom include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si($R^C$)$_2$—, $(C_1-C_{50})$hydrocarbyl-N($R^N$)—, $(C_1-C_{50})$hydrocarbyl-P($R^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring monocyclic heteroaromatic hydrocarbon radical has 5 minus h carbon atoms, where h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring monocyclic heteroaromatic hydrocarbon radical has 6 minus h carbon atoms, where h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radical containing one to fifty carbon atoms and one or more heteroatom. The term "$(C_1$-

$C_{50}$)heteroalkylene" means a saturated straight or branched chain diradical containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F⁻), chloride (Cl⁻), bromide (Br⁻), or iodide (I⁻).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

Embodiments of this disclosure include methods for polymerizing ethylene and one or more olefins in the presence of a catalyst system under olefin polymerizing conditions to form an ethylene-based polymer. In one or more embodiments, the catalyst system includes a metal-ligand complex according to formula (I):

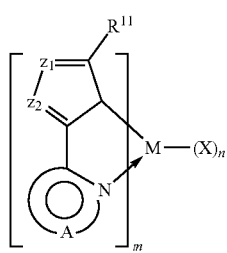

(I)

In formula (I), M is a metal chosen from titanium, zirconium, or hafnium, the metal having a formal oxidation state of +2, +3, or +4; each X is a monodentate or bidentate ligand independently chosen from unsaturated $(C_2-C_{20})$hydrocarbyl, unsaturated $(C_2-C_{50})$heterohydrocarbyl, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$dienyl, halide, —$N(R^N)_2$, and —$NCOR^C$. Subscript n is 2 and subscript m is 2 or subscript n is 3 and subscript m is 1.

In formula (I), each A is independently chosen from —$C(R^{3a})C(R^{4a})C(R^{5a})C(R^{6a})$—, —$C(R^{3a})C(R^{4a})C(R^{5a})N$—, —$C(R^{3a})C(R^{4a})NC(R^{6a})$—, —$C(R^{3a})NC(R^{5a})C(R^{6a})$—, —$NC(R^{4a})NC(R^{6a})$— or —$NC(R^{4a})C(R^{5a})C(R^{6a})$—, in which optionally $R^{3a}$ and $R^{4a}$, or $R^{4a}$ and $R^{5a}$, or $R^{5a}$ and $R^{6a}$ may be covalently connected to form an aromatic ring or a non-aromatic ring. In some embodiments of formula (I), —$C(R^{3b})C(R^{4b})G$- or -$GC(R^{4c})C(R^{5c})$—, wherein G may be $N(R^{3c})$, $N(R^{5b})$, O or S, and optionally $R^{3b}$ and $R^{4b}$, or $R^{4c}$ and $R^{5c}$ may be covalently connected to form an aromatic ring or a non-aromatic ring. In formula (I), each $z_1$ is independently selected from N or $C(R^1)$, and $R^1$ and $R^{11}$ may not be covalently connected to form an aromatic ring or a non-aromatic ring; each $z_2$ is independently selected from N or $C(R^2)$, and $R^1$ and $R^2$ may be covalently connected to form an aromatic ring or a non-aromatic ring.

In formula (I), each $R^{11}$, $R^1$, $R^2$, $R^{3a}$, $R^{3b}$, $R^{3c}$, $R^{4a}$, $R^{4b}$, $R^{4c}$, $R^{5a}$, $R^{5c}$, and $R^{6a}$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, —$Si(R^C)_3$, —$Ge(R^C)_3$, —$P(R)_2$, —$N(R^N)_2$, —$OR^C$, —$SR^C$, —$NO_2$, —CN, —$CF_3$, $R^CS(O)$—, —$P(O)(R)_2$, $R^CS(O)_2$—, $(R^C)_2C=N$—, $R^CC(O)O$—, $R^COC(O)$—, $R^CC(O)N(R)$—, $(R^C)_2NC(O)$—, halogen, and —H, wherein each $R^N$, $R^C$, and $R^P$ is independently selected from the group consisting of $(C_1-C_{20})$hydrocarbyl, $(C_1-C_{20})$heterohydrocarbyl, and —H. When $z_1$ is $CR^1$ and $z_2$ is $CR^2$, and $R^1$ and $R^2$ are not covalently connected to form an aromatic ring or a non-aromatic ring, m is 1 and n is 3.

In some embodiments, any or all of the chemical groups (e.g., X. $R^{11}$, $R^1$, $R^2$, $R^{3a}$, $R^{3b}$, $R^{4a}$, $R^{4b}$, $R^{4c}$, $R^{5a}$, $R^{5c}$, and $R^{6a}$, Y, and $z_{1-2}$) of the metal-ligand complex of formula (I) may be unsubstituted. In other embodiments, none, any, or all of the chemical groups X, $R^{11}$, $R^1$, $R^2$, $R^{3a}$, $R^{3b}$, $R^{4a}$, $R^{4b}$, $R^{4c}$, $R^{5a}$, $R^{5c}$, and $R^{6a}$, Y, and $z_{1-2}$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X, $R^{11}$, $R^1$, $R^2$, $R^{3a}$, $R^{3b}$, $R^{4a}$, $R^{4b}$, $R^{4c}$, $R^{5a}$, $R^{5c}$, and $R^{6a}$, Y, and $z_{1-2}$ may be persubstituted with $R^S$. In the chemical groups that are persubstituted with $R^S$, the individual $R^S$ may all be the same or may be independently chosen.

In formula (I), when M is Ti, each X is selected from the group consisting of unsaturated $(C_2-C_{20})$hydrocarbyl, unsaturated $(C_2-C_{50})$heterohydrocarbyl, $(C_1-C_{50})$hydrocarbyl, $(C_6-C_{50})$aryl, $(C_6-C_{50})$heteroaryl, $(C_4-C_{12})$diene, halogen, —$N(R^N)_2$, and —$NCOR^C$.

The metal-ligand complex of formula (I) does not include formula (Ia):

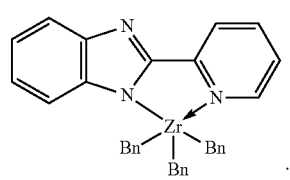

(Ia)

In some embodiments, each $R^{11}$ may be chosen from carbazol, carbazol-9-yl substituted with $R^S$ or more than one $R^S$, phenyl, phenyl substituted with $R^S$ or more than one $R^S$, anthracenyl, anthracene-9-yl substituted with $R^S$ or more than one $R^S$, naphthyl, or naphthyl substituted $R^S$ or more than one $R^S$, in which $R^S$ may be a $(C_1-C_{30})$hydrocarbyl. In one or more embodiments, $R^S$ may be chosen from $(C_1-C_{12})$ alkyl, $(C_6$-$C_{15})$aryl, or $(C_3$-$C_{12})$cycloalkyl. In various embodiments, $R^S$ may be chosen from methyl, ethyl, propyl, 2-propyl, 2-methylpropyl, n-butyl, tert-butyl (also called 1,1-dimethylethyl), pentyl, hexyl, 1-cyclohexyl, heptyl, tert-octyl (also called 1,1,3,3-tetramethylbutyl), n-octyl, or nonyl.

In other embodiment, each $R^{11}$ may be chosen from carbazol-9-yl, 3,6-di-tert-butylcarbazol-9-yl, 2,7-di-tert-butylcarbazol-9-yl, anthracene-9-yl, 2,6-anthracene-9-yl, 2,7-anthracene-9-yl, 3,5-di-tert-butylphenyl, 1,1':3',1"-terphenyl-5'-yl, or 3,3",5,5"-tetra-tert-butyl-1,1':3',1"-terphenyl-5'-yl.

In one or more embodiments, each $z_1$ is $CR^1$, and each $R^1$ may be chosen from carbazolyl, carbazol-9-yl substituted with $R^S$ or more than one $R^S$, phenyl, phenyl substituted with $R^S$ or more than one $R^S$, anthracenyl, anthracene-9-yl substituted with $R^S$ or more than one $R^S$, naphthyl, or naphthyl substituted $R^S$ or more than one $R^S$, in which $R^S$ may be a $(C_1$-$C_{30})$hydrocarbyl. In one or more embodiments, $R^S$ may be chosen from $(C_1$-$C_{12})$alkyl, $(C_6$-$C_{15})$aryl, or $(C_3$-$C_{12})$cycloalkyl. In various embodiments, $R^S$ may be chosen from methyl, ethyl, propyl, 2-propyl, 2-methylpropyl, n-butyl, tert-butyl (also called 1,1-dimethylethyl), pentyl, hexyl, 1-cyclohexyl, heptyl, tert-octyl (also called 1,1,3,3-tetramethylbutyl), n-octyl, or nonyl.

In various embodiments, each $z_2$ is $CR^2$, and each $R^2$ may be chosen from carbazolyl, carbazol-9-yl substituted with $R^S$ or more than one $R^S$, phenyl, phenyl substituted with $R^S$ or more than one $R^S$, anthracenyl, anthracene-9-yl substituted with $R^S$ or more than one $R^S$, naphthyl, or naphthyl substituted $R^S$ or more than one $R^S$, in which $R^S$ may be a $(C_1$-$C_{30})$hydrocarbyl. In one or more embodiments, $R^S$ may be chosen from $(C_1$-$C_{12})$alkyl, $(C_6$-$C_{15})$aryl, or $(C_3$-$C_{12})$cycloalkyl. In various embodiments, $R^S$ may be chosen from methyl, ethyl, propyl, 2-propyl, 2-methylpropyl, n-butyl, tert-butyl (also called 1,1-dimethylethyl), pentyl, hexyl, 1-cyclohexyl, heptyl, tert-octyl (also called 1,1,3,3-tetramethylbutyl), n-octyl, or nonyl.

In some embodiments, each $z_1$ is $CR^1$ and each $z_2$ in N. In other embodiments, each $z_1$ is N and each $z_2$ in $CR^2$. In one or more embodiments, each $z_1$ $CR^1$ and each $z_2$ is $CR^2$.

In various embodiments of formula (I), A is —$C(R^{3a})C(R^{4a})C(R^{5a})C(R^{6a})$—, and the metal-ligand catalyst has a structure according to formula (II):

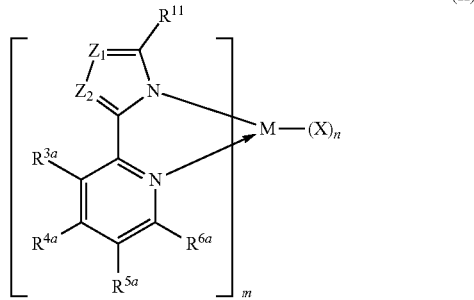

(II)

In formula (II), each $R^{3a}$ and $R^{4a}$, or $R^{4a}$ and $R^{5a}$, or $R^{5a}$ and $R^{6a}$ may be covalently connected to form an aromatic ring or a non-aromatic ring. Additionally, each $z_1$, $z_2$, $R^{11}$, $R^{3a}$, $R^{4a}$, $R^{5a}$, $R^{6a}$, X, n, m, and M are defined as in formula (I).

In one or more embodiments of formula (I), each A is -$GC(R^{4c})C(R^{5c})$— and each G is $N(R^{3c})$, and the metal-ligand catalyst has a structure according to formula (III):

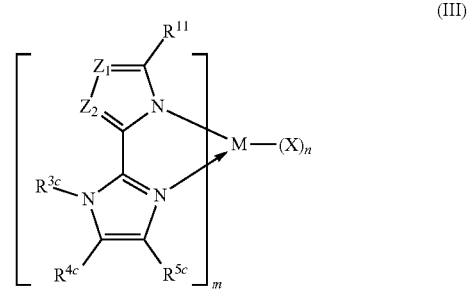

(III)

In formula (III), optionally $R^{4c}$ and $R^{5c}$ may be covalently connected to form an aromatic ring or a non-aromatic ring and each $z_1$, $z_2$, $R^{11}$, $R^{3c}$, $R^{4c}$, $R^{5c}$, X, n, m, and M are defined as in formula (I).

In some embodiments of formula (I), each A is —$C(R^{3b})C(R^{4b})$G- in which G is $N(R^{5b})$, and the metal-ligand catalyst has a structure according to formula (IV):

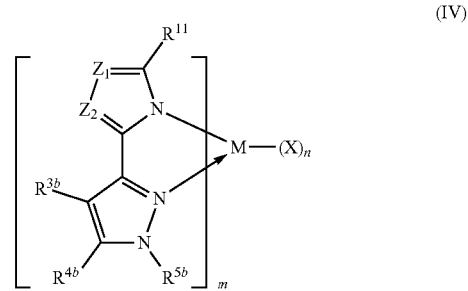

(IV)

In formula (IV), optionally $R^{3b}$ and $R^{4b}$ may be covalently connected to form an aromatic ring or a non-aromatic ring, each $z_1$, $z_2$, $R^{11}$, $R^{3b}$, $R^{4b}$, $R^{3c}$, X, n, m, and M are defined as in formula (I).

In some embodiments of formula (I), each A is -$GC(R^{4c})C(R^{5c})$— in which G is S, and the metal-ligand catalyst has a structure according to formula (V):

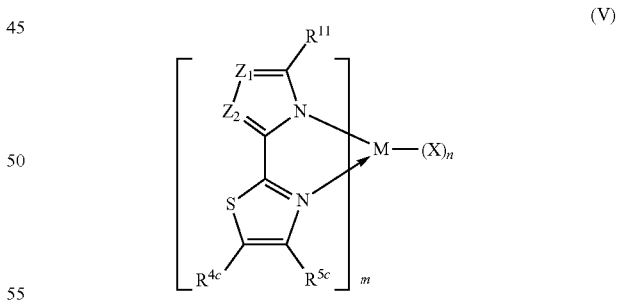

(V)

In formula (V), optionally $R^{4c}$ and $R^{5c}$ may be covalently connected to form an aromatic ring or a non-aromatic ring and each $z_1$, $z_2$, $R^{11}$, $R^{4c}$, $R^{5c}$, X, n, m, and M are defined as in formula (I).

In each embodiment of formula (I), (II), (III), or (IV), the arrow of formula (I), (II), (III), and (IV) represents a dative bond. The term "dative" (or coordinate) refers to a bond between two atoms, in which the bonding electrons are supplied by one of the two atoms. In each embodiment of formula (I), (II), (III), or (IV), the straight line from the N to the M represents an ionic bond.

In various embodiments of formulas (I), (II), (III), and (IV), m is 1 and n is 3.

In one or more embodiments of formulas (I), (II), (III), and (IV), $z_2$ is N. In some embodiments, $z_2$ is N and $z_1$ is $C(R^2)$. In other embodiments, when $z_2$ is N and $z_1$ is $CR^1$, $R^1$ and $R^{11}$ are not covalently connected to form an aromatic or non-aromatic ring.

In some embodiments of formulas (I), (II), (III), and (IV), $R^{11}$ is phenyl, (2,4,6-triisopropyl)phenyl, 3,5-di-tert-butylphenyl, naphthyl, or cyclopropyl.

In one or more embodiments, the polymerization process includes a metal-ligand complex of any one of formulas (I), (II), (III), and (IV), in which $R^{11}$ is a radical of formula (VI):

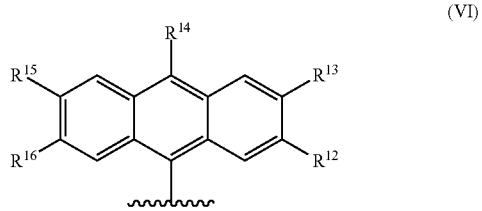

(VI)

In formula (VI), $R^{12}$, $R^{13}$, $R^{14}$, $R^{15}$, and $R^{16}$ is chosen from $(C_1-C_{10})$alkyl, $(C_6-C_{10})$aryl, or —H.

In some embodiments of formula (VI), $R^{12}$, $R^{13}$, $R^{14}$, $R^{15}$, and $R^{16}$ is chosen from tert-butyl, 3,5-di-tert-butylphenyl, or —H.

The M in the metal-ligand complex of formula (I) may be a transition metal such as titanium (Ti), zirconium (Zr), or hafnium (Hf), and the transition metal may have a formal oxidation state of +2, +3, or +4. The subscript n of $(X)_n$, referring to a number of ligands X bonded to or associated with the metal M, is an integer of from 1, 2, or 3.

The metal M in the metal-ligand complex of formula (I) may be derived from a metal precursor that is subsequently subjected to a single-step or multi-step synthesis to prepare the metal-ligand complex. Suitable metal precursors may be monomeric (one metal center), dimeric (two metal centers), or may have a plurality of metal centers greater than two, such as 3, 4, 5, or more than 5 metal centers. Specific examples of suitable hafnium and zirconium precursors, for example, include, but are not limited to $HfCl_4$, $HfMe_4$, $Hf(CH_2Ph)_4$, $Hf(CH_2CMe_3)_4$, $Hf(CH_2SiMe_3)_4$, $Hf(CH_2Ph)_3Cl$, $Hf(CH_2CMe_3)_3Cl$, $Hf(CH_2SiMe_3)_3Cl$, $Hf(CH_2Ph)_2Cl_2$, $Hf(CH_2CMe_3)_2Cl_2$, $Hf(CH_2SiMe_3)_2Cl_2$, $Hf(NMe_2)_4$, $Hf(NEt_2)_4$, and $Hf(N(SiMe_3)_2)_2Cl_2$; $ZrCl_4$, $ZrMe_4$, $Zr(CH_2Ph)_4$, $Zr(CH_2CMe_3)_4$, $Zr(CH_2SiMe_3)_4$, $Zr(CH_2Ph)_3Cl$, $Zr(CH_2CMe_3)_3Cl$, $Zr(CH_2SiMe_3)_3Cl$, $Zr(CH_2Ph)_2Cl_2$, $Zr(CH_2CMe_3)_2Cl_2$, $Zr(CH_2SiMe_3)_2Cl_2$, $Zr(NMe_2)_4$, $Zr(NEt_2)_4$, $Zr(NMe_2)_2Cl_2$, $Zr(NEt_2)_2Cl_2$, $Zr(N(SiMe_3)_2)_2Cl_2$, $TiBn_4$, $TiCl_4$ and $Ti(CH_2Ph)_4$. Lewis base adducts of these examples are also suitable as metal precursors, for example, ethers, amines, thioethers, and phosphines are suitable as Lewis bases. Specific examples include $HfCl_4$ $(THF)_2$, $HfCl_4(SMe_2)_2$ and $Hf(CH_2Ph)_2Cl_2(OEt_2)$. Activated metal precursors may be ionic or zwitterionic compounds, such as $(M(CH_2Ph)_3^+)(B(C_6F_5)_4^-)$ or $(M(CH_2Ph)_3^+)(PhCH_2B(C_6F_5)_3^-)$ where M is defined above as being Hf or Zr.

In the metal-ligand complex according to formula (I), each X bonds with M through a covalent bond, a dative bond, or an ionic bond. When n is 1, X may be a monodentate ligand or a bidentate ligand; when n is 2, each X is an independently chosen monodentate ligand and may be the same as or different from other groups X. In general, the metal-ligand complex according to formula (I) is overall charge-neutral. In some embodiments, the monodentate ligand may be a monoanionic ligand. Monoanionic ligands have a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, $HC(O)O^-$, $HC(O)N(H)^-$, $(C_1-C_{40})$hydrocarbylC(O)$O^-$, $(C_1-C_{40})$hydrocarbylC(O)N$((C_1-C_{20})$hydrocarbyl$)^-$, $(C_1-C_{40})$hydrocarbylC(O)N(H)$^-$, $R^KR^LB^-$, $R^KR^LN^-$, $R^KO^-$, $R^KS^-$, $R^KR^LP^-$, or $R^MR^KR^LSi^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and R is as defined above.

In other embodiments, at least one monodentate ligand X, independently from any other ligands X, may be a neutral ligand. In specific embodiments, the neutral ligand is a neutral Lewis base group such as $R^XNR^KR^L$, $R^KOR^L$, $R^KSR^L$, or $R^XPR^KR^L$, where each $R^X$ independently is hydrogen, $(C_1-C_{10})$hydrocarbyl-Si[$(C_1-C_{10})$hydrocarbyl]$_3$ (i.e. —$CH_2Si(Me)_3$), $(C_1-C_{40})$hydrocarbyl, [$(C_1-C_{10})$hydrocarbyl]$_3$Si—, or $(C_1-C_{40})$heterohydrocarbyl and each $R^K$ and $R^L$ independently is as defined above.

Additionally, each X can be a monodentate ligand that, independently from any other ligands X, is a halogen, unsubstituted $(C_1-C_{20})$hydrocarbyl, unsubstituted $(C_1-C_{20})$hydrocarbylC(O)O—, or $R^KR^LN$—, wherein each of $R^K$ and $R^L$ independently is an unsubstituted$(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$—, wherein each of $R^K$ and $R^L$ independently is an unsubstituted $(C_1-C_{10})$hydrocarbyl.

In some embodiments. X is benzyl, phenyl, or chloro. In further embodiments in which n is 2 or 3, such that there are at least two groups X, any two groups X may be joined to form a bidentate ligand. In illustrative embodiments including a bidentate ligand, the bidentate ligand may be a neutral bidentate ligand. In one embodiment, the neutral bidentate ligand is a diene of formula $(R^D)_2C=C(R^D)$—$C(R^D)=C(R^D)_2$, wherein each $R^D$ independently is H, unsubstituted $(C_1-C_6)$alkyl, phenyl, or naphthyl. In some embodiments the bidentate ligand is a monoanionic-mono (Lewis base) ligand. In some embodiments, the bidentate ligand is a dianionic ligand. The dianionic ligand has a net formal oxidation state of −2. In one embodiment, each dianionic ligand independently is carbonate, oxalate (i.e., $^-O_2CC(O)$ $O^-$), $(C_2-C_{40})$hydrocarbylene dicarbanion, $(C_1-C_{40})$heterohydrocarbylene dicarbanion, phosphate, or sulfate.

In further embodiments, X is selected from methyl; ethyl; 1-propyl; 2-propyl; 1-butyl; 2,2,-dimethylpropyl; trimethylsilylmethyl; phenyl; benzyl; or chloro. In some embodiments n is 2 and each X is the same. In some instances, at least two X are different from each other. In other embodiments n is 2 and each X is a different one of methyl; ethyl; 1-propyl; 2-propyl; 1-butyl; 2,2,-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In specific embodiments of catalyst systems, the metal-ligand complex according to formula (I) may include, without limitation, a complex having the structure of any of Procatalysts 1-29:

Procatalyst 1
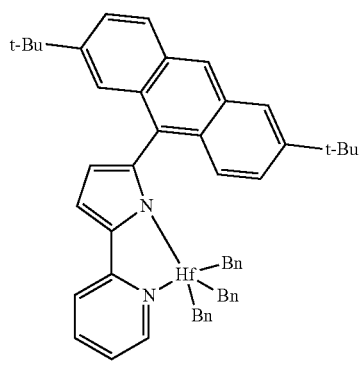
Procatalyst 2
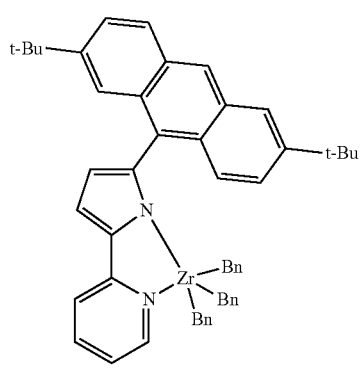
Procatalyst 3
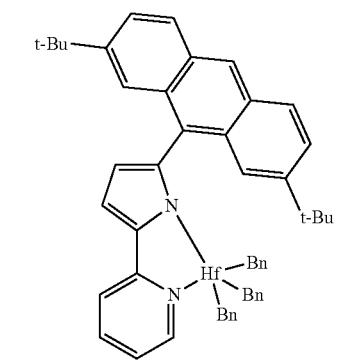
Procatalyst 4
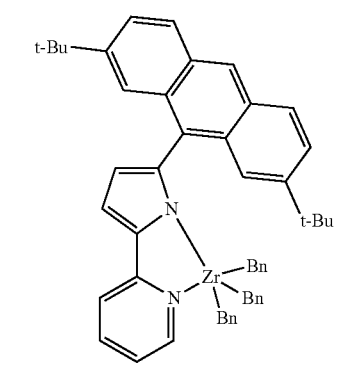
Procatalyst 5
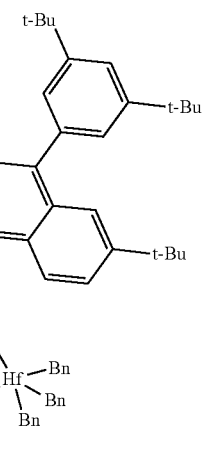
Procatalyst 6
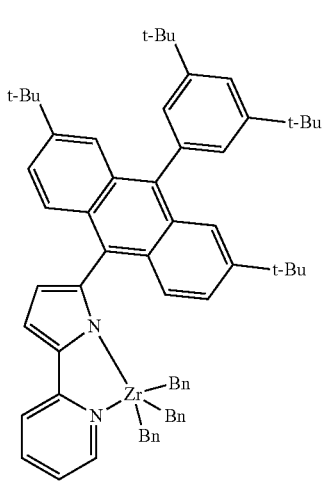
Procatalyst 7
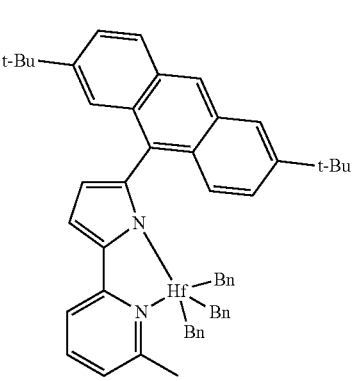
Procatalyst 8
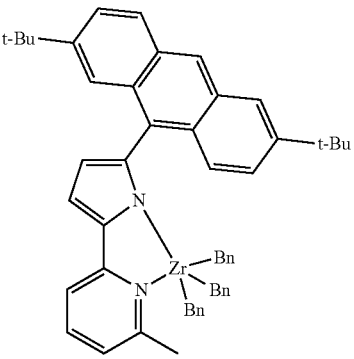

Procatalyst 9
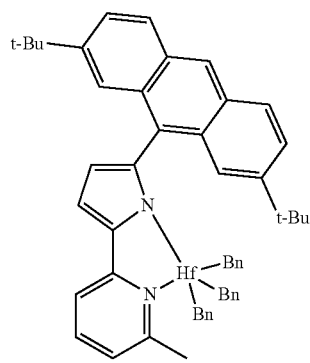
Procatalyst 10
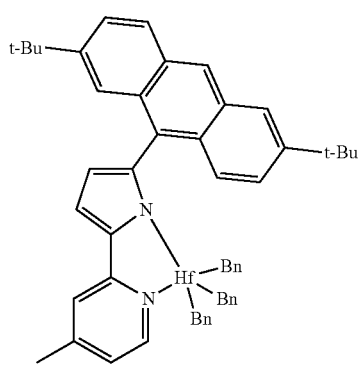
Procatalyst 11
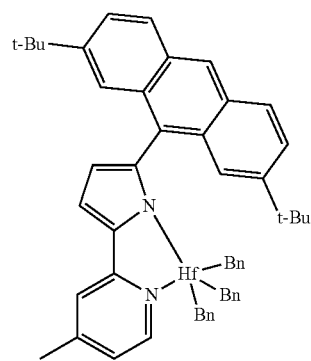
Procatalyst 12
Procatalyst 13
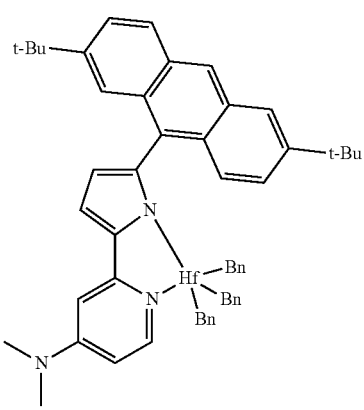
Procatalyst 14
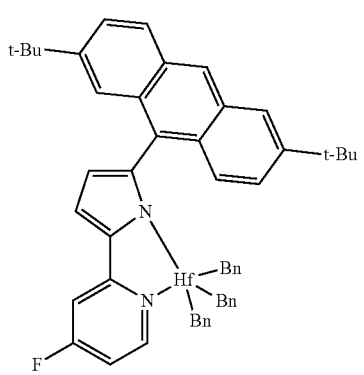
Procatalyst 15
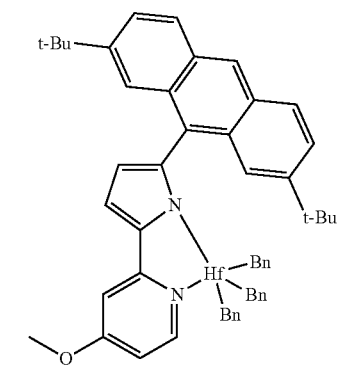
Procatalyst 16
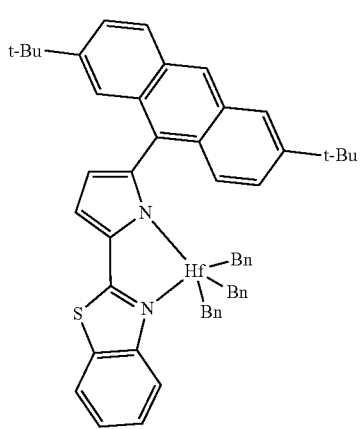

-continued
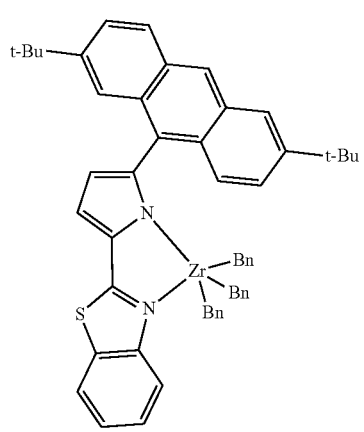
Procatalyst 17
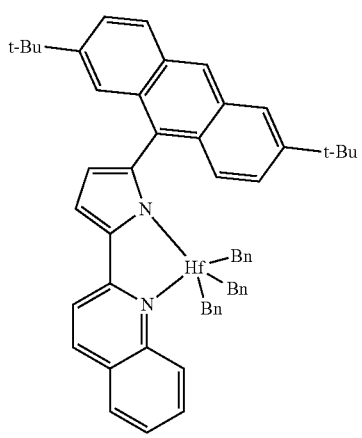
Procatalyst 20
Procatalyst 18
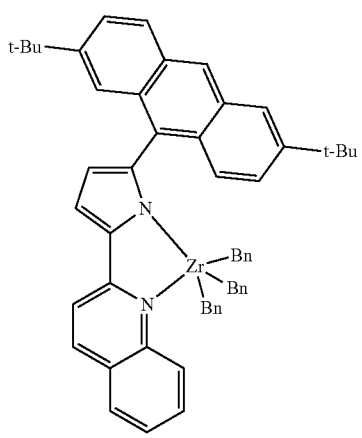
Procatalyst 21
Procatalyst 19
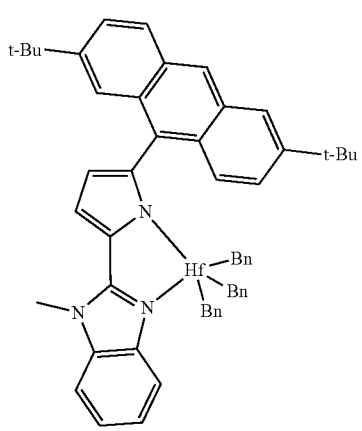
Procatalyst 22

Procatalyst 23

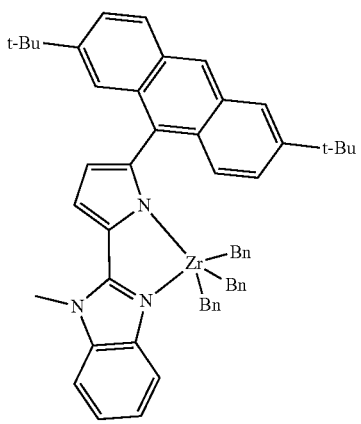

Procatalyst 24

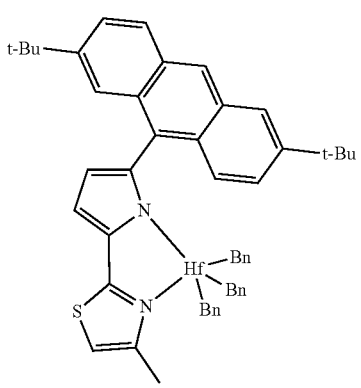

Procatalyst 25

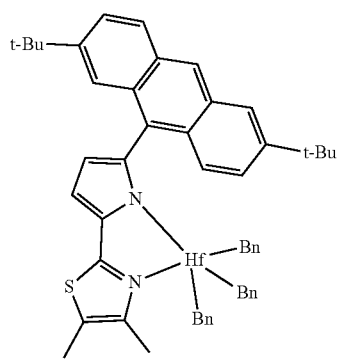

Procatalyst 26

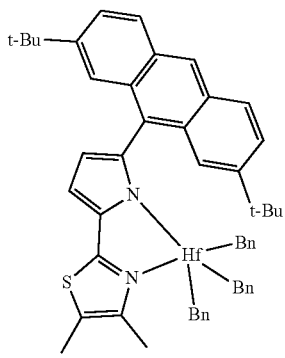

Procatalyst 27

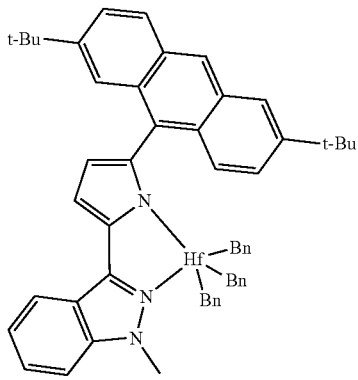

Procatalyst 28

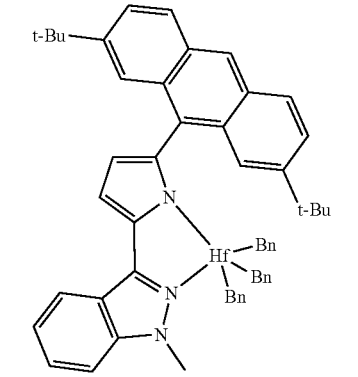

Procatalyst 29

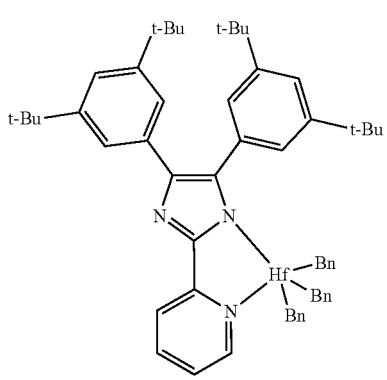

Procatalyst Activation

The catalyst systems of this disclosure include a metal-ligand complex according to formulas (I), (II), (III), and (IV). The metal-ligand complex according to formulas (I), (II), (III), and (IV) may be in a catalytically active form or in a procatalyst form that is catalytically inactive or is at least substantially less catalytically active than the catalytically active form. The procatalysts 1-29 are catalytically inactive forms of various metal-ligand complexes according to formula (I). The procatalyst system comprising the metal-ligand complex of formulas (I), (II), (III), and (IV) in a procatalyst form may be rendered catalytically active by any technique known in the art for activating metal-based catalysts of olefin polymerization reactions. For example, a metal-ligand complex of formulas (I), (II), (III), and (IV) may be rendered catalytically active by contacting the metal-ligand complex to, or combining the metal-ligand complex with, an activating co-catalyst. Another example of a suitable activating technique includes bulk electrolysis. Combinations of one or more of the foregoing activating co-catalysts and techniques are also contemplated. Subjecting a metal-ligand complex according to formulas (I), (II), (III), and (IV) in a procatalyst form to any of such activating techniques results in a catalytically activated form of the metal-ligand complex according to formulas (I), (II), (III), and (IV). In some embodiments, the catalytically activated form of the metal-ligand complex according to formulas (I), (II), (III), and (IV) may be the result of cleaving at least one X from the procatalyst form of the metal-ligand complex according to formulas (I), (II), (III), and (IV) by any of the foregoing activation techniques.

Co-Catalyst Component

Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 ($C_1$-$C_{20}$)hydrocarbyl substituents as described herein. In one embodiment, Group 13 metal compounds are tri(($C_1$-$C_{20}$)hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tetrakis(($C_1$-$C_{20}$)hydrocarbyl borate or a tri(($C_1$-$C_{20}$)hydrocarbyl)ammonium tetrakis(($C_1$-$C_{20}$) hydrocarbyl)borate (e.g. bis(octadecyl)methylammonium tetrakis(pentafluorophenyl)borate). As used herein, the term "ammonium" means a nitrogen cation that is a (($C_1$-$C_{20}$) hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activators (co-catalysts) include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:100, in other embodiments, from 1:1:1.5 to 1:5:30.

The catalyst system comprising the metal-ligand complex of formula (I) may be activated to form an active catalyst composition by combination with one or more co-catalysts, for example, a strong Lewis acid, a cation-containing co-catalyst, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: tris(pentafluorophenyl)borane, modified methyl aluminoxane (MMAO), bis(hydrogenated tallow alkyl)methyl tetrakis (pentafluorophenyl)borate(1$^-$) amine (i.e. [HNMe($C_{18}H_{37}$)$_2$][B($C_6F_5$)$_4$]), and combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Chain Shuttling Agents

The term, "shuttling agent" refers to a compound or mixture of compounds employed in the composition of the present disclosure that is capable of causing polymeryl exchange between at least two active catalyst sites of the catalysts included in the composition under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In some embodiments, the shuttling agent has an activity ratio RA-B/RB-A of from 0.01 and 100, from 0.1 to 10, from 0.5 to 2.0, or from 0.8 to 1.2. The activity ratio RA-B is the rate of polymeryl transfer from catalyst A active site to catalyst B active site via the shuttling agent, and RB-A is the rate of reverse polymeryl transfer which is the rate of exchange starting from the catalyst B active site to catalyst A active site via the shuttling agent. The intermediate formed between the shuttling agent and the polymeryl chain is sufficiently stable that chain termination is relatively rare. In one or more embodiments, less than 90 percent, less than 75 percent, less than 50 percent, or than 10 percent of shuttle-polymeryl products are terminated prior to attaining 3 distinguishable polymer segments or blocks. The rate of chain shuttling (defined by the time required to transfer a polymer chain from a catalyst site to the chain shuttling agent and then back to a catalyst site) is equivalent to or faster than the rate of polymer termination, even up to 10 or even 100 times faster than the rate of polymer termination. This permits polymer block formation on the same time scale as polymer propagation.

Polymer products having segments of different tacticity or regio-error, different block lengths, or different numbers of such segments or blocks in each copolymer may be prepared by selecting different combinations of catalysts and various shuttling agents. The catalysts may be selected from metal-ligand complexes of formula (I) having differing polymerization ability and paired various shuttling agents or mixtures of agents with these catalyst combinations For example, if the activity of the shuttling agent is low relative to the catalyst polymer chain propagation rate of one or more of the catalysts, longer block length multi-block copolymers and polymer blends may be obtained. In contrast, if shuttling is very fast relative to polymer chain propagation, a copolymer having a more random chain structure and shorter block lengths is obtained. An extremely fast shuttling agent may produce a multi-block copolymer having substantially random copolymer properties. By proper selection of both catalyst mixture and shuttling agent, relatively pure block copolymers, copolymers containing relatively large polymer segments or blocks, and/or blends of the foregoing with various homopolymers and/or copolymers can be obtained.

A suitable composition comprising catalyst A, catalyst B, and a chain shuttling agent may be obtained by the following multi-step procedure specially adapted for block differentiation based on tacticity or regio-error content:

I. One or more addition polymerizable C3-30 α-olefin monomers are polymerized using a mixture comprising a potential catalyst and a potential chain shuttling agent. This polymerization test is performed using a batch or semi-batch reactor (that is, without resupply of catalyst or shuttling agent), preferably with relatively constant monomer concentration, operating under solution polymerization conditions, typically using a molar ratio of catalyst to chain shuttling agent from 1:5 to 1:500. After forming a suitable quantity of polymer, the reaction is terminated by addition of a catalyst poison and the polymer's properties (tacticity and optionally regio-error content) are measured.

II. The foregoing polymerization and polymer testing are repeated for several different reaction times, providing a series of polymers having a range of yields and PDI values.

III. Catalyst/shuttling agent pairs demonstrating significant polymer transfer both to and from the shuttling agent are characterized by a polymer series wherein the minimum PDI is less than 2.0, more preferably less than 1.5, and most preferably less than 1.3. Furthermore, if chain shuttling is occurring, the Mn of the polymer will increase linearly as conversion is increased. Catalyst and shuttling agent pairs are those giving polymer Mn as a function of conversion (or polymer yield) fitting a line with a statistical precision (R2) of greater than 0.95, preferably greater than 0.99.

Steps I-III are then carried out for one or more additional pairings of potential catalysts and/or putative shuttling agents.

In one or more embodiments, the polymer composition comprising catalyst A, catalyst B, and one or more chain shuttling agents according to the invention is then selected such that the two catalysts each undergo chain shuttling with one or more of the chain shuttling agents, and catalyst A has a greater capacity of selectively forming stereospecific polymer compared to catalyst B under the reaction conditions chosen. At least one of the chain shuttling agents undergoes polymer transfer in both the forward and reverse directions (as identified in the foregoing test) with both catalyst A and catalyst B. In addition, it is preferable that the chain shuttling agent does not reduce the catalyst activity (measured in weight of polymer produced per weight of catalyst per unit time) of either catalyst (compared to activity in the absence of a shuttling agent) by more than 60 percent, more preferably such catalyst activity is not reduced by more than 20 percent, and most preferably catalyst activity of at least one of the catalysts is increased compared to the catalyst activity in the absence of a shuttling agent.

Alternatively, it is also possible to detect catalyst and shuttling agent pairs by performing a series of polymerizations under standard batch reaction conditions and measuring the resulting polymer properties. Suitable shuttling agents are characterized by lowering of the resultant Mn without significant broadening of PDI or loss of activity (reduction in yield or rate).

The foregoing tests are readily adapted to rapid throughput screening techniques using automated reactors and analytic probes and to formation of polymer blocks having different distinguishing properties (syndiotacticity, isotacticity, and optionally regio-error content). For example, a number of potential shuttling agent candidates can be pre-identified or synthesized in situ by combination of various organometal compounds with various proton sources and the compound or reaction product added to a polymerization reaction employing an olefin polymerization catalyst composition. Several polymerizations are conducted at varying molar ratios of shuttling agent to catalyst. As a minimum requirement, suitable shuttling agents are those that produce a minimum PDI of less than 2.0 in variable yield experiments as described above, while not significantly adversely affecting catalyst activity, and preferably improving catalyst activity, as above described.

Regardless of the method for identifying, a priori, a shuttling agent, the term is meant to refer to a compound that is capable of preparing the presently identified multi-block copolymers or usefully employed under the polymerization conditions herein disclosed. Highly desirably, multi-block copolymers having an average number of blocks or segments per average chain (as defined as the average number of blocks of different composition divided by the Mn of the polymer) greater than 3.0 more preferably greater than 3.5, even more preferably greater than 4.0, and less than 25, preferably less than 15, more preferably less than 10.0, most preferably less than 8.0 are formed according to the invention.

Suitable shuttling agents for use herein include Group 1, 2, 12 or 13 metal compounds or complexes containing at least one C1-20 hydrocarbyl group, preferably hydrocarbyl substituted aluminum, gallium or zinc compounds containing from 1 to 12 carbons in each hydrocarbyl group, and reaction products thereof with a proton source. Hydrocarbyl groups are alkyl groups, linear or branched, C2-8 alkyl groups. In one or more embodiments of the disclosure, the shuttling agents may be added to the polymerization process. The shuttling agents may include trialkyl aluminum and dialkyl zinc compounds, especially triethylaluminum, tri(i-propyl)aluminum, tri(i-butyl)aluminum, tri(n-hexyl)aluminum, tri(n-octyl)aluminum, triethylgallium, or diethylzinc. Additional suitable shuttling agents include the reaction product or mixture formed by combining the foregoing organometal compound, preferably a tri(C1-8)alkyl aluminum or di(C1-8)alkyl zinc compound, especially triethylaluminum, tri(i-propyl)aluminum, tri(i-butyl)aluminum, tri(n-hexyl)aluminum, tri(n-octyl)aluminum, or diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di(t-butyl)phenol, ethyl(1-naphthyl)amine, bis(2,3,6,7-dibenzo-1-azacycloheptaneamine), or 2,6-diphenylphenol. In some embodiments, the shuttling agent may be chosen from amine or hydroxyl reagent such that one hydrocarbyl group remains per metal atom. The primary reaction products of the foregoing combinations for use in the present disclosure as shuttling agents are n-octylaluminum di(bis(trimethylsilyl)amide), i-propylaluminum bis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

It will be appreciated by the skilled artisan that a suitable shuttling agent for one catalyst or catalyst combination may not necessarily be as good or even satisfactory for use with a different catalyst or catalyst combination. Some potential shuttling agents may adversely affect the performance of one or more catalysts, and may be excluded for use in the polymerization process of this disclosure. Accordingly, the activity of the chain shuttling agent should be balanced with the catalytic activity of the catalysts to achieve the polymer having a hard segment and a soft segment.

Generally however, shuttling agents possess the highest rates of polymer transfer as well as the highest transfer efficiencies (reduced incidences of chain termination). Such shuttling agents may be used in reduced concentrations and still achieve a degree of shuttling. In addition, such shuttling agents result in production of the shortest possible polymer block lengths. Chain shuttling agents with a single exchange site are employed due to the fact that the effective molecular weight of the polymer in the reactor is lowered.

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms, Exemplary α-olefin co-monomers include, but are not limited to, propylene, 1-butene, 1-pentene, 1-hexene, 1-heptene, 1-octene, 1-nonene, 1-decene, and 4-methyl-1-pentene, ethylidene norbornene. For example, the one or more α-olefin co-monomers may be selected from the group consisting of propylene, 1-butene, 1-hexene, and 1-octene; or in the alternative, from the group consisting of 1-hexene and 1-octene.

In some embodiments, the ethylene based polymers may comprise at least 50 percent by moles of units derived from ethylene. All individual values and subranges from at least 60 mole percent are included herein and disclosed herein as separate embodiments. For example, the ethylene based polymers may comprise at least 63 percent by moles of units derived from ethylene; at least 86 percent by moles of units; at least 90 percent by moles of units derived from ethylene; or in the alternative, from 70 to 100 percent by moles of units derived from ethylene; from 70 to 89.5 percent by moles of units derived from ethylene; or from 69 to 85.5 percent by moles of units derived from ethylene.

In some embodiments of the ethylene based polymer, the amount of additional α-olefin is less than 50 mol %; other embodiments include at least 1 mole percent (mol %) to 40 mol %; and in further embodiments the amount of additional α-olefin includes at least 10 mol % to 20 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors. In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more co-catalysts, as described in the preceding paragraphs.

In some embodiments, the polymerization process for producing an ethylene-based polymer includes polymerizing ethylene and at least one additional α-olefin in the presence of a catalyst system. In one or more embodiments, the catalyst system may include the metal-ligand complex according to formulas (I), (II), (III), and (IV) in its catalytically active form without a co-catalyst or an additional catalyst. In further embodiments, the catalyst system may include the metal-ligand complex according to formulas (I), (II), (III), and (IV) in its procatalyst form, its catalytically active form, or a combination of both forms, in combination with at least one co-catalyst. In further embodiments, the catalyst system may include the metal-ligand complex according to formulas (I), (II), (III), and (IV) in its procatalyst form in combination with at least one co-catalyst and at least one additional catalyst. In further embodiments, the catalyst system may include a first catalyst and at least one additional catalyst, and, optionally, at least one co-catalyst, where the first catalyst is a metal-ligand complex according to formulas (I), (II), (III), and (IV) in its catalytically active form.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm$^3$ to 0.950 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the polymer resulting from the catalyst system that includes the metal-ligand complex of formula (I) may have a melt flow ratio ($I_{10}/I_2$) from 5 to 15, in which melt index $I_2$ is measured according to ASTM D1238 (incorporated herein by reference in its entirety) at 190° C., and 2.16 kg load, and melt index $I_{10}$ is measured according to ASTM D1238 at 190° C., and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1 to 10, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

Batch Reactor Polymerization Procedure

The batch reactor polymerizations are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve, which empties the reactor contents into a stainless steel dump pot, which is prefilled with a catalyst kill solution (typically 5 mL of a Irgafos/Irganox/toluene mixture). The dump pot is vented to a 30 gal. blow-down tank, with both the pot and the tank purged with nitrogen. All solvents used for polymerization or catalyst makeup are run through solvent purification columns to remove any impurities that may affect polymerization. The 1-octene and IsoparE are passed through 2 columns, the first containing A2 alumina, the second containing Q5. The ethylene is passed through 2 columns, the first containing A204 alumina and 4Å mol sieves, the second containing Q5 reactant. The $N_2$, used for transfers, is passed through a single column containing A204 alumna, 4Å mol sieves and Q5.

The reactor is loaded first from the shot tank that may contain IsoparE solvent and/or 1-octene, depending on desired reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators were mixed with the appropriate amount of purified toluene to achieve a desired molarity solution. The catalyst and activators were handled in an inert glove box, drawn into a syringe and pressure transferred into the catalyst shot tank. This was followed by 3 rinses of toluene, 5 mL each. Immediately after catalyst addition the run timer begins. If ethylene was used, it was then added by the Camile to maintain reaction pressure set point in the reactor. These polymerizations were run for 10 min., then the agitator was stopped and the bottom dump valve opened to empty reactor contents to the dump pot. The dump pot contents are poured into trays placed in a lab hood where the solvent is evaporated off overnight. The trays containing the remaining polymer are then transferred to a vacuum oven, where they are heated up to 140° C. under vacuum to remove any remaining solvent. After the trays cool to ambient temperature, the polymers are weighed for yield/efficiencies, and submitted for polymer testing.

HT-GPC Analysis with IR Detection of Octene Incorporation

High temperature GPC analysis was performed using a Dow Robot Assisted Delivery (RAD) system equipped with a PolymerChar infrared detector (IR5) and Agilent PLgel Mixed A columns. Decane (10 μL) was added to each sample for use as an internal flow marker. Samples were first diluted in 1,2,4-trichlorobenzene (TCB) stabilized with 300 ppm butylated hydroxyl toluene (BHT) to a concentration of 10 mg/mL and dissolved by stirring at 160° C. for 120 minutes. Prior to injection samples were further diluted with TCB stabilized with BHT to a concentration of 2 mg/mL. Samples (250 μL) were eluted through one PL-gel 20 μm (50×7.5 mm) guard column followed by two PL-gel 20 μm (300×7.5 mm) Mixed-A columns maintained at 160° C. with TCB stabilized with BHT at a flowrate of 1.0 mL/min. The total run time was 24 minutes. To calibrate for molecular weight (MW) Agilent EasiCal polystyrene standards (PS-1 and PS-2) were diluted with 1.5 mL TCB stabilized with BHT and dissolved by stirring at 160° C. for 15 minutes. The PS standards were injected into the system without further dilution to create a $3^{rd}$ order MW calibration curve with apparent units adjusted to homo-polyethylene (PE) using known Mark-Houwink coefficients for PS and PE. Octene incorporation was determined by use of a linear calibration developed by analyzing co-polymers at known compositions.

One or more features of the present disclosure are illustrated in view of the examples as follows:

EXAMPLES

Starting Materials

Example 1—Anthracene Cis Isomer: Trans Isomer

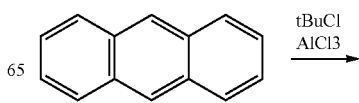

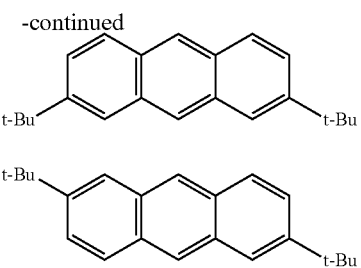

In a nitrogen purged glovebox, AlCl₃ (1.81 g, 13.61 mmol) was added at room temperature to a round bottom flask equipped with a glass coil reflux condenser containing a suspension of anthracene (50.00 g, 280.53 mmol) and t-BuCl (90.1 mL, 813.54 mmol) in CHCl₃ (dried over molecular sieves) (200 mL). The mixture was heated at reflux temperature (~50° C.) for ~18 h. After cooling down to room temperature, the resulting turbid solution was filtered, collected and dried under vacuum. The filtrant was the 2,6-di-tert-butylanthracene (37.54 g, 46.1%). The filtrate contained a mixture of the two isomers and the CHCl₃ was removed under reduced pressure. The 2,7-di-tert-butylanthracene was obtained by extracting from the crude product with acetone (stirred in 50 mL of acetone and filtered 3 times). The acetone was removed under reduced pressure to yield the 2,7-di-tert-butylanthracene as pink crystals (12.54 g, 15.4%).

Cis Isomer: ¹H NMR (400 MHz, CDCl₃) δ 8.40 (d, J=1.0 Hz, 1H), 8.34 (d, J=1.1 Hz, 1H), 7.98 (d, J=0.8 Hz, 1H), 7.96-7.92 (m, 3H), 7.60 (d, J=2.0 Hz, 1H), 7.58 (d, J=2.0 Hz, 1H), 1.52 (s, 18H).

Trans Isomer: ¹H NMR (400 MHz, CDCl₃) δ 8.33 (d, J=1.3 Hz, 2H), 7.94 (d, J=8.9 Hz, 2H), 7.89 (d, J=2.0 Hz, 2H), 7.56 (dd, J=9.0, 2.0 Hz, 2H), 1.48 (s, 18H). ¹³C NMR (101 MHz, CDCl₃) δ 147.28, 131.62, 130.51, 127.70, 125.33, 124.65, 122.28, 34.87, 30.98.

Example 2—Anthracenyl Bromide—Trans Isomer

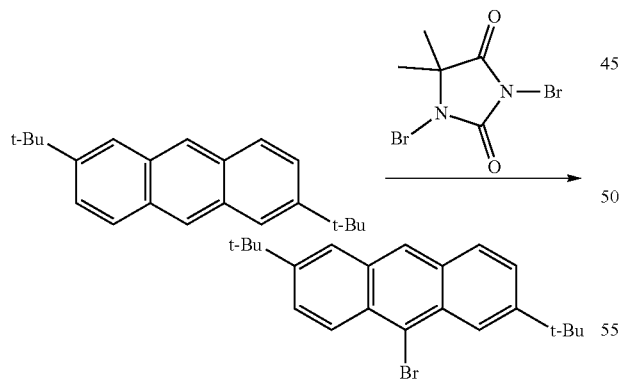

In a pre-dried 250 mL round bottom flask, under nitrogen, 2,6-di-tert-butylanthracene (3.0 g, 0.0103 mol, 1.0 eq.) was dissolved in 80 mL anhydrous dichloromethane. 1,3-dibromo-5,5-dimethylhydantoin (1.477 g, 0.00516 mol, 0.50 eq.) in 30 mL acetonitrile was added drop-wise over 29 minutes. The reaction was then stirred at room temperature for 2 hours. The reaction was a light brown color. The reaction was concentrated and taken up in ~50 mL of methanol and dichloromethane (~20 mL) until dissolved, and concentrated. The resulting solids were taken up in methanol (~50 mL) and the yellow solids were filtered off and washed with a minimal amount of methanol. The solids were taken up in ~50 mL ethanol and heated to reflux until dissolved. Upon standing, crystalline solids came out of solution. The room temperature suspension was filtered and the solids were rinsed with a minimal amount of ethanol. The filtrate was concentrated until approximately 30 mL ethanol remained. The suspension was heated to reflux until all the solids dissolved. Upon cooling to room temperature, a second crop of crystalline solids formed. The solids were filtered and rinsed with minimal ethanol. The material was dried in a vacuum oven and used without further purification. The reaction yielded 2.08 g (a 54% yield).

¹H NMR (400 MHz, CDCl₃) δ 8.43 (dt, J=9.3, 0.8 Hz, 1H), 8.39 (dt, J=1.8, 0.8 Hz, 1H), 8.34 (s, 1H), 7.96-7.88 (m, 1H), 7.87-7.82 (m, 1H), 7.68 (dd, J=9.3, 2.0 Hz, 1H), 7.58 (dd, J=8.9, 1.9 Hz, 1H), 1.48 (s, 9H), 1.45 (s, 9H).

Example 3—Anthracenyl Bromide—Cis Isomer

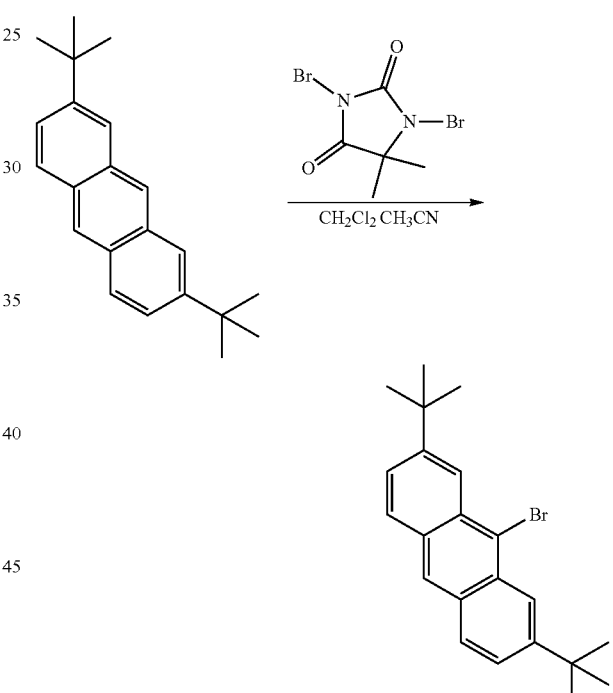

A pre-dried 500 mL round bottom flask, under nitrogen, dissolved 2,6-di-tert-butylanthracene (8.80 g, 0.0273 mol, 1.0 eq.) in 160 mL anhydrous dichloromethane. (The starting material is estimated to be 90% pure. Theoretical amount is 7.92 g material.) Added drop-wise a solution of 1,3-dibromo-5,5-dimethylhydantoin (3.900 g, 0.0138 mol, 0.50 eq.) in 60 mL acetonitrile over 67 minutes. The reaction was allowed to stir at room temperature for 4 hours. The reaction was concentrated and taken up in ~70 mL hexanes. The material was filtered, the solids were rinsed with hexane (xs) and the combined filtrate was concentrated. The material was mostly purified by chromatography on silica gel (100% hexane). The resulting material was taken up in boiling ethanol. The solution was concentrated until solids started to appear. The solution was allowed to cool to room temperature. The solids were filtered and rinsed with minimal ethanol. The product was 3.86 g an off white crystalline solid, a 38% yield.

$^1$H NMR (400 MHz, CDCl$_3$) δ 8.42 (s, 2H), 8.33 (s, 1H), 7.92 (d, J=8.9 Hz, 2H), 7.58 (dd, J=8.9, 1.8 Hz, 2H), 1.49 (s, 18H).

$^{13}$C NMR (101 MHz, CDCl$_3$) δ 149.64, 130.56, 128.29, 125.84, 124.86, 122.29, 121.94, 35.43, 30.95.

Example 4—2-(2,7-di-tert-butylanthracen-9-yl)-1H-pyrrole $^1$H NMR (400 MHz, CDCl$_3$) δ 8.37 (s, 1H), 8.28 (s, 1H), 7.93 (d, J=8.9 Hz, 1H), 7.89-7.81 (m, 3H), 7.54 (dd, J=8.9, 1.9 Hz, 1H), 7.48 (dd, J=9.3, 1.9 Hz, 1H), 7.04 (t, J=2.5 Hz, 1H), 6.51 (q, J=2.8 Hz, 1H), 6.49-6.46 (m, 1H), 1.43 (s, 9H), 1.34 (s, 9H).

$^{13}$C NMR (101 MHz, CDCl$_3$) δ 147.67, 147.12, 131.37, 131.20, 130.40, 130.14, 127.91, 127.79, 127.58, 126.47, 126.33, 125.10, 124.55, 122.46, 120.70, 117.77, 111.07, 108.92, 35.04, 34.77, 30.92, 30.88.

UP-LCMS (M+1) 356.2

Example 5—2,6-di-tert-butylanthracenyl-2-pyrrole

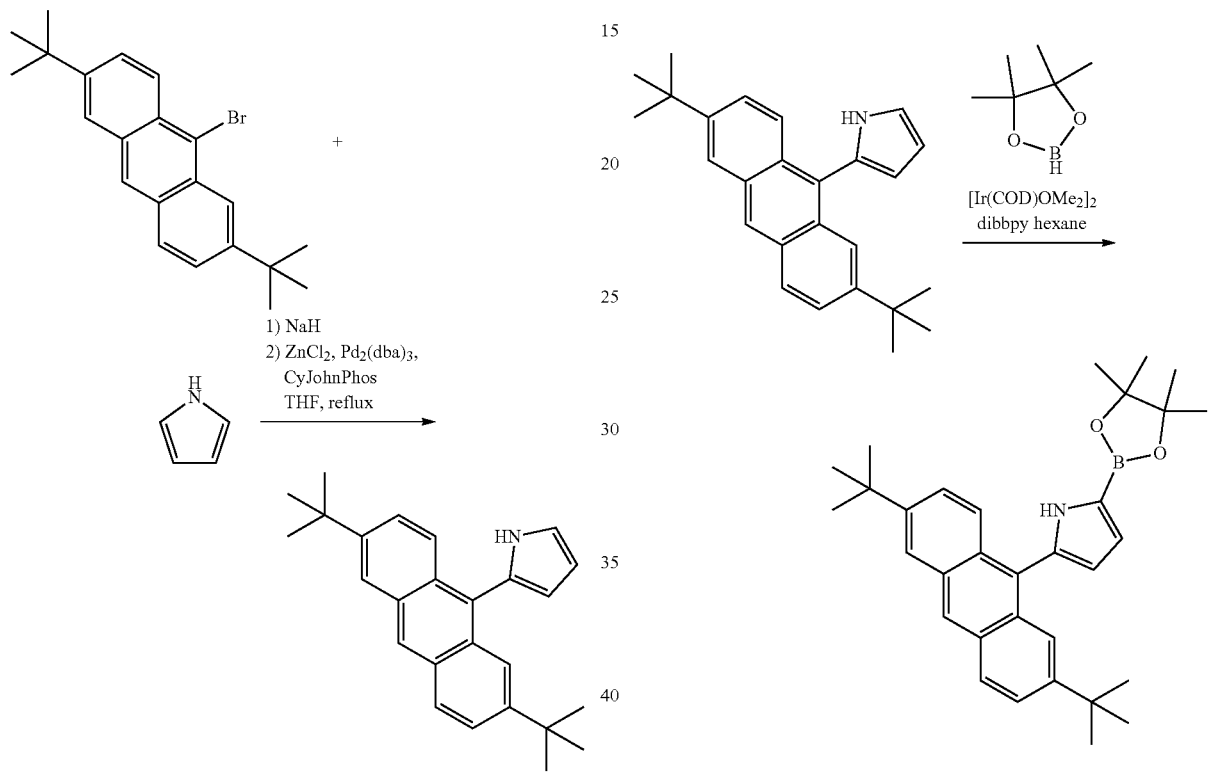

Inside a nitrogen glove box, a 250 mL round bottom flask was charged with sodium hydride (1.094 g, 95%, 0.0433 mol, 4.00 eq.) and 60 mL dry THF. Pyrrole (3.01 mL, 0.0433 mol, 4.00 eq.) was then added drop-wise. The mixture was allowed to stir vigorously for 4 hours.

Zinc chloride (5.904 g, 0.0433 mol, 4.00 eq.) was added in portions over several minutes. After stirring for 10 minutes, CyJohnPhos ligand (0.152 g, 4.332×10$^{-4}$ mol, 0.04 eq.) and Pd$_2$(dba)$_3$, (tris(dibenzylideneacetone)dipalladium(0), 0.198 g, 2.166×10$^{-4}$ mol, 0.02 eq.) were added. The solution stirred for another 5 minutes and 9-bromo-2,6-di-tert-butylanthracene (18-BT5449-1, 4.00 g, 0.108 mol, 1.00 eq.) was added. A coiled condenser was attached, and the mixture was stirred for 16 hours at 80° C.

The solution was cooled and diluted with ethyl acetate. The reaction slowly and cautiously quenched with 50 mL water. The suspension was filtered to remove the zinc salts. Product was extracted with portions of ethyl acetate and the combined organic fractions were dried over magnesium sulfate, concentrated, and the residue purified by chromatography on silica gel (0 to 5% ethyl acetate in hexane). 2.51-3.23 g of product was isolated as a yellow-orange solid, (65-84% yields).

Inside a nitrogen glove box, a 250 mL round bottom flask was charged with 2-(2,6-di-tert-butylanthracen-9-yl)-1H-pyrrole (2.00 g, 0.00562 mol, 1.00 eq.) and 50 mL hexane. A 20 mL vial was charged with [Ir(COD)OMe]$_2$ ((1,5-Cyclooctadiene)(methoxy)iridium(I) dimer, 0.056 g, 8.438× 10$^{-5}$ mol, 0.015 eq.) and 10 mL hexane. HBpin (4,4,5,5-Tetramethyl-1,3,2-dioxaborolane, 1.280 mL, 0.00844 mol, 1.5 eq.) was added, followed by 4,4'-di-tert-butyl-2,2'-bipyridine (dtbbpy, 0.045 g, 1.688×10$^{-4}$ mol, 0.03 eq.). The mixture stirred for 6 minutes and was added to the pyrrole-containing solution. The flask was connected to a coiled condenser and was stirred at 60° C. overnight.

The dark solution was allowed to cool. The reaction was diluted with 70 mL ethyl acetate and slowly quenched by slowly adding approximately 10 mL methanol. The reaction was allowed to stir for 20 minutes. The volatiles were removed by rotary evaporation. The residue was purified by chromatography on silica gel (20 to 60% dichloromethane in hexanes). Product was isolated as a yellow-orange solid (1.44-180 g, 53-58%). The product contains approximately 15% 2-(2,6-di-tert-butylanthracen-9-yl)-1H-pyrrole starting material.

$^1$H NMR (400 MHz, CDCl$_3$) δ 8.88 (s, 1H), 8.37 (s, 1H), 7.93 (d, J=8.9 Hz, 1H), 7.89-7.79 (m, 3H), 7.54 (dd, J=8.9, 1.9 Hz, 1H), 7.48 (dd, J=9.2, 2.0 Hz, 1H), 7.10 (dd, J=3.4, 2.5 Hz, 1H), 6.55 (dd, J=3.4, 2.4 Hz, 1H), 1.43 (s, 9H), 1.34 (d, J=1.3 Hz, 18H).

$^{13}$C NMR (101 MHz, CDCl$_3$) δ 147.70, 147.11, 132.83, 131.15, 131.08, 130.10, 130.08, 127.89, 127.31, 126.67, 126.25, 125.21, 124.55, 122.45, 120.70, 120.67, 112.86, 83.54, 35.07, 34.78, 30.91, 30.86, 24.80.

UP-LCMS (M+1) 482.3

Example 6

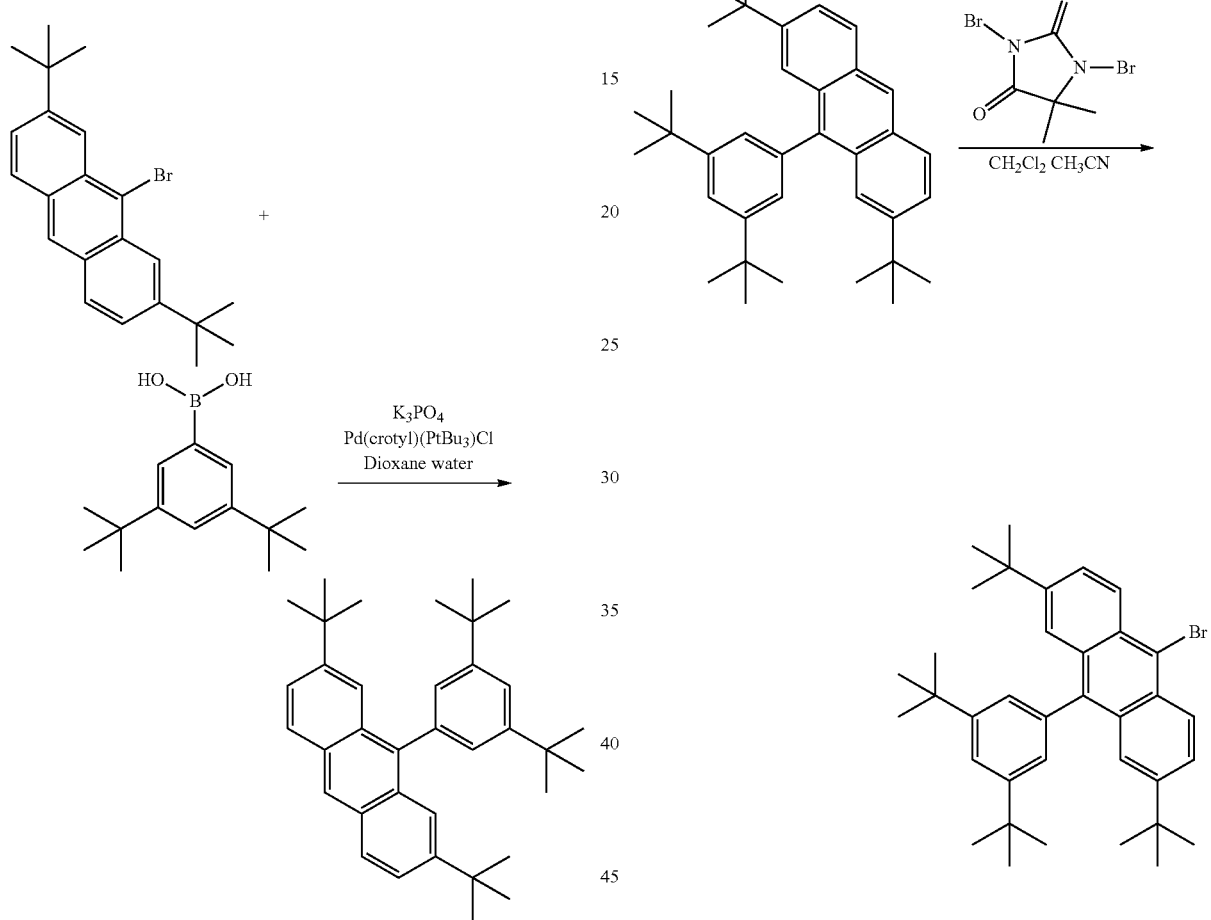

Inside a nitrogen glove box, a 100 mL RB flask was charged with 9-bromo-2,7-di-tert-butylanthracene (2.00 g, 0.005415 mol, 1.00 eq.), 3,5-di-t-butylphenylboronic acid (1.902 g, 0.008122 mol, 1.50 eq.), potassium phosphate tribasic (3.448 g, 0.01624 mol, 3.00 eq.) and Pd(amphos)Cl$_2$ (Bis(di-tert-butyl(4-dimethyl-aminophenyl)phosphine)-dichloropalladium(II), 0.114 g, 4.090×10$^{-4}$ mol, 0.10 eq.). 40 mL 1,4-dioxane and 8 mL water were added. The reaction was heated to 50° C., and stirred overnight.

After 18.5 hours, the reaction was allowed to cool and was removed from the dry box. The mixture was diluted with 120 mL ethyl acetate and the organics were washed with water (50 mL×3) and brine (50 mL×1). The organics were dried over magnesium sulfate, filtered, and concentrated. The material was purified by chromatography on silica gel (100% hexane) to provide 2.516 g white crystalline solid, 97% yield.

$^{1}$H NMR (400 MHz, CDCl$_3$) δ 8.35 (s, 1H), 7.95 (d, J=8.9 Hz, 2H), 7.69 (s, 2H), 7.53 (d, J=1.9 Hz, 1H), 7.52-7.50 (m, 2H), 7.30 (d, J=1.8 Hz, 2H), 1.39 (s, 18H), 1.29 (s, 18H).

$^{13}$C NMR (101 MHz, CDCl$_3$) δ 150.19, 146.98, 137.85, 137.56, 130.16, 129.82, 127.92, 125.95, 124.94, 124.08, 121.39, 120.38, 35.03, 34.98, 31.62, 30.91.

GCMS: (M+1) 479.4

Example 7

In a pre-dried 250 mL RB flask, under nitrogen, 2,7-di-tert-butyl-9-(3,5-di-tert-butylphenyl)anthracene (2.475 g, 0.005170 mol, 1.0 eq.) was dissolved in 70 mL anhydrous dichloromethane. 1,3-dibromo-5,5-dimethylhydantoin (0.754 g, 0.002636 mol, 0.51 eq.) in 10 mL acetonitrile was added drop-wise over 20 minutes. The reaction was then stirred at room temperature for 3 hours. The reaction was concentrated and taken up in ~50 mL methanol with dichloromethane until dissolved, and concentrated. The residue was purified by chromatography on silica gel (0 to 5% dichloromethane in hexanes). Product was isolated as a light yellow solid (2.742 g, 95%)

$^{1}$H NMR (400 MHz, CDCl$_3$) δ 8.50 (d, J=9.8 Hz, 2H), 7.67-7.63 (m, 4H), 7.53 (t, J=1.9 Hz, 1H), 7.26 (d, J=1.8 Hz, 2H), 1.38 (s, 18H), 1.28 (s, 18H).

$^{13}$C NMR (101 MHz, CDCl$_3$) δ 150.39, 147.28, 138.50, 137.27, 131.07, 128.56, 127.38, 125.89, 125.77, 121.94, 121.34, 120.67, 34.98, 34.87, 31.58, 30.79.

UP-LCMS (M+1) 558.2

Example 8

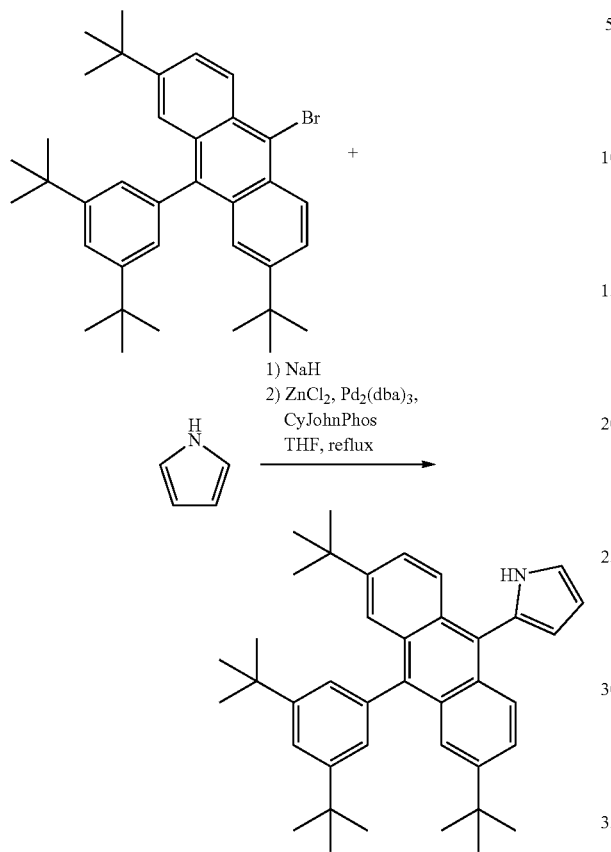

1) NaH
2) ZnCl$_2$, Pd$_2$(dba)$_3$,
CyJohnPhos
THF, reflux

Inside a nitrogen glove box, a 100 mL round bottom flask was charged with 95% sodium hydride (0.362 g, 0.0143 moles, 4.00 eq.) and 40 mL dry THF. Pyrrole (1.00 mL, 0.0143 mol, 4.00 eq.) was added drop-wise. The mixture was allowed to stir vigorously for 4 hours.

Zinc chloride (1.955 g, 0.0143 mol, 4.00 eq.) was added in portions over several minutes. After stirring for 10 minutes, CyJohnPhos ligand (0.050 g, 1.434×10$^{-4}$ mol, 0.04 eq.) and Pd$_2$(dba)$_3$, (tris(dibenzylideneacetone)dipalladium(0), 0.066 g, 7.173×10$^{-5}$ mol, 0.02 eq.) were added. The solution stirred for an additional 5 minutes, then 10-bromo-2,7-di-tert-butyl-9-(3,5-di-tert-butylphenyl)anthracene (2.00 g, 0.003586 mol, 1.00 eq.) was added. A coiled condenser was attached, and the reaction was stirred for 19 hours at 80° C.

The solution was cooled and diluted with ethyl acetate. The reaction slowly and cautiously quenched with 20 mL water. The suspension was filtered to remove the zinc salts. Product was extracted with portions of ethyl acetate and the combined organic fractions were dried over magnesium sulfate, concentrated, and the residue purified by chromatography on silica gel (20 to 50% dichloromethane in hexane). 1.533 g of product was isolated as a yellow-orange solid, (65-84% yields).

$^1$H NMR (400 MHz, CDCl$_3$) δ 8.32 (s, 1H), 7.88 (d, J=9.2 Hz, 2H), 7.69 (d, J=2.0 Hz, 2H), 7.53 (t, J=1.9 Hz, 1H), 7.46 (dd, J=9.2, 2.0 Hz, 2H), 7.31 (d, J=1.8 Hz, 2H), 7.10-7.03 (m, 1H), 6.57-6.46 (m, 2H), 1.40 (s, 18H), 1.27 (s, 18H).

$^{13}$C NMR (101 MHz, CDCl$_3$) δ 150.32, 146.85, 138.87, 137.69, 129.94, 129.86, 127.96, 127.25, 126.36, 125.86, 124.46, 121.59, 120.49, 117.79, 111.16, 108.87, 35.00, 34.89, 31.61, 30.83.

UP-LCMS (M+1) 544.3

Example 9

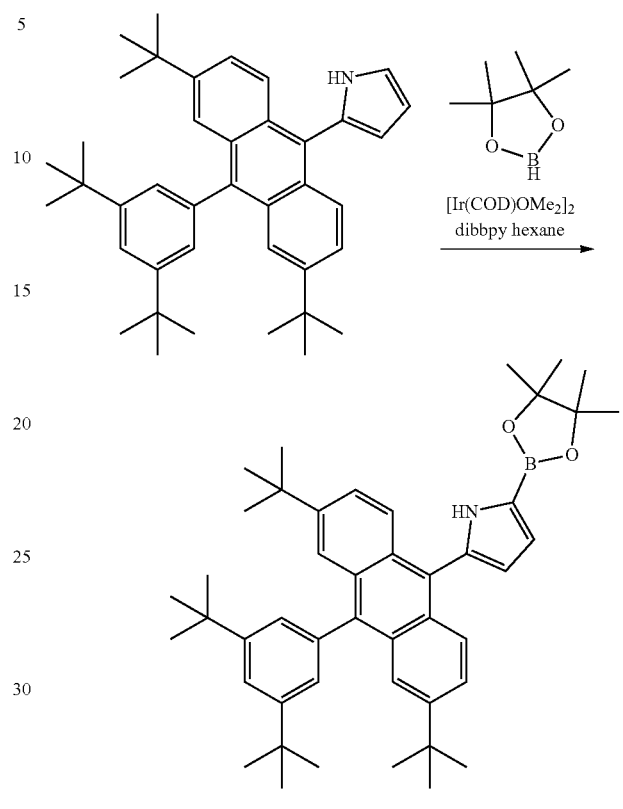

[Ir(COD)OMe$_2$]$_2$
dibbpy hexane

Inside a nitrogen glove box, a 100 mL round bottom flask was charged with 2-(3,6-di-tert-butyl-10-(3,5-di-tert-butylphenyl)anthracen-9-yl)-1H-pyrrole (1.515 g, 0.00279 mol, 1.00 eq.) and 50 mL hexane. A 20 mL vial was charged with [Ir(COD)OMe]$_2$ (1,5-Cyclooctadiene)(methoxy) iridium(I) dimer, 0.028 g, 84.179×10$^{-5}$ mol, 0.015 eq.) and 10 mL hexane. HBpin (4,4,5,5-Tetramethyl-1,3,2-dioxaborolane, 0.61 mL, 0.004179 mol 1.5 eq.) was added, followed by 4,4'-di-tert-butyl-2,2'-bipyridine (dtbbpy, 0.022 g, 8.257×10$^{-5}$ mol, 0.03 eq.). The mixture stirred for 7 minutes and was added to the pyrrole-containing flask. The flask was connected to a coiled condenser and was stirred at 60° C. overnight.

After 16 hours, the reaction was allowed to cool and was diluted with 70 mL ethyl acetate. The reaction was quenched by slowly adding ~10 mL methanol. The reaction was allowed to stir for 20 minutes. The volatiles were removed by rotary evaporation. The residue was purified by chromatography on silica gel (20 to 25% dichloromethane in hexanes). Product was isolated as an orange solid (1.277 g, 68%).

$^1$H NMR (400 MHz, CDCl$_3$) δ 8.90 (s, 1H), 7.84 (d, J=9.2 Hz, 2H), 7.69 (d, J=1.8 Hz, 2H), 7.53 (t, J=1.8 Hz, 1H), 7.45 (dd, J=9.2, 2.0 Hz, 2H), 7.31 (d, J=1.9 Hz, 2H), 7.12 (dd, J=3.4, 2.5 Hz, 1H), 6.55 (dd, J=3.4, 2.4 Hz, 1H), 1.40 (s, 18H), 1.33 (s, 12H), 1.27 (d, J=1.5 Hz, 18H).

$^{13}$C NMR (101 MHz, CDCl$_3$) δ 324.34, 320.88, 313.08, 311.71, 307.24, 303.92, 303.66, 300.89, 300.35, 299.88, 298.55, 295.59, 294.62, 294.53, 287.00, 209.00, 208.90, 205.62, 204.83, 198.84.

UP-LCMS (M+1) 670.3

Example 10

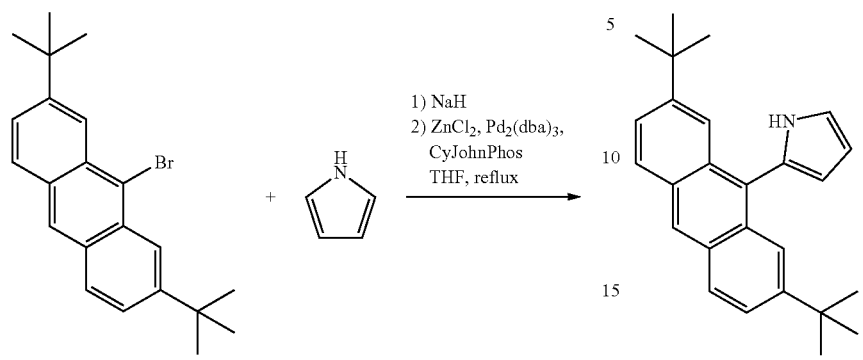

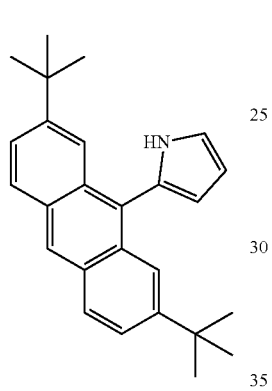

Inside a nitrogen glove box, a 250 mL round bottom flask was charged with 95% sodium hydride (0.547 g, 0.0217 mol, 4.00 eq.) and 40 mL dry THF. Pyrrole (1.50 mL, 0.0217 mol, 4.00 eq.) was added drop-wise. The mixture was allowed to stir vigorously for 4 hours.

Zinc chloride (2.952 g, 0.0217 mol, 4.00 eq.) was added in portions over several minutes. After stirring for 10 minutes, CyJohnPhos ligand (0.076 g, 2.17×10$^{-4}$ mol, 0.04 eq.) and Pd$_2$(dba)$_3$, (tris(dibenzylideneacetone)dipalladium(0), 0.099 g, 1.08×10$^{-4}$ mol, 0.02 eq.) were added. The solution stirred for another 5 minutes and 9-bromo-2,7-di-tert-butylanthracene (2.00 g, 0.00542 mol, 1.00 eq.) was added. A coiled condenser was attached, and the mixture was stirred for 16 hours at 80° C. The solution was cooled and diluted with 70 mL ethyl acetate. The reaction slowly and cautiously quenched with 50 mL water. The suspension was filtered to remove the zinc salts. Product was extracted with portions of ethyl acetate and the combined organic fractions were dried over magnesium sulfate, concentrated, and the residue purified by chromatography on silica gel (0 to 18% ethyl acetate in hexane) to provide a 1.531 g yellow solid, (79% yield).

$^1$H NMR (400 MHz, CDCl$_3$) δ 8.34 (s, 1H), 8.26 (s, 1H), 7.92 (d, J=8.9 Hz, 2H), 7.85-7.80 (m, 2H), 7.52 (dd, J=8.9, 1.9 Hz, 2H), 7.04 (td, J=2.7, 1.5 Hz, 1H), 6.53-6.46 (m, 2H), 1.34 (s, 18H).

$^{13}$C NMR (101 MHz, CDCl$_3$) δ 147.82, 131.80, 129.69, 128.06, 127.97, 127.54, 126.03, 124.33, 120.72, 117.70, 111.07, 108.95, 35.06, 30.89.

UP-LCMS: (M+1) 356.2

Example 11

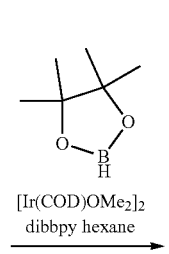

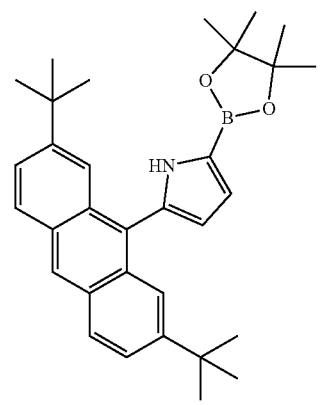

Inside a nitrogen glove box, a 250 mL round bottom flask was charged with 2-(2,7-di-tert-butylanthracen-9-yl)-1H-pyrrole (1.495 g, 0.00420 mol, 1.00 eq.) and 40 mL hexane. A 20 mL vial was charged with [Ir(COD)OMe]$_2$ (1,5-Cyclooctadiene)(methoxy)iridium(I) dimer, 0.041 g, 6.307×10$^{-5}$ mol, 0.015 eq.) and 10 mL hexane. HBpin (4,4,5,5-Tetramethyl-1,3,2-dioxaborolane, 0.915 mL, 0.00631 mol 1.5 eq.) was added, followed by 4,4'-di-tert-butyl-2,2'-bipyridine (dtbbpy, 0.034 g, 1.261×10$^{-4}$ mol, 0.03 eq.). The mixture stirred for 6 minutes and was added to the pyrrole-containing flask. The flask was connected to a coiled condenser and was stirred at 60° C. overnight. After 19 hours, the solution was allowed to cool. The reaction was diluted with 70 mL ethyl acetate and slowly quenched by slowly adding approximately 10 mL methanol. The reaction was allowed to stir for 20 minutes. The volatiles were removed by rotary evaporation. The residue was purified by chromatography on silica gel (0 to 90% dichloromethane in hexanes). Product was isolated as a yellow-orange solid (1.063 g, 53%).

$^1$H NMR (400 MHz, CDCl$_3$) δ 8.89 (s, 1H), 8.35 (s, 1H), 7.93 (d, J=8.9 Hz, 2H), 7.88-7.79 (m, 2H), 7.53 (dd, J=8.9, 1.9 Hz, 2H), 7.11 (dd, J=3.5, 2.5 Hz, 1H), 6.58 (dd, J=3.5, 2.4 Hz, 1H), 1.35 (d, J=2.2 Hz, 30H).

$^{13}$C NMR (101 MHz, CDCl$_3$) δ 147.89, 132.86, 131.37, 129.70, 128.00, 127.47, 126.20, 124.33, 120.73, 120.70, 120.68, 112.87, 83.52, 35.09, 30.86, 24.79.

UP-LCMSL: (M+1) 482.2

Example 12

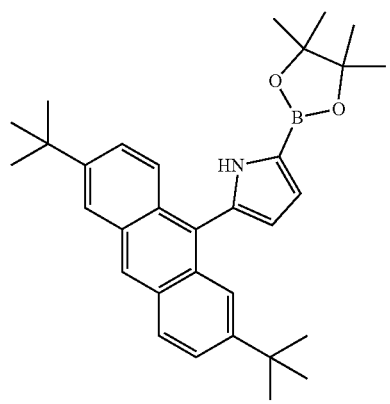

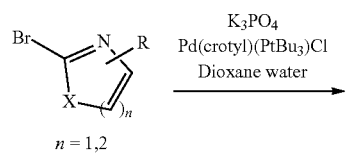

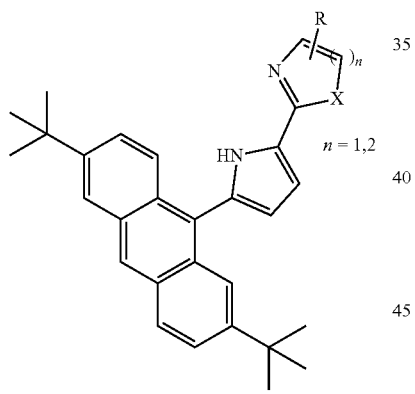

Inside a nitrogen glove box, a 45 mL vial with septa cap, was charged with 0.160 g 2-(2,6-di-tert-butylanthracen-9-yl)-5-(4,4,5,5-tetramethyl-1,3,2-dioxaborolan-2-yl)-1H-pyrrole (Anthracene-pyrrole-boronic ester). The anthracene-pyrrole-boronic ester has a 15% impurity, therefor it is assumed to be 0.136 g, $2.824 \times 10^{-4}$ mol, 1.25 eq. The vial was also charged with bromo or iodo-heterocycle ($2.260 \times 10^{-4}$ mol, 1.00 eq.), 0.180 g potassium phosphate tribasic ($8.474 \times 10^{-4}$ mol, 3.00 eq.), and 0.007 g Pd(crotyl)(P-tBu$_3$)Cl ($1.695 \times 10^{-5}$ mol, 0.06 eq.). The vial was then charged with 6 mL 1,4-dioxane and 2 mL water The reaction was heated to 92° C. and stirred overnight. After 16-18 hours, the reaction was taken up in 15 mL water and 15 mL brine. The organics were extracted off with ethyl acetate (30 mL×2). The combined organics were dried over magnesium sulfate, filtered, and concentrated. Column purification using 15-60% dichloromethane in hexane.

Example 13—General Synthesis for Ligands

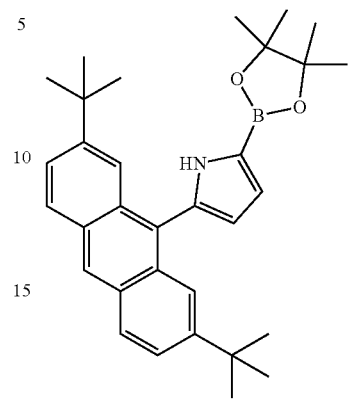

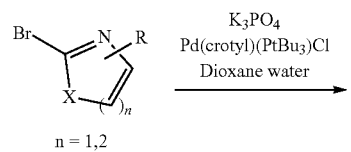

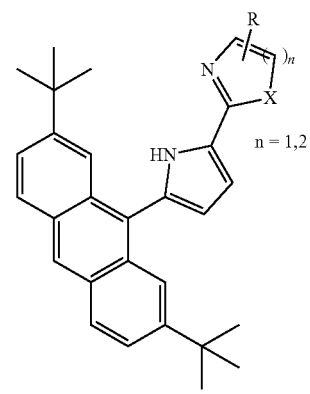

Inside a nitrogen glove box, a 45 mL vial with septa cap, was charged with 0.160 g 2-(2,7-di-tert-butylanthracen-9-yl)-5-(4,4,5,5-tetramethyl-1,3,2-dioxaborolan-2-yl)-1H-pyrrole (Anthracene-pyrrole-boronic ester). The antracene-pyrrole-boronic ester has a 15% impurity, therefor it is assumed to be 0.136 g, $2.824 \times 10^{-4}$ mol, 1.25 eq. The vial was also charged with bromo or iodo-heterocycle ($2.260 \times 10^{-4}$ mol, 1.00 eq.), 0.180 g potassium phosphate tribasic ($8.474 \times 10^{-4}$ mol, 3.00 eq.), and 0.007 g Pd(crotyl)(P-tBu$_3$)Cl ($1.695 \times 10^{-5}$ mol, 0.06 eq.). The vial was then charged with 6 mL 1,4-dioxane and 2 mL water The reaction was heated to 92° C. and stirred overnight. After 16-18 hours, the reaction was taken up in 15 mL water and 15 mL brine. The organics were extracted off with ethyl acetate (30 mL×2). The combined organics were dried over magnesium sulfate, filtered, and concentrated.

Column purification using 15-60% dichloromethane in hexane.

TABLE 1

Final Characterization of Ligands-Prepared According to Example 13

| Final Compound | Yield | Characterization |
|---|---|---|
| (structure: 2,7-di-tert-butylanthracene linked to pyrrole-pyridine) | orange solid (0.170 g, 63%). | $^1$H NMR (400 MHZ, CDCl$_3$) δ 9.82 (s, 1H), 8.39 (s, 1H), 8.35 (dt, J = 4.9, 1.4 Hz, 1H), 7.98 (s, 1H), 7.95 (dd, J = 9.1, 2.6 Hz, 2H), 7.88 (d, J = 2.0 Hz, 1H), 7.66-7.60 (m, 2H), 7.55 (dd, J = 8.9, 1.9 Hz, 1H), 7.49 (dd, J = 9.3, 2.0 Hz, 1H), 6.99-6.93 (m, 2H), 6.53 (t, J = 3.1 Hz, 1H), 1.43 (s, 9H), 1.34 (s, 9H). $^{13}$C NMR (101 MHZ, CDCl$_3$) δ 150.63, 148.90, 147.72, 147.11, 136.31, 131.76, 131.18, 131.14, 130.22, 130.14, 129.97, 127.89, 127.16, 126.70, 126.22, 125.28, 124.58, 122.46, 120.75, 120.18, 117.81, 113.27, 107.87, 35.09, 34.78, 30.92, 30.88. UP-LCMS: (M + 1) 433.4 |
| (structure: 2,7-di-tert-butylanthracene linked to pyrrole-N-methylbenzimidazole) | brown solid, (0.072 g, 65 %). | $^1$H NMR (400 MHZ, CDCl$_3$) δ 11.77 (s, 1H), 8.15 (s, 1H), 7.88 (s, 1H), 7.83 (d, J = 8.9 Hz, 1H), 7.80-7.73 (m, 2H), 7.54 (d, J = 9.0 Hz, 1H), 7.45 (d, J = 9.3 Hz, 1H), 7.14-7.00 (m, 3H), 6.90 (d, J = 3.6 Hz, 1H), 6.72 (t, J = 7.4 Hz, 1H), 6.54 (d, J = 3.6 Hz, 1H), 3.75 (s, 3H), 1.50 (s, 9H), 1.41 (s, 9H). $^{13}$C NMR (101 MHz, CDCl$_3$) δ 147.47, 147.07, 146.60, 141.74, 135.66, 131.77, 131.24, 130.60, 130.28, 129.74, 128.01, 126.62, 126.59, 126.23, 124.96, 124.31, 122.34, 122.21, 121.81, 121.29, 120.72, 118.03, 112.67, 110.70, 108.06, 35.11, 34.83, 31.17, 31.11, 30.98. UP-LCMS (M + 1) 486.56 |
| (structure: 2,7-di-tert-butylanthracene linked to pyrrole-benzothiazole) | yellow solid foam, (0.250 g, 80%) | $^1$H NMR (400 MHZ, CDCl$_3$) δ 10.70 (s, 1H), 8.20 (s, 1H), 7.90-7.76 (m, 4H), 7.64 (d, J = 8.1 Hz, 1H), 7.53 (dd, J = 8.9, 1.9 Hz, 1H), 7.46-7.37 (m, 2H), 7.09 (td, J = 8.2, 7.7, 1.1 Hz, 1H), 7.02 (dd, J = 3.6, 2.6 Hz, 1H), 6.92 (ddd, J = 8.3, 7.2, 1.2 Hz, 1H), 6.52 (dd, J = 3.7, 2.5 Hz, 1H), 1.46 (s, 9H), 1.35 (s, 9H). $^{13}$C NMR (101 MHZ, CDCl$_3$) δ 160.19, 152.76, 147.92, 146.99, 133.46, 132.62, 131.10, 130.81, 130.11, 129.81, 127.96, 127.08, 126.64, 125.96, 125.80, 125.56, 125.41, 124.43, 123.79, 122.43, 121.34, 120.83, 120.40, 113.40, 113.24, 35.10, 34.79, 30.96, 30.90. UP-LCMS (M + 1) 489.3 |

TABLE 1-continued

Final Characterization of Ligands-Prepared According to Example 13

| Final Compound | | Yield | Characterization |
|---|---|---|---|
| 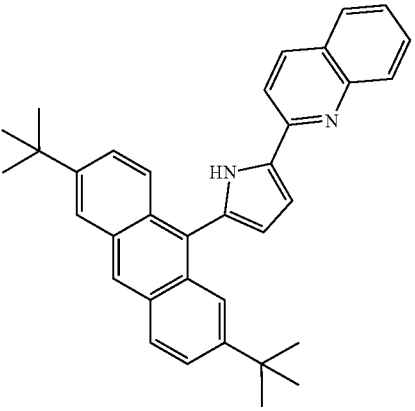 [SMILES: CC(C)(C)c1ccc2c(-c3ccc(-c4ccc5ccccc5n4)[nH]3)c3cc(C(C)(C)C)ccc3cc2c1] | | yellow solid, (0.200 g, 66%) | $^1$H NMR (400 MHZ, CDCl$_3$) δ 10.33 (s, 1H), 8.35 (s, 1H), 8.03-7.84 (m, 5H), 7.76 (d, J = 8.4 Hz, 1H), 7.69 (d, J = 8.7 Hz, 1H), 7.63 (dd, J = 8.0, 1.4 Hz, 1H), 7.54 (dd, J = 8.9, 1.9 Hz, 1H), 7.50-7.42 (m, 2H), 7.29 (ddd, J = 8.0, 6.8, 1.2 Hz, 1H), 7.10 (dd, J = 3.6, 2.4 Hz, 1H), 6.55 (dd, J = 3.6, 2.7 Hz, 1H), 1.45 (s, 9H), 1.34 (s, 9H). $^{13}$C NMR (101 MHz, CDCl$_3$) δ 150.10, 147.74, 147.69, 147.08, 136.03, 132.23, 131.22, 131.11, 131.09, 130.18, 130.05, 129.36, 128.28, 127.89, 127.34, 127.03, 126.77, 126.47, 126.24, 125.30, 124.90, 124.54, 122.48, 120.79, 117.30, 113.34, 109.86, 35.08, 34.80, 30.96, 30.88. UP-LCMS (M + 1) 483.4 |
| 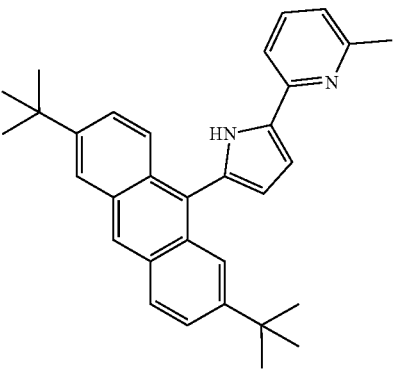 [SMILES: Cc1cccc(-c2ccc(-c3c4ccc(C(C)(C)C)cc4cc4ccc(C(C)(C)C)cc34)[nH]2)n1] | | brown solid foam, (0.172 g, 62%) | $^1$H NMR (400 MHZ, CDCl$_3$) δ 9.86 (s, 1H), 8.39 (s, 1H), 8.01-7.92 (m, 3H), 7.89 (d, J = 1.9 Hz, 1H), 7.58-7.46 (m, 3H), 7.42 (d, J = 7.9 Hz, 1H), 6.93 (dd, J = 3.6, 2.5 Hz, 1H), 6.82 (d, J = 7.5 Hz, 1H), 6.55-6.48 (m, 1H), 2.39 (s, 3H), 1.44 (s, 9H), 1.34 (s, 9H). $^{13}$C NMR (101 MHz, CDCl$_3$) δ 157.58, 149.90, 147.66, 147.11, 136.54, 132.03, 131.20, 131.18, 130.25, 130.16, 129.48, 127.89, 127.40, 126.64, 126.35, 125.20, 124.56, 122.47, 120.90, 119.60, 114.71, 113.16, 107.53, 35.09, 34.79, 30.94, 30.90, 24.40. UP-LCMS: (M + 1) 447.8 |
| 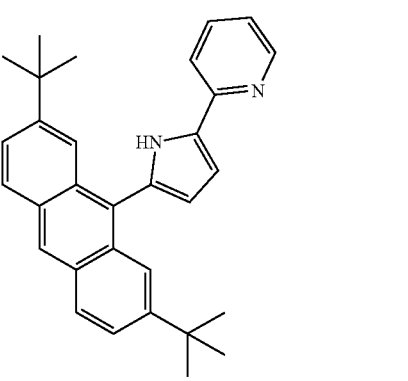 [SMILES: CC(C)(C)c1ccc2cc3ccc(C(C)(C)C)cc3c(-c3ccc(-c4ccccn4)[nH]3)c2c1] | | yellow solid foam, (0.087 g, 64% yield) | $^1$H NMR (400 MHZ, CDCl$_3$) δ 9.78 (s, 1H), 8.36 (d, J = 5.9 Hz, 2H), 8.01-7.87 (m, 4H), 7.67-7.56 (m, 2H), 7.53 (dd, J = 8.9, 1.9 Hz, 2H), 7.02-6.92 (m, 2H), 6.56 (t, J = 3.2 Hz, 1H), 1.33 (s, 18H). $^{13}$C NMR (101 MHz, CDCl$_3$) δ 150.67, 148.94, 147.91, 136.25, 131.71, 131.54, 129.95, 129.71, 128.00, 127.37, 126.28, 124.35, 120.72, 120.14, 117.78, 113.30, 107.90, 35.10, 30.88. UP-LCMS (M + 1) 433.91 |
| 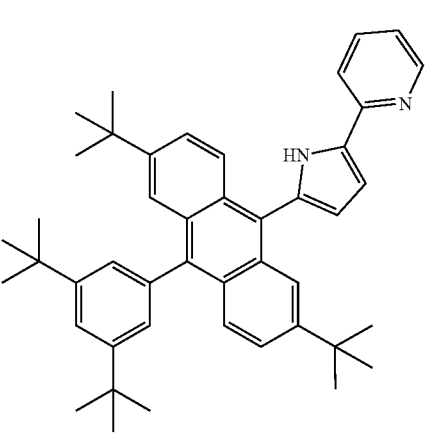 [SMILES: CC(C)(C)c1cc(-c2c3cc(C(C)(C)C)ccc3c(-c3ccc(-c4ccccn4)[nH]3)c3cc(C(C)(C)C)ccc23)cc(C(C)(C)C)c1] | | yellow solid foam, (0.125 g, 67%) | $^1$H NMR (400 MHZ, CDCl$_3$) δ 10.45 (s, 1H), 8.09 (d, J = 4.9 Hz, 1H), 7.98 (d, J = 9.2 Hz, 2H), 7.67 (d, J = 2.0 Hz, 2H), 7.55 (t, J = 1.8 Hz, 1H), 7.51-7.41 (m, 4H), 7.33 (d, J = 1.9 Hz, 2H), 6.91 (t, J = 3.0 Hz, 1H), 6.69 (q, J = 4.5 Hz, 1H), 6.52 (t, J = 3.0 Hz, 1H), 1.42 (s, 21H), 1.28 (s, 18H). $^{13}$C NMR (101 MHZ, CDCl$_3$) δ 150.59, 150.37, 148.65, 146.84, 138.90, 137.89, 136.12, 131.86, 130.59, 129.95, 129.78, 126.90, 126.44, 125.94, 124.53, 121.55, 120.55, 119.81, 117.66, 113.30, 107.99, 35.09, 34.97, 31.72, 30.96. UP-LCMS (M + 1) 621.3 |

TABLE 1-continued

Final Characterization of Ligands-Prepared According to Example 13

| Final Compound | Yield | Characterization |
|---|---|---|
| 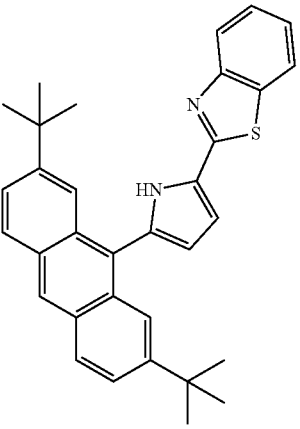 [SMILES: CC(C)(C)c1ccc2cc3ccc(C(C)(C)C)cc3c(-c3ccc(-c4nc5ccccc5s4)[nH]3)c2c1] | orange solid foam, (0.105 g, 69%) | ¹H NMR (400 MHZ, CDCl₃) δ 10.00 (s, 1H), 8.28 (s, 1H), 7.89 (d, J = 9.0 Hz, 2H), 7.80 (s, 2H), 7.77-7.68 (m, 1H), 7.68-7.57 (m, 1H), 7.53 (dd, J = 8.9, 1.9 Hz, 2H), 7.27-7.15 (m, 2H), 7.09 (t, J = 3.0 Hz, 1H), 6.54 (dd, J = 3.6, 2.5 Hz, 1H), 1.34 (s, 18H). ¹³C NMR (101 MHZ, CDCl₃) δ 159.98, 153.41, 148.24, 133.79, 132.49, 131.63, 129.49, 128.07, 126.85, 126.53, 126.17, 125.98, 124.42, 124.08, 121.52, 121.20, 120.28, 113.56, 113.14, 30.87. UP-LCMS (M + 1) 489.3 |
| 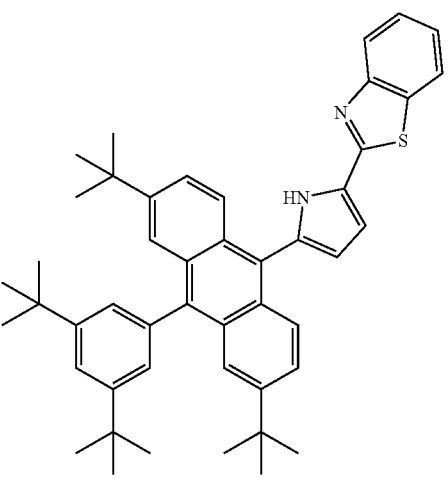 [SMILES: CC(C)(C)c1cc(-c2c3cc(C(C)(C)C)ccc3c(-c3ccc(-c4nc5ccccc5s4)[nH]3)c3ccc(C(C)(C)C)cc23)cc(C(C)(C)C)c1] | yellow solid, (0.111 g, 73%) | ¹H NMR (400 MHZ, CDCl₃) δ 12.41 (s, 1H), 7.95 (d, J = 9.2 Hz, 2H), 7.56-7.45 (m, 4H), 7.39 (dd, J = 9.2, 2.0 Hz, 2H), 7.15 (s, 2H), 7.05 (d, J = 8.1 Hz, 1H), 6.94 (t, J = 2.9 Hz, 1H), 6.83 (t, J = 7.8 Hz, 1H), 6.52 (t, J = 3.1 Hz, 1H), 6.36 (t, J = 7.4 Hz, 1H), 1.48 (s, 18H), 1.31 (s, 18H). ¹³C NMR (101 MHZ, CDCl₃) δ 160.59, 151.77, 150.02, 146.32, 138.52, 137.71, 133.52, 132.69, 129.46, 129.30, 126.67, 125.98, 125.58, 124.78, 124.30, 123.13, 121.51, 121.20, 120.35, 120.10, 113.53, 113.37, 34.87, 31.71, 30.96. HR-LCMS: 677.3, 677.3 |
| 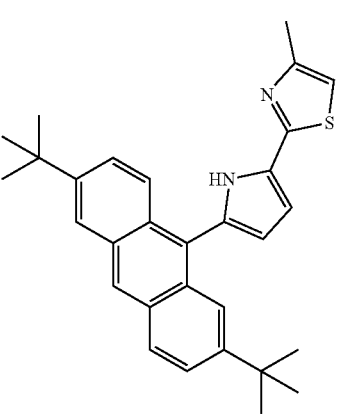 [SMILES: Cc1csc(-c2ccc(-c3c4ccc(C(C)(C)C)cc4cc4ccc(C(C)(C)C)cc34)[nH]2)n1] | brown solid, (0.036 g, 31%) | ¹H NMR (400 MHZ, CDCl₃) δ 10.09 (s, 1H), 8.37 (s, 1H), 7.97-7.89 (m, 2H), 7.85 (s, 1H), 7.80 (d, J = 9.2 Hz, 1H), 7.54 (dd, J = 8.9, 1.9 Hz, 1H), 7.44 (dd, J = 9.2, 2.0 Hz, 1H), 6.86 (t, J = 3.1 Hz, 1H), 6.46 (t, J = 3.1 Hz, 1H), 6.39 (s, 1H), 2.04 (s, 3H), 1.44 (s, 9H), 1.33 (s, 9H). ¹³C NMR (101 MHz, CDCl₃) δ 160.20, 152.08, 147.80, 147.15, 131.23, 131.10, 130.49, 130.30, 130.04, 127.87, 127.08, 126.88, 126.59, 126.05, 125.37, 124.56, 122.40, 120.66, 112.96, 110.24, 110.14, 35.08, 34.79, 30.94, 30.87, 16.48. UP-LCMS (M + 1) 453.3 |

TABLE 1-continued

Final Characterization of Ligands-Prepared According to Example 13

| Final Compound | Yield | Characterization |
| --- | --- | --- |
| (structure: 2,6-di-tert-butylanthracene bearing pyrrole linked to 1-methylpyrazole) | yellow solid, (0.092 g, 84%) | $^1$H NMR (400 MHZ, Benzene-d6) δ 10.32 (s, 1H), 8.46 (s, 1H), 8.34 (s, 1H), 8.26 (d, J = 9.2 Hz, 1H), 8.06-7.92 (m, 2H), 7.59 (dd, J = 8.9, 1.9 Hz, 1H), 7.41 (dd, J = 9.3, 2.0 Hz, 1H), 6.96 (t, J = 2.9 Hz, 1H), 6.77 (t, J = 3.0 Hz, 1H), 6.36 (d, J = 2.2 Hz, 1H), 6.17 (d, J = 2.3 Hz, 1H), 2.86 (s, 3H), 1.49 (s, 9H), 1.40 (s, 9H).<br>$^{13}$C NMR (101 MHZ, Benzene-d6) δ 147.64, 147.24, 146.13, 132.16, 131.91, 131.33, 130.82, 130.66, 128.70, 127.61, 127.44, 126.69, 125.43, 124.81, 122.55, 121.82, 112.58, 107.15, 101.45, 37.58, 35.18, 34.85, 31.12, 31.07.<br>UP-LCMS (M + 1) 436.3 |
| (structure: 2,6-di-tert-butylanthracene bearing pyrrole linked to 1-methylindazole) | yellow solid, (0.108 g, 98%) | $^1$H NMR (400 MHZ, CDCl$_3$) δ 9.74 (s, 1H), 8.37 (s, 1H), 8.14-8.07 (m, 2H), 8.01 (dd, J = 11.1, 9.1 Hz, 2H), 7.88 (d, J = 2.0 Hz, 1H), 7.62 (dd, J = 8.9, 1.9 Hz, 1H), 7.53 (dd, J = 9.3, 2.0 Hz, 1H), 7.47 (t, J = 7.3 Hz, 1H), 7.32 - 7.27 (m, 2H), 7.10 (t, J = 3.0 Hz, 1H), 6.65 (t, J = 3.1 Hz, 1H), 3.84 (s, 3H), 1.51 (s, 9H), 1.43 (s, 9H).<br>$^{13}$C NMR (101 MHZ, CDCl$_3$) δ 147.67, 147.04, 141.14, 137.66, 131.34, 131.17, 130.45, 130.13, 128.42, 127.96, 127.46, 126.61, 126.45, 126.41, 125.92, 125.22, 124.57, 122.48, 121.49, 121.01, 120.58, 120.48, 112.47, 108.97, 107.87, 35.17, 35.09, 34.84, 31.03, 31.00.<br>UP-LCMS (M + 1) 486.3 |
| (structure: 2,6-di-tert-butylanthracene bearing pyrrole linked to 4,5-dimethylthiazole) | yellow solid, (0.085 g, 80%) | $^1$H NMR (400 MHZ, CDCl$_3$) δ 10.72 (s, 1H), 8.35 (s, 1H), 7.96 (d, J = 9.0 Hz, 1H), 7.89 (d, J = 15.1 Hz, 2H), 7.73 (d, J = 9.2 Hz, 1H), 7.56 (dd, J = 8.9, 1.9 Hz, 1H), 7.43 (dd, J = 9.2, 2.0 Hz, 1H), 6.70 (t, J = 3.0 Hz, 1H), 6.42 (t, J = 3.1 Hz, 1H), 2.01 (s, 3H), 1.60 (s, 3H), 1.49 (s, 9H), 1.35 (s, 9H).<br>$^{13}$C NMR (101 MHz, CDCl$_3$) δ 156.77, 147.60, 147.16, 146.82, 131.34, 131.08, 130.43, 130.19, 129.94, 127.67, 127.14, 127.03, 126.63, 126.22, 125.30, 124.53, 122.71, 122.16, 120.91, 112.54, 109.82, 35.08, 34.83, 31.02, 30.90, 13.67, 10.97.<br>UP-LCMS (M + 1) 467.3 |

TABLE 1-continued

Final Characterization of Ligands-Prepared According to Example 13

| Final Compound | Yield | Characterization |
|---|---|---|
| (structure: 2,7-di-tert-butylanthracene with pyrrole and 4-fluoropyridine) | yellow solid foam, (0.093 g, 91%) | $^1$H NMR (400 MHZ, CDCl$_3$) δ 10.80 (s, 1H), 8.39 (s, 1H), 8.01-7.92 (m, 2H), 7.89 (s, 1H), 7.86-7.75 (m, 2H), 7.59 (dd, J = 8.9, 1.9 Hz, 1H), 7.46 (dd, J = 9.3, 2.0 Hz, 1H), 7.00 (dd, J = 10.4, 2.4 Hz, 1H), 6.88 (t, J = 3.0 Hz, 1H), 6.53 (t, J = 3.1 Hz, 1H), 6.22-6.13 (m, 1H), 1.50 (s, 9H), 1.38 (s, 9H).<br>$^{13}$C NMR (101 MHz, CDCl$_3$) δ 169.98, 167.40, 153.39, 153.31, 150.69, 150.61, 147.78, 147.15, 131.30, 131.13, 131.03, 130.38, 130.13, 127.89, 127.04, 126.80, 126.13, 125.25, 124.59, 122.37, 120.64, 113.30, 109.11, 107.70, 107.53, 104.46, 104.28, 35.13, 34.83, 31.04, 30.93.<br>UP-LCMS (M + 1) 451.8 |
| (structure: 2,7-di-tert-butylanthracene with pyrrole and 4-dimethylaminopyridine) | yellow solid foam, (0.099 g, 92%) | $^1$H NMR (400 MHZ, CDCl$_3$) δ 10.67 (s, 1H), 8.35 (s, 1H), 8.04 (s, 1H), 7.94 (t, J = 9.3 Hz, 2H), 7.86 (s, 1H), 7.79 (d, J = 6.0 Hz, 1H), 7.57 (dd, J = 8.9, 1.9 Hz, 1H), 7.47 (dd, J = 9.3, 2.0 Hz, 1H), 6.90 (d, J = 3.5 Hz, 1H), 6.72 (d, J = 2.5 Hz, 1H), 6.51 (d, J = 3.5 Hz, 1H), 5.96 (dd, J = 6.1, 2.5 Hz, 1H), 3.02 (s, 6H), 1.48 (s, 9H), 1.39 (s, 9H).<br>$^{13}$C NMR (101 MHz, CDCl$_3$) δ 154.59, 150.56, 148.45, 147.40, 146.98, 132.43, 131.32, 131.22, 130.46, 130.20, 129.45, 127.82, 127.75, 126.54, 126.41, 125.09, 124.48, 122.22, 121.10, 112.77, 106.95, 104.19, 99.80, 39.17, 35.11, 34.81, 31.02, 30.98.<br>UP-LCMS (M + 1) 476.4 |
| (structure: 2,7-di-tert-butylanthracene with pyrrole and 4-methoxypyridine) | green-yellow solid foam, (0.089 g, 89%) | $^1$H NMR (400 MHZ, CDCl$_3$) δ 10.81 (s, 1H), 8.37 (s, 1H), 8.01 (s, 1H), 7.97 (d, J = 8.9 Hz, 1H), 7.88 (d, J = 9.5 Hz, 2H), 7.78 (d, J = 5.7 Hz, 1H), 7.58 (dd, J = 9.0, 1.9 Hz, 1H), 7.46 (dd, J = 9.2, 2.0 Hz, 1H), 6.89 (t, J = 3.0 Hz, 2H), 6.52 (t, J = 3.0 Hz, 1H), 6.08 (dd, J = 5.8, 2.4 Hz, 1H), 3.85 (s, 3H), 1.50 (s, 9H), 1.39 (s, 9H).<br>$^{13}$C NMR (101 MHz, CDCl$_3$) δ 165.66, 152.11, 149.63, 147.57, 147.05, 131.76, 131.32, 131.17, 130.44, 130.17, 127.81, 127.50, 126.55, 126.36, 125.15, 124.52, 122.24, 120.90, 113.00, 107.95, 106.82, 102.48, 54.95, 35.12, 34.82, 31.04, 30.97.<br>UP-LCMS (M + 1) 463.8 |
| (structure: 2,7-di-tert-butylanthracene with pyrrole and 3,5-dimethylpyridine) | yellow solid foam, (0.094 g, 90%) | $^1$H NMR (400 MHZ, CDCl$_3$) δ 10.55 (s, 1H), 8.44 (s, 1H), 8.13 (s, 1H), 8.07 (d, J = 9.5 Hz, 2H), 8.01 (d, J = 8.9 Hz, 1H), 7.95 (d, J = 2.0 Hz, 1H), 7.62 (dd, J = 8.9, 1.9 Hz, 1H), 7.54 (dd, J = 9.3, 2.0 Hz, 1H), 7.26 (s, 1H), 6.92 (t, J = 3.0 Hz, 1H), 6.65 (t, J = 3.2 Hz, 1H), 2.60 (s, 3H), 2.18 (s, 3H), 1.52 (s, 9H), 1.43 (s, 9H).<br>$^{13}$C NMR (101 MHz, CDCl$_3$) δ 147.63, 147.07, 146.53, 146.49, 139.60, 131.64, 131.30, 131.24, 130.36, 130.26, 129.21, 128.98, 127.99, 127.75, 127.71, 126.57, 126.54, 125.14, 124.58, 122.50, 121.08, 113.15, 110.63, 35.17, 34.85, 31.06, 31.03, 21.31.<br>UP-LCMS (M + 1) 461.9 |

TABLE 1-continued

Final Characterization of Ligands-Prepared According to Example 13

| Final Compound | Yield | Characterization |
|---|---|---|
| | yellow HN solid foam, (0.085 g, 84%) | $^1$H NMR (400 MHZ, CDCl$_3$) δ 10.60 (s, 1H), 8.38 (s, 1H), 8.01 (s, 1H), 7.97 (d, J = 8.9 Hz, 1H), 7.94-7.84 (m, 3H), 7.58 (dd, J = 8.9, 1.9 Hz, 1H), 7.47 (dd, J = 9.2, 2.0 Hz, 1H), 7.27 (d, J = 1.7 Hz, 1H), 6.92 (t, J = 3.0 Hz, 1H), 6.53 (t, J = 3.1 Hz, 1H), 6.42 (d, J = 4.9 Hz, 1H), 2.30 (s, 3H), 1.49 (s, 9H), 1.39 (s, 9H). $^{13}$C NMR (101 MHZ, CDCl$_3$) δ 150.43, 148.23, 147.59, 147.09, 146.93, 131.90, 131.35, 131.18, 130.42, 130.20, 130.05, 127.83, 127.57, 126.46, 126.40, 125.17, 124.56, 122.26, 121.02, 120.94, 118.28, 113.09, 107.82, 35.14, 34.84, 31.06, 30.98, 21.13. UP-LCMS (M + 1) 447.8 |
| | yellow solid, HN (0.107 g, 91%) | $^1$H NMR (400 MHZ, CDCl$_3$) δ 10.60 (s, 1H), 8.44 (s, 1H), 7.99 (d, J = 9.0 Hz, 1H), 7.93 (s, 1H), 7.79 (t, J = 4.6 Hz, 2H), 7.66-7.54 (m, 3H), 7.44 (dd, J = 9.2, 2.0 Hz, 1H), 7.21-7.10 (m, 3H), 6.98-6.88 (m, 2H), 6.48 (t, J = 3.0 Hz, 1H), 1.52 (s, 9H), 1.36 (s, 9H). $^{13}$C NMR (101 MHZ, CDCl$_3$) δ 160.93, 154.47, 147.59, 147.10, 133.82, 131.30, 131.17, 130.94, 130.27, 130.13, 128.38, 127.78, 126.99, 126.85, 126.50, 126.04, 125.84, 125.38, 124.62, 122.44, 120.58, 113.10, 110.67, 109.63, 35.08, 34.87, 31.07, 30.90. UP-LCMS (M + 1) 515.4 |
| | yellow solid, (0.098 g, 88%) | $^1$H NMR (400 MHZ, CDCl$_3$) δ 10.95 (s, 1H), 8.35 (s, 1H), 8.11 (s, 1H), 7.97 (d, J = 9.1 Hz, 2H), 7.88 (d, J = 5.3 Hz, 1H), 7.84 (s, 1H), 7.60 (dd, J = 8.9, 1.9 Hz, 1H), 7.52-7.43 (m, 2H), 6.98 (t, J = 3.0 Hz, 1H), 6.64-6.53 (m, 2H), 1.50 (s, 9H), 1.41 (s, 9H), 1.36 (s, 9H). $^{13}$C NMR (101 MHz, CDCl$_3$) δ 159.78, 150.43, 148.17, 147.58, 146.95, 132.27, 131.28, 131.03, 130.43, 130.13, 130.07, 127.84, 127.63, 126.57, 126.40, 125.11, 124.50, 122.33, 120.97, 117.24, 114.25, 112.99, 107.74, 35.15, 34.81, 34.61, 31.03, 30.48. UP-LCMS (M + 1) 489.9 |

TABLE 1-continued

Final Characterization of Ligands-Prepared According to Example 13

| Final Compound | Yield | Characterization |
|---|---|---|
| | yellow solid, (0.095 g, 88%) | $^1$H NMR (400 MHZ, CDCl$_3$) δ 9.19 (s, 1H), 8.42 (s, 1H), 8.11 (s, 1H), 8.07 (d, J = 9.3 Hz, 1H), 7.99 (d, J = 8.9 Hz, 1H), 7.93 (s, 1H), 7.59 (d, J = 8.9 Hz, 1H), 7.53 (d, J = 9.2 Hz, 1H), 7.48 (d, J = 2.4 Hz, 1H), 6.73 (t, J = 3.0 Hz, 1H), 6.52 (t, J = 3.1 Hz, 1H), 6.44 (d, J = 2.3 Hz, 1H), 1.57 (s, 9H), 1.49 (s, 9H), 1.40 (s, 9H). $^{13}$C NMR (101 MHz, CDCl$_3$) δ 147.60, 147.12, 144.67, 131.33, 131.26, 130.37, 130.29, 127.94, 127.90, 127.30, 127.25, 126.66, 126.63, 126.40, 125.10, 124.55, 122.50, 121.17, 112.24, 106.08, 100.67, 58.21, 35.15, 34.83, 31.00, 29.82. HR-LCMS (M + 1) 478.3 |
| | yellow solid, (0.095 g, 90%) | $^1$H NMR (400 MHZ, CDCl$_3$) δ 10.77 (s, 1H), 8.35 (s, 1H), 8.05 (s, 1H), 7.95 (t, J = 9.7 Hz, 2H), 7.86 (s, 1H), 7.63 (s, 1H), 7.58 (dd, J = 9.0, 1.9 Hz, 1H), 7.46 (dd, J = 9.2, 2.0 Hz, 1H), 7.10 (q, J = 3.5 Hz, 1H), 6.99 (d, J = 11.6 Hz, 1H), 6.59 (t, J = 3.1 Hz, 1H), 1.92 (s, 3H), 1.48 (s, 9H), 1.39 (s, 9H). $^{13}$C NMR (101 MHz, CDCl$_3$) δ 147.74, 147.19, 144.39, 144.35, 131.17, 131.15, 130.57, 130.54, 130.28, 130.11, 130.03, 127.89, 127.38, 127.33, 127.26, 126.53, 126.25, 125.13, 124.54, 123.51, 123.33, 122.34, 120.85, 113.45, 113.42, 111.87, 111.75, 35.14, 34.81, 31.03, 30.98, 17.43. UP-LCMS (M + 1) 465.5 |
| | yellow solid, (0.086 g, 71%) | $^1$H NMR (400 MHZ, CDCl$_3$) δ 10.28 (s, 1H), 8.41 (s, 1H), 8.07 (s, 1H), 7.98 (d, J = 8.9 Hz, 1H), 7.95-7.84 (m, 3H), 7.55 (dtd, J = 22.0, 9.1, 2.0 Hz, 3H), 6.61 (t, J = 3.3 Hz, 1H), 1.48 (s, 9H), 1.38 (s, 9H). $^{13}$C NMR (101 MHz, CDCl$_3$) δ 148.10, 147.20, 146.55, 145.76, 141.78, 131.71, 131.13, 131.02, 130.12, 130.09, 128.11, 128.06, 127.04, 126.40, 126.20, 125.97, 125.47, 125.16, 124.72, 122.66, 120.39, 114.80, 113.95, 35.15, 34.84, 30.99, 30.95. UP-LCMS (M+0) 535.37, (M + 2) 537.36 |

TABLE 1-continued

Final Characterization of Ligands-Prepared According to Example 13

| Final Compound | Yield | Characterization |
|---|---|---|
| | orange solid, (0.050 g, 49%) | ¹H NMR (400 MHZ, CDCl₃) δ 10.57 (s, 1H), 8.35 (s, 1H), 8.05 (s, 1H), 7.96 (d, J = 9.1 Hz, 2H), 7.89 (s, 1H), 7.85 (s, 1H), 7.57 (dd, J = 8.9, 1.9 Hz, 1H), 7.46 (dd, J = 9.3, 2.0 Hz, 1H), 7.37 (d, J = 8.2 Hz, 1H), 7.29-7.24 (m, 1H), 6.88 (t, J = 3.0 Hz, 1H), 6.52 (t, J = 3.0 Hz, 1H), 2.00 (s, 3H), 1.47 (s, 9H), 1.38 (s, 9H).<br>¹³C NMR (101 MHz, CDCl₃) δ 148.73, 148.11, 147.60, 147.04, 136.86, 131.95, 131.21, 131.17, 130.32, 130.14, 129.69, 129.15, 127.87, 127.58, 126.48, 126.38, 125.08, 124.50, 122.34, 120.93, 117.14, 112.98, 107.41, 35.12, 34.79, 31.01, 30.96, 17.92.<br>UP-LCMS (M + 1) 447.54 |
| | yellow solid, (0.045 g, 58%) | ¹H NMR (400 MHZ, CDCl₃) δ 9.46 (s, 1H), 8.40 (s, 1H), 7.97 (d, J = 8.9 Hz, 2H), 7.91 (s, 2H), 7.57 (dd, J = 8.9, 1.9 Hz, 2H), 6.98 (t, J = 3.0 Hz, 1H), 6.68 (s, 1H), 6.54 (t, J = 3.1 Hz, 1H), 2.37 (d, J = 1.1 Hz, 3H), 1.37 (s, 18H).<br>¹³C NMR (101 MHz, CDCl₃) δ 160.04, 152.50, 148.16, 131.69, 130.42, 129.68, 128.06, 127.04, 126.71, 126.63, 124.47, 120.53, 113.14, 110.35, 110.19, 35.15, 30.90, 16.94.<br>UP-LCMS (M + 1) 453.5 |
| | yellow solid, (0.080 g, 91%) | ¹H NMR (400 MHZ, CDCl₃) δ 9.61 (s, 1H), 8.45 (s, 1H), 8.02 (s, 1H), 7.99 (s, 3H), 7.90 (d, J = 7.5 Hz, 2H), 7.60 (d, J = 8.9 Hz, 2H), 7.39 (t, J = 7.5 Hz, 2H), 7.34-7.27 (m, 2H), 7.06 (t, J = 3.1 Hz, 1H), 6.62 (t, J = 3.1 Hz, 1H), 1.41 (s, 18H).<br>¹³C NMR (101 MHz, CDCl₃) δ 160.27, 155.10, 148.32, 134.43, 131.70, 130.66, 129.76, 128.65, 128.16, 128.01, 127.08, 126.73, 126.65, 126.29, 124.53, 120.53, 113.30, 110.51, 109.92, 35.20, 30.95.<br>UP-LCMS (M + 1) 515.47 |

TABLE 1-continued

Final Characterization of Ligands-Prepared According to Example 13

| Final Compound | Yield | Characterization |
|---|---|---|
| | yellow solid, (0.066 g, 84%) | $^1$H NMR (400 MHZ, CDCl$_3$) δ 10.16 (s, 1H), 8.39 (s, 1H), 8.15 s, 1H), 8.08 (s, 2H), 7.97 (d, J = 8.9 Hz, 2H), 7.57 (dd, J = 8.9, 1.9 Hz, 2H), 7.34 (s, 1H), 6.93 (t, J = 3.1 Hz, 1H), 6.64 (t, J = 3.2 Hz, 1H), 2.65 (s, 3H), 2.31 (s, 3H), 1.37 (s, 18H).<br>$^{13}$C NMR (101 MHz, CDCl$_3$) δ 147.82, 146.64, 146.57, 139.63, 131.53, 131.48, 129.80, 129.28, 128.79, 128.03, 127.82, 127.70, 126.10, 124.33, 120.97, 113.20, 110.47, 35.14, 30.95, 30.89, 21.25, 17.88.<br>UP-LCMS (M + 1) 461.55 |
| | yellow solid, (0.070 g, 89%) | $^1$H NMR (400 MHZ, CDCl$_3$) δ 9.93 (s, 1H), 8.39 (s, 1H), 8.17 (d, J = 5.7 Hz, 1H), 7.98 (s, 3H), 7.95 (s, 1H), 7.57 (d, J = 8.9 Hz, 2H), 7.15 (d, J = 2.4 Hz, 1H), 6.99 (t, J = 3.0 Hz, 1H), 6.58 (t, J = 3.1 Hz, 1H), 6.53 (dd, J = 5.8, 2.4 Hz, 1H), 3.91 (s, 3H), 1.37 (s, 18H).<br>$^{13}$C NMR (101 MHz, CDCl$_3$) δ 166.05, 152.30, 150.14, 147.91, 131.70, 131.64, 129.94, 129.74, 128.01, 127.47, 126.30, 124.38, 120.78, 113.21, 107.80, 107.36, 102.79, 55.06, 35.13, 30.92.<br>UP-LCMS (M + 1) 463.53 |
| | yellow solid, (0.053 g, 65%) | $^1$H NMR (400 MHZ, CDCl$_3$) δ 10.04 (s, 1H), 8.37 (s, 1H), 8.05 (d, J = 5.9 Hz, 1H), 8.01-7.90 (m, 4H), 7.56 (d, J = 8.9 Hz, 2H), 6.98 (d, J = 3.5 Hz, 1H), 6.91 (s, 1H), 6.56 (d, J = 3.5 Hz, 1H), 6.30 (dd, J = 6.2, 2.5 Hz, 1H), 3.07 (s, 6H), 1.37 (s, 18H).<br>$^{13}$C NMR (101 MHz, CDCl$_3$) δ 154.89, 147.74, 131.66, 129.75, 127.95, 126.15, 124.34, 120.94, 112.97, 104.43, 100.05, 39.25, 35.11, 30.93.<br>UP-LCMS (M + 1) 476.59 |
| | yellow solid, (0.067 g, 88%) | $^1$H NMR (400 MHZ, CDCl$_3$) δ 9.91 (s, 1H), 8.40 (s, 1H), 8.23 (d, J = 5.0 Hz, 1H), 8.06-7.91 (m, 4H), 7.58 (dd, J = 8.9, 1.9 Hz, 2H), 7.50 (s, 1H), 7.02 (t, J = 3.0 Hz, 1H), 6.80 (d, J = 1.5 Hz, 1H), 6.60 (t, J = 3.1 Hz, 1H), 2.39 (s, 3H), 1.39 (s, 18H).<br>$^{13}$C NMR (101 MHz, CDCl$_3$) δ 150.60, 148.71, 147.90, 147.22, 131.81, 131.66, 129.86, 129.77, 128.04, 127.57, 126.27, 124.40, 121.43, 120.83, 118.53, 113.26, 107.70, 35.14, 30.94, 21.19.<br>UP-LCMS (M + 1) 447.54 |

TABLE 1-continued

Final Characterization of Ligands-Prepared According to Example 13

| Final Compound | Yield | Characterization |
| --- | --- | --- |
| | yellow solid, (0.068 g, 82%) | $^1$H NMR (400 MHZ, CDCl$_3$) δ 9.41 (s, 1H), 8.40 (s, 1H), 8.15 (d, J = 8.2 Hz, 1H), 8.09 (s, 2H), 7.99 (d, J = 8.9 Hz, 2H), 7.60 (d, J = 9.0 Hz, 2H), 7.46 (t, J = 8.2, 7.4 Hz, 1H), 7.36 (d, J = 8.3 Hz, 1H), 7.31-7.24 (m, 1H), 7.14 (t, J = 3.1 Hz, 1H), 6.69 (t, J = 2.7 Hz, 1H), 3.99 (d, J = 1.0 Hz, 3H), 1.41 (s, 18H). $^{13}$C NMR (101 MHz, CDCl$_3$) δ 147.93, 141.25, 137.68, 131.78, 129.79, 128.37, 128.08, 127.68, 126.45, 126.24, 125.90, 124.41, 121.43, 120.94, 120.70, 120.56, 112.59, 109.04, 107.83, 35.18, 30.99. UP-LCMS (M + 1) 486.49 |
| | yellow solid, (0.058 g, 75%) | $^1$H NMR (400 MHZ, CDCl$_3$) δ 9.86 (s, 1H), 8.40 (s, 1H), 8.30 (dd, J = 8.7, 5.7 Hz, 1H), 8.02-7.91 (m, 4H), 7.57 (d, J = 8.9 Hz, 2H), 7.32 (dd, J = 10.4, 2.3 Hz, 1H), 6.99 (t, J = 3.0 Hz, 1H), 6.76-6.66 (m, 1H), 6.59 (t, J = 3.2 Hz, 1H), 1.37 (d, J = 3.5 Hz, 18H). $^{13}$C NMR (101 MHz, CDCl$_3$) δ 151.38, 151.31, 148.08, 131.59, 130.73, 129.73, 128.07, 127.06, 126.50, 124.43, 120.60, 113.52, 108.88, 108.29, 108.12, 104.89, 104.71, 35.14, 30.90. HR-LCMS (M + 1) 451.25 |
| | yellow solid, (0.058 g, 78%) | $^1$H NMR (400 MHZ, CDCl$_3$) δ 9.10 (s, 1H), 8.40 (s, 1H), 8.04 (s, 2H), 7.98 (d, J = 8.9 Hz, 2H), 7.59 (d, J = 9.0 Hz, 2H), 7.33 (d, J = 2.3 Hz, 1H), 6.78 (t, J = 2.9 Hz, 1H), 6.55 (t, J = 3.0 Hz, 1H), 6.47 (d, J = 2.3 Hz, 1H), 3.85 (s, 3H), 1.40 (s, 18H). $^{13}$C NMR (101 MHZ, CDCl$_3$) δ 147.82, 145.74, 131.79, 131.17, 129.79, 128.00, 127.92, 127.78, 126.49, 126.08, 124.39, 120.99, 112.29, 106.54, 101.52, 38.72, 35.15, 30.97. UP-LCMS (M + 1) 436.53 |
| | yellow solid, (0.056 g, 73%) | $^1$H NMR (400 MHZ, CDCl$_3$) δ 9.87 (s, 1H), 8.40 (s, 1H), 8.06 (s, 2H), 7.98 (d, J = 8.9 Hz, 2H), 7.65-7.50 (m, 3H), 7.47 (d, J = 7.9 Hz, 1H), 6.98 (t, J = 2.8 Hz, 1H), 6.88 (d, J = 7.4 Hz, 1H), 6.59 (t, J = 3.3 Hz, 1H), 2.44 (s, 3H), 1.38 (s, 18H). $^{13}$C NMR (101 MHZ, CDCl$_3$) δ 157.63, 149.99, 147.93, 136.56, 132.04, 131.51, 129.81, 129.50, 128.06, 127.59, 126.22, 124.37, 120.92, 119.62, 114.73, 113.28, 107.60, 35.15, 30.94, 24.46. UP-LCMS (M + 1) 447.53 |

TABLE 1-continued

Final Characterization of Ligands-Prepared According to Example 13

| Final Compound | Yield | Characterization |
|---|---|---|
| (structure: 2,7-di-tert-butyl-anthracenyl-pyrrole-quinoline) | yellow solid, (0.080 g, 97%) | $^1$H NMR (400 MHZ, CDCl$_3$) δ 10.27 (s, 1H), 8.41 (s, 1H), 8.05 (d, J = 3.8 Hz, 2H), 8.03-7.92 (m, 3H), 7.85 (d, J = 8.4 Hz, 1H), 7.76 (d, J = 8.7 Hz, 1H), 7.71 (d, J = 8.1 Hz, 1H), 7.64-7.50 (m, 3H), 7.39 (t, J = 7.5 Hz, 1H), 7.21-7.15 (m, 1H), 6.67 (d, J = 3.5 Hz, 1H), 1.41 (s, 18H). $^{13}$C NMR (101 MHZ, CDCl$_3$) δ 150.22, 148.08, 148.01, 136.07, 132.25, 131.65, 131.30, 129.78, 129.51, 128.46, 128.16, 127.51, 126.68, 126.51, 125.04, 124.46, 120.84, 117.48, 113.50, 35.21, 31.00, 30.97, 24.88. UP-LCMS (M + 1) 483.55 |
| (structure: 2,7-di-tert-butyl-anthracenyl-pyrrole-dimethylthiazole) | yellow solid, (0.068 g, 85%) | $^1$H NMR (400 MHZ, CDCl$_3$) δ 9.62 (s, 1H), 8.38 (s, 1H), 7.96 (d, J = 8.9 Hz, 2H), 7.88 (s, 2H), 7.57 (d, J = 9.0 Hz, 2H), 6.86 (t, J = 3.1 Hz, 1H), 6.50 (t, J = 3.1 Hz, 1H), 2.30 (s, 3H), 2.11 (s, 3H), 1.37 (s, 18H). $^{13}$C NMR (101 MHz, CDCl$_3$) δ 156.31, 148.02, 147.53, 131.76, 130.05, 129.65, 127.96, 127.06, 126.98, 126.48, 124.47, 123.16, 120.64, 112.90, 109.66, 35.13, 30.91, 14.32, 11.28. UP-LCMS (M + 1) 467.46 |

General Procedure for Metal Complex Synthesis

Inside a glove box, a solution (0.5 mL, C$_6$D$_6$) of the ligand was slowly added to solid M(Bn)$_4$ (M=Zr or Hf) at room temperature. The vial was swirled after each drop to ensure mixing. After addition, the solution was transferred to an NMR tube and checked by $^1$H and $^{13}$C NMR. The sample was returned to the glovebox and all volatiles were removed. The crude product was used without further purification for batch reactor testing.

Example 14—Synthesis of Procatalyst 1

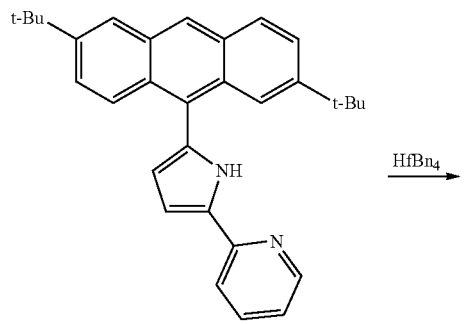

HfBn$_4$ →

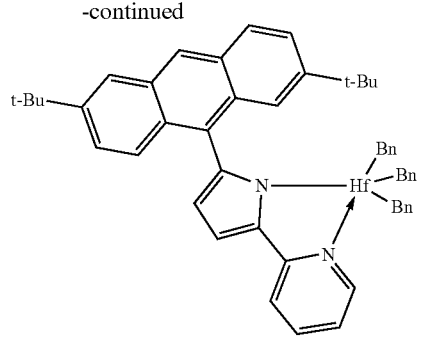

-continued

The General Procedure for Metal Complex Synthesis was used to synthesize the final procatalyst.

$^1$H NMR (400 MHz, C$_6$D$_6$) δ 8.42 (d, J=1.9 Hz, 1H), 8.26 (s, 1H), 8.19 (d, J=9.2 Hz, 1H), 7.95-7.83 (m, 2H), 7.52 (ddd, J=16.6, 9.1, 2.0 Hz, 2H), 7.21-6.91 (m, 14H), 6.89-6.62 (m, 7H), 6.53 (d, J=7.5 Hz, 1H), 6.42 (d, J=7.6 Hz, 6H), 5.94 (ddd, J=7.1, 5.7, 1.2 Hz, 1H), 1.88-1.69 (m, 6H), 1.36 (s, 9H), 1.36 (s, 9H).

$^{13}$C NMR (101 MHz, C$_6$D$_6$) δ 154.08, 147.84, 147.76, 147.10, 144.18, 143.21, 140.60, 139.08, 138.55, 137.51, 132.14, 131.66, 131.53, 131.39, 130.66, 129.91, 128.96, 128.60, 128.48, 128.43, 128.24, 128.19, 127.81, 127.56, 127.30, 127.16, 125.41, 125.32, 124.77, 124.38, 122.83, 122.49, 121.11, 117.95, 117.09, 116.90, 112.91, 89.05, 34.98, 34.55, 30.76, 30.69.

Example 15—Synthesis of Procatalyst 2

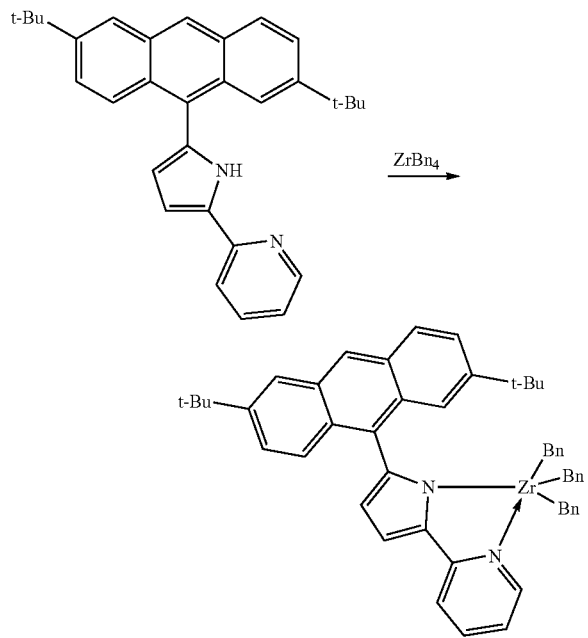

The General Procedure for Metal Complex Synthesis was used to synthesize the final procatalyst.

$^{1}$H NMR (400 MHz, $C_6D_6$) δ 8.40 (d, J=1.9 Hz, 1H), 8.27 (s, 1H), 8.15 (d, J=9.2 Hz, 1H), 7.95-7.84 (m, 2H), 7.46 (ddd, J=16.6, 9.0, 2.0 Hz, 2H), 7.19-6.83 (m, 19H), 6.80-6.65 (m, 5H), 6.43-6.32 (m, 3H), 6.30-6.22 (m, 6H), 5.98 (ddd, J=7.1, 5.7, 1.3 Hz, 1H), 2.03-1.80 (m, 6H), 1.34 (s, 9H), 1.33 (s, 9H).

$^{13}$C NMR (101 MHz, $C_6D_6$) δ 154.35, 148.06, 147.75, 147.18, 144.05, 142.99, 140.26, 139.08, 138.80, 137.51, 131.94, 131.92, 131.56, 131.46, 130.69, 130.59, 129.19, 128.96, 128.36, 128.26, 128.19, 128.04, 127.56, 126.85, 125.32, 125.26, 124.81, 124.15, 122.87, 122.52, 121.49, 117.52, 117.14, 116.49, 112.29, 78.59, 72.05, 34.93, 34.52, 30.75, 30.68.

Example 16—Synthesis of Procatalyst 16

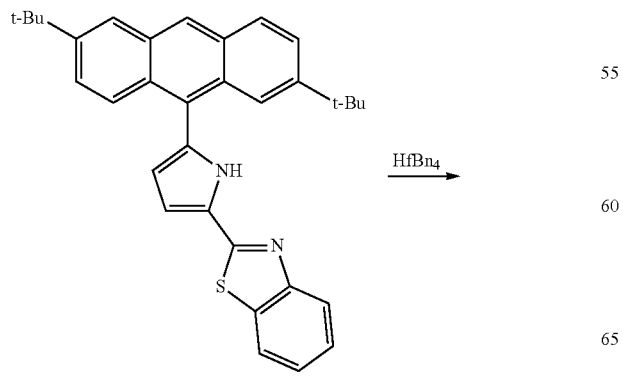

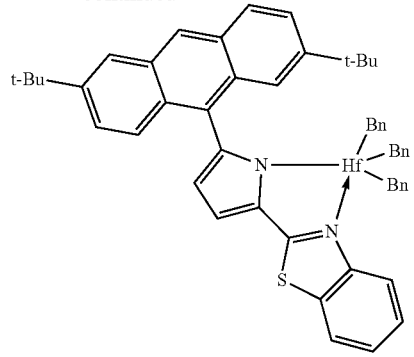

The General Procedure for Metal Complex Synthesis was used to synthesize the final procatalyst.

$^{1}$H NMR (400 MHz, $C_6D_6$) δ 8.33-8.28 (m, 1H), 8.21 (s, 1H), 8.15 (d, J=9.2 Hz, 1H), 7.95-7.85 (m, 2H), 7.63 (dd, J=9.2, 2.0 Hz, 1H), 7.56-7.49 (m, 1H), 7.19-6.83 (m, 18H), 6.80 (ddd, J=8.2, 7.1, 1.3 Hz, 1H), 6.74 (tt, J=7.4, 1.2 Hz, 3H), 6.59 (d, J=3.5 Hz, 1H), 6.45-6.37 (m, 6H), 1.97-1.84 (m, 6H), 1.40 (s, 9H), 1.39 (s, 9H).

$^{13}$C NMR (101 MHz, $C_6D_6$) δ 168.29, 149.08, 148.17, 147.18, 146.59, 143.28, 137.51, 134.67, 132.07, 131.90, 131.47, 131.39, 130.47, 130.25, 129.91, 128.96, 128.65, 128.60, 128.43, 128.19, 127.80, 127.56, 127.22, 126.77, 126.54, 125.74, 125.32, 124.80, 124.20, 123.06, 122.53, 121.40, 120.63, 120.57, 118.09, 117.59, 90.89, 35.04, 34.60, 30.79, 30.73.

Example 17—Synthesis of Procatalyst 4

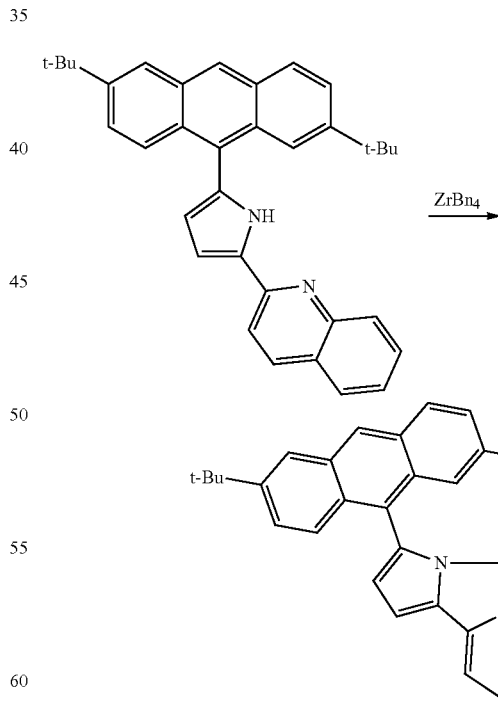

The General Procedure for Metal Complex Synthesis was used to synthesize the final procatalyst.

$^{1}$H NMR (400 MHz, $C_6D_6$) δ 8.55-8.49 (m, 1H), 8.34-8.22 (m, 2H), 7.93-7.83 (m, 2H), 7.42 (ddd, J=30.8, 9.1, 1.9 Hz, 2H), 7.33 (d, J=8.7 Hz, 1H), 7.15-6.72 (m, 21H), 6.63

(t, J=7.4 Hz, 4H), 6.32 (dd, J=7.3, 1.7 Hz, 2H), 6.19-6.10 (m, 6H), 2.05-1.90 (m, 6H), 1.26 (s, 9H), 1.25 (s, 9H). No $^{13}$C NMR was obtained.

Example 18—Synthesis of Procatalyst 20

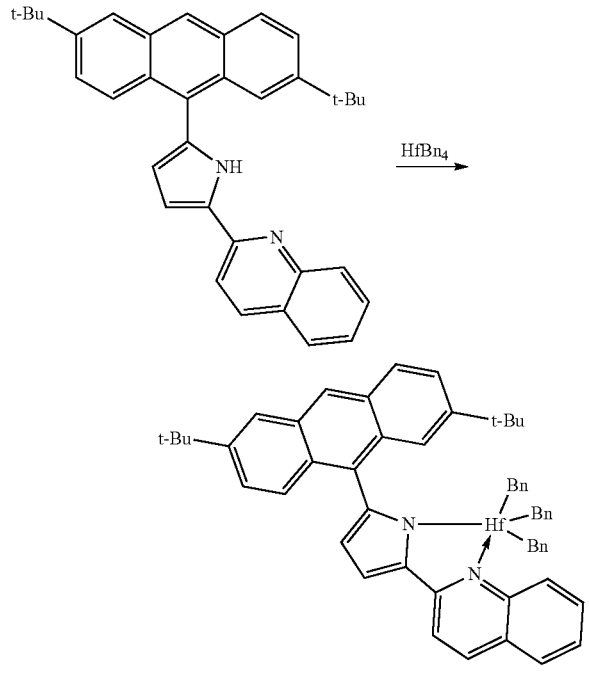

The General Procedure for Metal Complex Synthesis was used to synthesize the final procatalyst.

$^1$H NMR (400 MHz, C$_6$D$_6$) δ 8.45 (dt, J=1.8, 0.8 Hz, 1H), 8.29 (dt, J=9.3, 0.8 Hz, 1H), 8.20 (s, 1H), 7.90-7.84 (m, 2H), 7.55 (dd, J=9.2, 2.0 Hz, 1H), 7.45 (ddd, J=9.6, 8.7, 1.4 Hz, 2H), 7.14-6.85 (m, 16H), 6.82 (ddd, J=8.0, 7.0, 1.0 Hz, 1H), 6.71 (d, J=3.4 Hz, 1H), 6.66-6.59 (m, 3H), 6.36-6.29 (m, 6H), 1.97-1.79 (m, 6H), 1.33 (s, 9H), 1.31 (s, 9H). No 13C data was obtained.

Example 19—Synthesis of Procatalyst 17

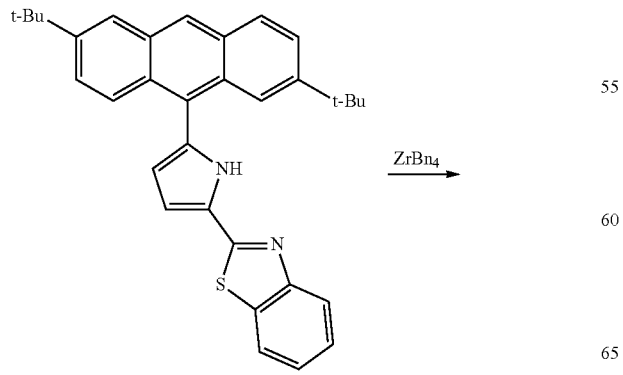

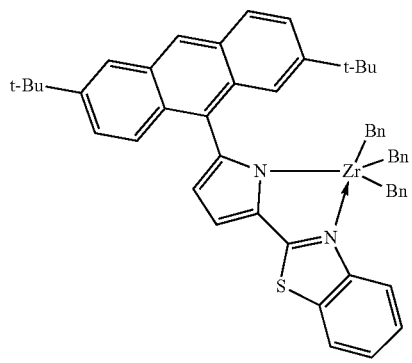

The General Procedure for Metal Complex Synthesis was used to synthesize the final procatalyst.

$^1$H NMR (400 MHz, C$_6$D$_6$) δ 8.29-8.23 (m, 1H), 8.20 (s, 1H), 7.97 (d, J=9.2 Hz, 1H), 7.89-7.81 (m, 2H), 7.46 (dd, J=9.1, 1.9 Hz, 2H), 7.12-6.92 (m, 7H), 6.87 (t, J=7.6 Hz, 7H), 6.78 (td, J=7.6, 1.0 Hz, 1H), 6.74-6.68 (m, 3H), 6.51 (d, J=3.5 Hz, 1H), 6.26-6.19 (m, 5H), 1.89 (dd, J=69.3, 10.9 Hz, 6H), 1.32 (s, 18H). No $^{13}$C data was obtained.

Example 20—Synthesis of Procatalyst 8

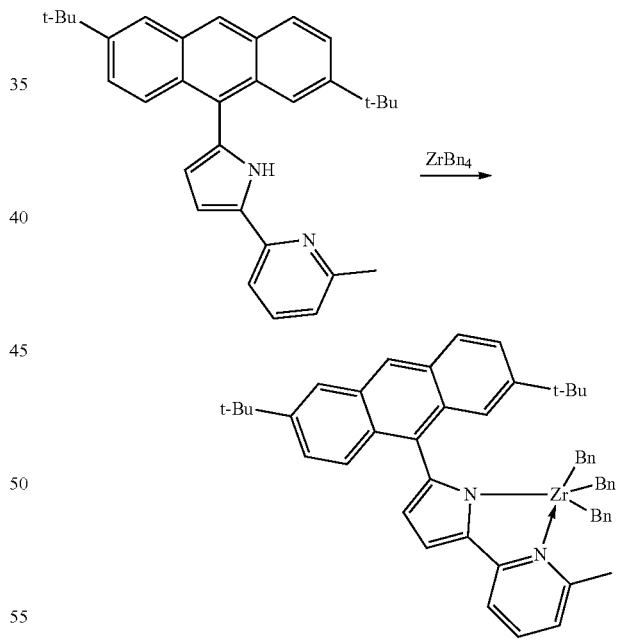

The General Procedure for Metal Complex Synthesis was used to synthesize the final procatalyst.

$^1$H NMR (400 MHz, C$_6$D$_6$) δ 8.53-8.45 (m, 1H), 8.29 (d, J=9.3 Hz, 1H), 8.25 (s, 1H), 7.92-7.85 (m, 2H), 7.44 (dd, J=8.9, 1.9 Hz, 1H), 7.33 (dd, J=9.3, 2.0 Hz, 1H), 6.83 (t, J=7.6 Hz, 6H), 6.73 (d, J=3.3 Hz, 1H), 6.70-6.59 (m, 4H), 6.36-6.28 (m, 1H), 6.15-6.07 (m, 6H), 5.73 (d, J=7.5 Hz, 1H), 1.86 (s, 3H), 1.83-1.71 (m, 6H), 1.26 (s, 9H), 1.21 (s, 9H). No $^{13}$C data was obtained.

Example 21—Synthesis of Procatalyst 7

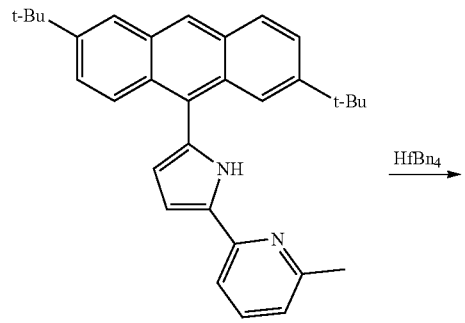

HfBn₄ →

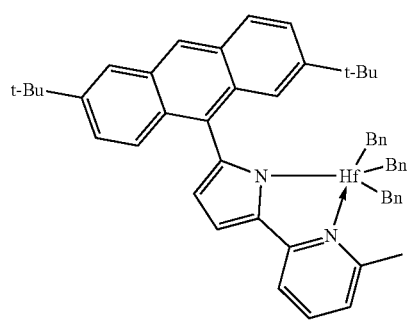

The General Procedure for Metal Complex Synthesis was used to synthesize the final procatalyst.

¹H NMR (400 MHz, C₆D₆) δ 8.47-8.39 (m, 1H), 8.29-8.20 (m, 2H), 8.18 (s, 1H), 7.87-7.81 (m, 3H), 7.53 (dd, J=9.2, 2.0 Hz, 1H), 7.48-7.44 (m, 1H), 7.00-6.88 (m, 8H), 6.80 (d, J=3.3 Hz, 1H), 6.74-6.57 (m, 7H), 6.38-6.31 (m, 6H), 5.81-5.74 (m, 1H), 1.76 (s, 3H), 1.74-1.62 (m, 6H), 1.31 (s, 18H). No ¹³C data was obtained.

Example 22—Synthesis of Procatalyst

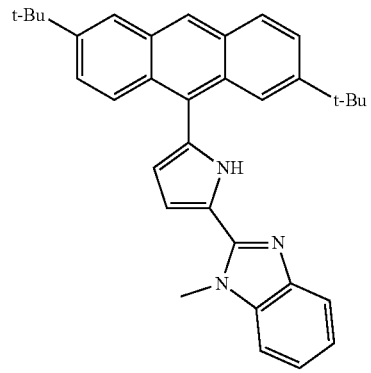

HfBn₄ →

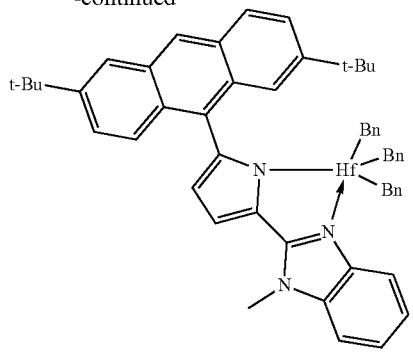

The General Procedure for Metal Complex Synthesis was used to synthesize the final procatalyst.

¹H NMR (400 MHz, C₆D₆) δ 8.38 (d, J=1.9 Hz, 1H), 8.26 (s, 1H), 8.23 (d, J=9.2 Hz, 1H), 7.97-7.88 (m, 2H), 7.62 (dd, J=9.2, 2.0 Hz, 1H), 7.52 (dd, J=8.9, 1.9 Hz, 1H), 7.14-6.89 (m, 15H), 6.76-6.68 (m, 5H), 6.61 (d, J=3.5 Hz, 1H), 2.73 (s, 3H), 2.00-1.84 (m, 6H), 1.41 (s, 9H), 1.38 (s, 9H).

¹³C NMR (101 MHz, C₆D₆) δ 147.87, 145.13, 143.93, 139.56, 138.54, 136.03, 132.22, 131.63, 130.60, 129.91, 128.96, 128.60, 128.23, 128.19, 125.53, 125.32, 124.73, 124.38, 123.34, 123.00, 122.52, 122.04, 120.95, 117.86, 116.92, 114.56, 108.64, 88.72, 83.03, 35.00, 34.58, 30.81, 30.72, 29.54.

Example 23—Synthesis of Procatalyst 23

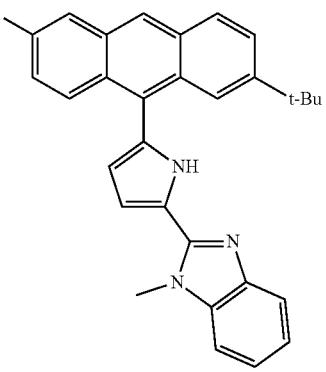

ZrBn₄ →

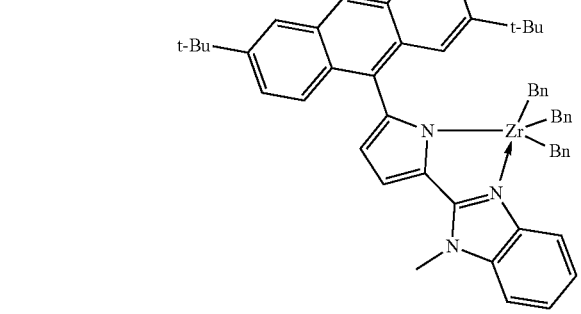

The General Procedure for Metal Complex Synthesis was used to synthesize the final procatalyst.

There is a significant amount of ZrBn₄ remaining. Notable resonances: ¹H NMR (400 MHz, C₆D₆) δ 8.38-8.31 (m, 1H), 8.29 (s, 1H), 8.15-8.09 (m, 1H), 2.81 (s, 3H), 2.00 (dd, J=60.3, 10.8 Hz, 6H), 1.37 (s, 9H), 1.35 (s, 9H).

Notable resonances. Significant amounts of ZrBn₄ remain. ¹³C NMR (101 MHz, C₆D₆) δ 139.08, 130.59, 124.14, 72.05.

Example 24—Synthesis of Procatalyst 18

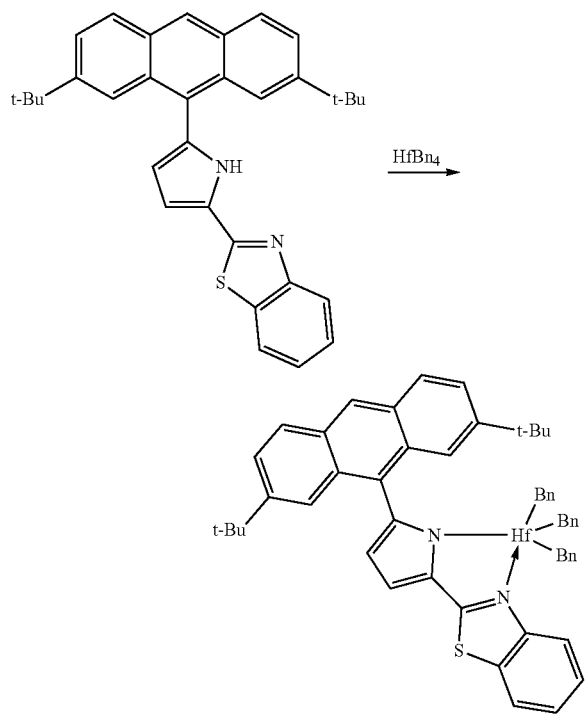

The General Procedure for Metal Complex Synthesis was used to synthesize the final procatalyst.

¹H NMR (400 MHz, C₆D₆) δ 8.24 (d, J=2.6 Hz, 3H), 7.88 (d, J=8.9 Hz, 2H), 7.49 (dd, J=8.9, 1.8 Hz, 2H), 7.12 (d, J=7.4 Hz, 1H), 7.04 (d, J=16.5 Hz, 2H), 6.98 (t, J=7.4 Hz, 7H), 6.93 (d, J=3.5 Hz, 1H), 6.89-6.76 (m, 3H), 6.73 (t, J=7.5 Hz, 3H), 6.67 (d, J=3.4 Hz, 1H), 6.42 (d, J=7.6 Hz, 6H), 1.91 (s, 6H), 1.37 (s, 18H).

¹³C NMR (101 MHz, C₆D₆) δ 168.40, 149.22, 148.34, 147.04, 143.60, 134.94, 132.68, 132.12, 130.62, 128.69, 128.51, 128.20, 127.25, 127.01, 125.33, 124.64, 124.18, 122.52, 121.34, 120.58, 118.04, 117.47, 91.03, 35.01, 30.71.

Example 25—Synthesis of Procatalyst 19

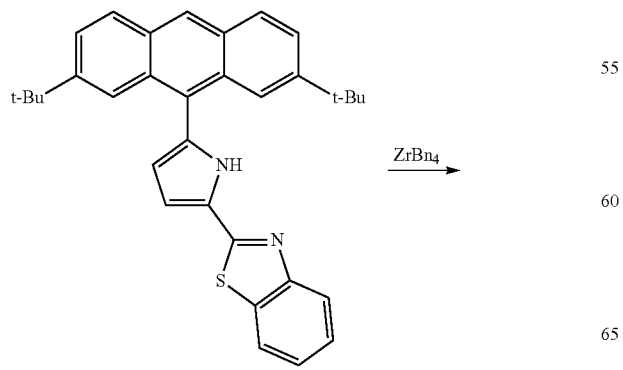

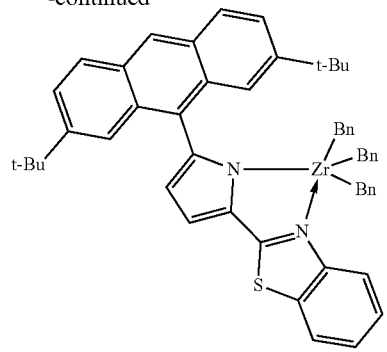

The General Procedure for Metal Complex Synthesis was used to synthesize the final procatalyst.

¹H NMR (400 MHz, C₆D₆) δ 8.29 (s, 1H), 8.19 (d, J=1.9 Hz, 2H), 7.89 (d, J=8.9 Hz, 2H), 7.46 (dd, J=8.9, 1.9 Hz, 2H), 7.12 (d, J=7.4 Hz, 1H), 7.06 (s, 1H), 7.05-6.98 (m, 3H), 6.90 (t, J=7.6 Hz, 6H), 6.79 (ddd, J=34.3, 18.0, 7.9 Hz, 6H), 6.62 (d, J=3.4 Hz, 1H), 6.27 (d, J=7.6 Hz, 6H), 1.96 (s, 6H), 1.31 (s, 18H).

¹³C NMR (101 MHz, C₆D₆) δ 167.74, 149.48, 148.21, 147.42, 143.25, 137.53, 135.04, 132.48, 131.97, 131.49, 130.10, 129.44, 128.97, 128.37, 128.20, 127.40, 126.73, 126.10, 125.33, 124.68, 123.82, 123.16, 121.15, 121.04, 120.80, 117.93, 116.93, 79.32, 34.93, 30.66.

Example 26—Synthesis of Procatalyst 5

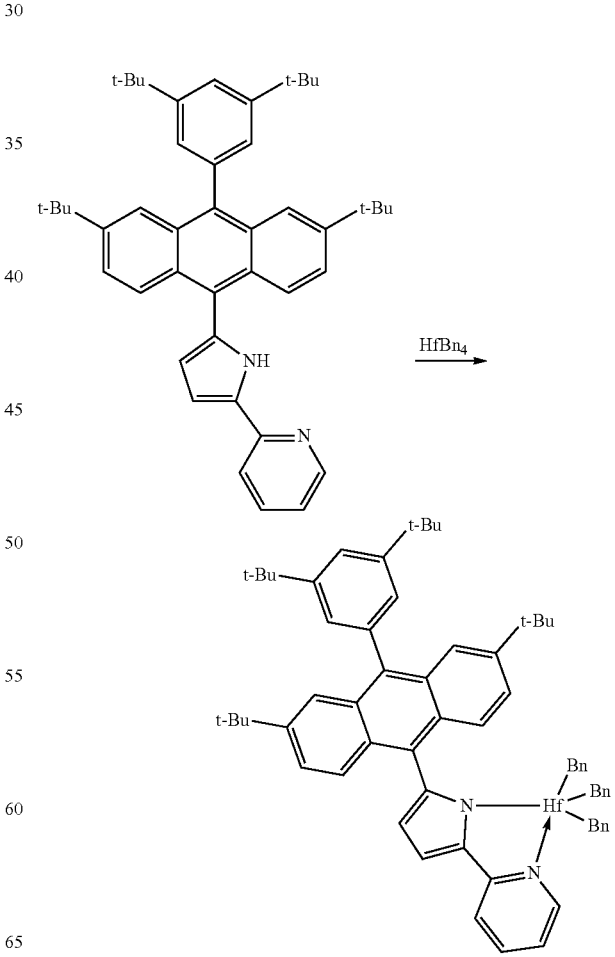

The General Procedure for Metal Complex Synthesis was used to synthesize the final procatalyst.

$^1$H NMR (400 MHz, C$_6$D$_6$) δ 8.41 (d, J=9.2 Hz, 2H), 8.16 (d, J=2.0 Hz, 2H), 7.73 (t, J=1.8 Hz, 1H), 7.65 (t, J=1.7 Hz, 1H), 7.61-7.51 (m, 3H), 7.18-7.07 (m, 5H), 7.00 (t, J=7.7 Hz, 8H), 6.95-6.79 (m, 3H), 6.79-6.71 (m, 4H), 6.44-6.38 (m, 6H), 6.00 (ddd, J=7.0, 5.7, 1.2 Hz, 1H), 1.82 (s, 6H), 1.40 (s, 9H), 1.33 (s, 9H), 1.23 (s, 18H).

$^{13}$C NMR (101 MHz, C$_6$D$_6$) δ 154.19, 150.84, 150.46, 147.84, 147.23, 144.25, 143.33, 140.74, 139.26, 139.11, 138.57, 131.08, 130.85, 130.73, 128.96, 128.42, 128.20, 127.85, 127.26, 126.91, 126.12, 125.33, 124.93, 122.43, 121.81, 120.62, 117.95, 117.10, 117.03, 112.88, 89.52, 34.75, 31.45, 31.37, 30.61.

Example 27—Synthesis of Procatalyst 4

Example 28—Synthesis of Procatalyst 3

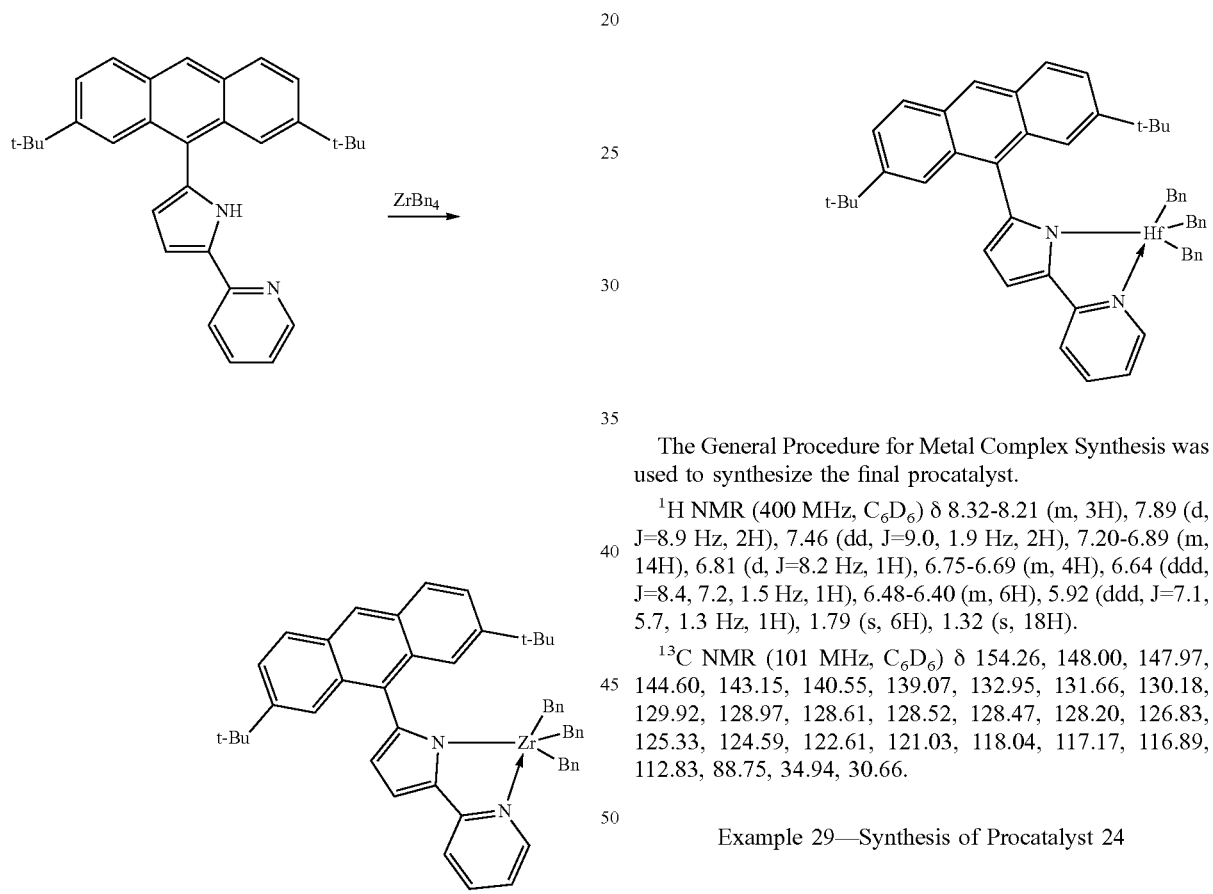

The General Procedure for Metal Complex Synthesis was used to synthesize the final procatalyst.

$^1$H NMR (400 MHz, C$_6$D$_6$) δ 8.32-8.21 (m, 3H), 7.89 (d, J=8.9 Hz, 2H), 7.46 (dd, J=9.0, 1.9 Hz, 2H), 7.20-6.89 (m, 14H), 6.81 (d, J=8.2 Hz, 1H), 6.75-6.69 (m, 4H), 6.64 (ddd, J=8.4, 7.2, 1.5 Hz, 1H), 6.48-6.40 (m, 6H), 5.92 (ddd, J=7.1, 5.7, 1.3 Hz, 1H), 1.79 (s, 6H), 1.32 (s, 18H).

$^{13}$C NMR (101 MHz, C$_6$D$_6$) δ 154.26, 148.00, 147.97, 144.60, 143.15, 140.55, 139.07, 132.95, 131.66, 130.18, 129.92, 128.97, 128.61, 128.52, 128.47, 128.20, 126.83, 125.33, 124.59, 122.61, 121.03, 118.04, 117.17, 116.89, 112.83, 88.75, 34.94, 30.66.

Example 29—Synthesis of Procatalyst 24

The General Procedure for Metal Complex Synthesis was used to synthesize the final procatalyst.

$^1$H NMR (400 MHz, C$_6$D$_6$) δ 8.28 (s, 1H), 8.20 (d, J=1.9 Hz, 2H), 7.88 (d, J=8.9 Hz, 2H), 7.45 (dd, J=8.9, 1.9 Hz, 2H), 7.13-6.95 (m, 6H), 6.89 (t, J=7.7 Hz, 7H), 6.75 (t, J=7.4 Hz, 3H), 6.72-6.60 (m, 2H), 6.26 (d, J=7.6 Hz, 6H), 6.02-5.90 (m, 1H), 1.89 (s, 6H), 1.29 (s, 18H).

$^{13}$C NMR (101 MHz, C$_6$D$_6$) δ 154.49, 148.33, 147.92, 144.15, 143.04, 140.29, 138.80, 132.82, 132.12, 130.60, 130.16, 129.27, 128.97, 128.36, 128.27, 128.20, 128.10, 127.94, 126.54, 125.33, 124.61, 122.95, 121.38, 117.60, 117.15, 116.35, 112.23, 78.03, 34.89, 30.65.

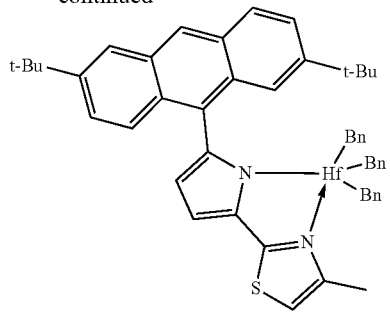

The General Procedure for Metal Complex Synthesis was used to synthesize the final procatalyst.

¹H NMR (400 MHz, C₆D₆) δ 8.32 (d, J=1.9 Hz, 1H), 8.15 (d, J=10.7 Hz, 2H), 7.87 (d, J=9.0 Hz, 2H), 7.61 (dd, J=9.1, 2.0 Hz, 1H), 7.51 (dd, J=8.9, 1.9 Hz, 1H), 7.12 (s, 1H), 7.03 (d, J=7.8 Hz, 8H), 6.80-6.72 (m, 4H), 6.54 (dd, J=10.3, 5.4 Hz, 2H), 6.43 (d, J=7.6 Hz, 6H), 5.49 (s, 1H), 1.78 (d, J=2.9 Hz, 6H), 1.69 (s, 3H), 1.40 (d, J=2.0 Hz, 18H).

¹³C NMR (101 MHz, C₆D₆) δ 168.24, 149.53, 148.02, 147.05, 144.13, 143.68, 137.52, 134.61, 132.25, 131.61, 131.42, 130.62, 130.49, 129.92, 128.97, 128.65, 128.61, 128.35, 128.20, 126.97, 125.50, 125.33, 124.70, 123.02, 122.43, 120.79, 116.93, 114.47, 109.81, 91.73, 35.02, 34.59, 30.80, 30.75, 15.95.

Example 30—Synthesis of Procatalyst 6

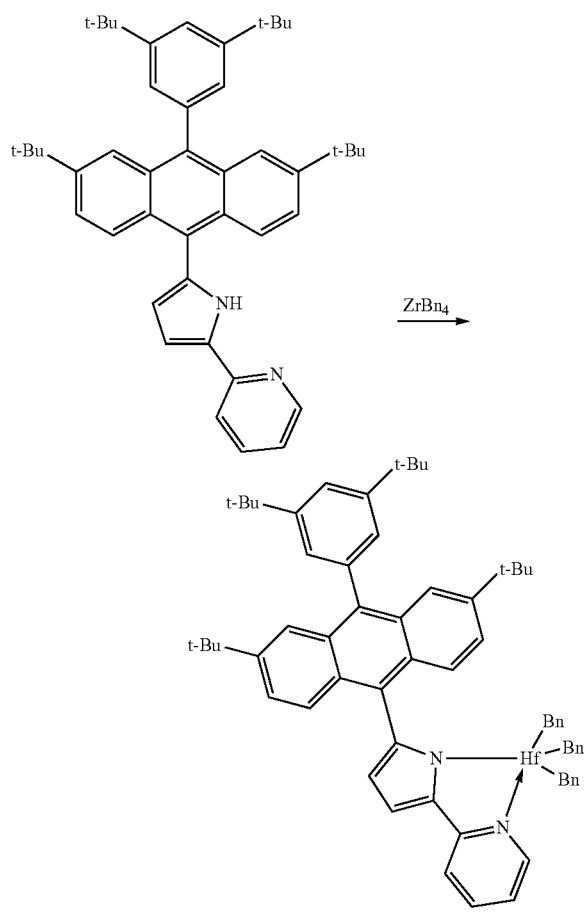

The General Procedure for Metal Complex Synthesis was used to synthesize the final procatalyst.

¹H NMR (400 MHz, C₆D₆) δ 8.41 (d, J=9.2 Hz, 2H), 8.14 (d, J=2.0 Hz, 2H), 7.74 (q, J=1.6 Hz, 1H), 7.65 (dq, J=11.9, 1.4 Hz, 2H), 7.49 (dt, J=9.3, 1.4 Hz, 2H), 7.15-6.95 (m, 10H), 6.94 (t, J=7.6 Hz, 7H), 6.87-6.71 (m, 5H), 6.38 (d, J=7.6 Hz, 1H), 6.30 (d, J=7.6 Hz, 6H), 6.09-5.95 (m, 1H), 1.99 (s, 6H), 1.40 (s, 9H), 1.38 (s, 9H), 1.19 (s, 18H).

¹³C NMR (101 MHz, C₆D₆) δ 154.44, 150.76, 150.60, 148.17, 147.31, 144.32, 142.97, 140.33, 139.10, 138.89, 138.85, 138.63, 137.52, 131.51, 130.73, 130.60, 130.54, 129.09, 128.96, 128.37, 128.18, 126.68, 126.33, 125.33, 124.83, 124.15, 122.86, 121.53, 120.66, 117.50, 117.16, 116.77, 112.28, 79.40, 34.87, 34.85, 34.72, 31.43, 30.58.

Example 31—Synthesis of Procatalyst 12

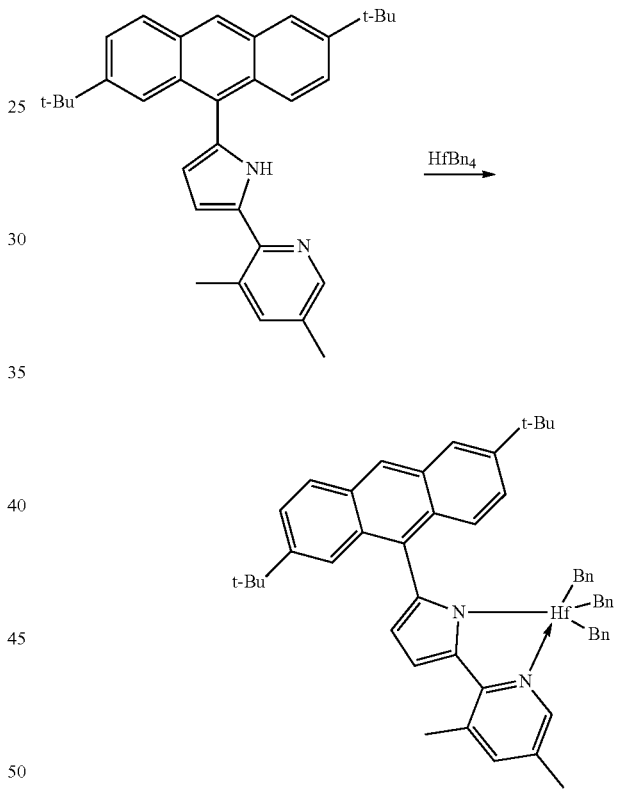

The General Procedure for Metal Complex Synthesis was used to synthesize the final procatalyst.

¹H NMR (400 MHz, C₆D₆) δ 8.57 (d, J=2.0 Hz, 1H), 8.30 (s, 1H), 8.27 (d, J=9.2 Hz, 1H), 7.51 (ddd, J=8.2, 6.0, 2.0 Hz, 2H), 7.12 (d, J=7.7 Hz, 1H), 7.09-6.98 (m, 3H), 6.98-6.90 (m, 7H), 6.80 (d, J=3.3 Hz, 1H), 6.74-6.66 (m, 4H), 6.56-6.49 (m, 2H), 6.46-6.37 (m, 6H), 2.05 (s, 3H), 1.93-1.68 (m, 6H), 1.54 (s, 3H), 1.36 (s, 9H), 1.33 (s, 9H).

¹³C NMR (101 MHz, C₆D₆) δ 150.11, 147.81, 147.11, 145.98, 144.07, 143.19, 142.74, 141.12, 131.92, 131.67, 131.65, 131.52, 130.83, 129.92, 128.97, 128.61, 128.47, 127.11, 127.03, 125.38, 125.33, 124.82, 122.77, 122.21, 121.39, 117.03, 116.15, 89.05, 34.98, 34.51, 30.77, 30.65, 20.79, 16.77.

Example 32—Synthesis of Procatalyst 10

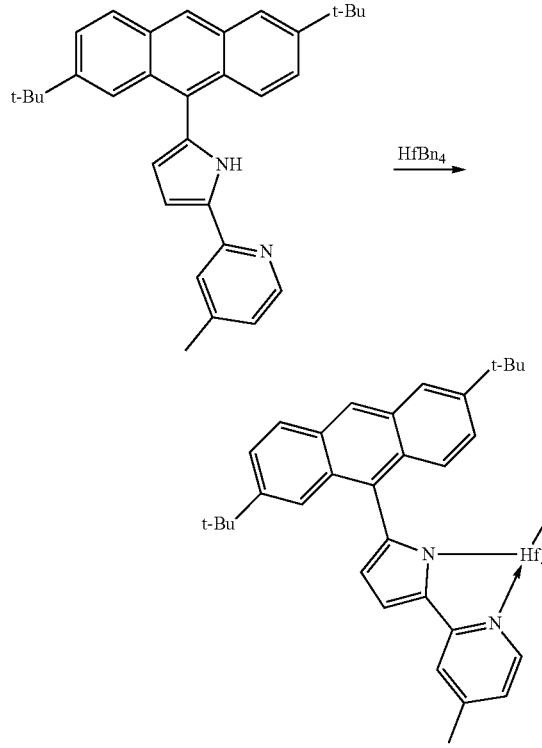

The General Procedure for Metal Complex Synthesis was used to synthesize the final procatalyst.

$^1$H NMR (400 MHz, C$_6$D$_6$) δ 8.42 (d, J=1.9 Hz, 1H), 8.27 (s, 1H), 8.22 (d, J=9.2 Hz, 1H), 7.95-7.84 (m, 2H), 7.52 (ddd, J=15.6, 9.1, 2.0 Hz, 2H), 7.14-6.89 (m, 12H), 6.82 (s, 1H), 6.74 (dd, J=9.4, 5.4 Hz, 4H), 6.46 (d, J=7.6 Hz, 6H), 5.84 (dd, J=5.9, 1.7 Hz, 1H), 1.91-1.71 (m, 6H), 1.58 (s, 3H), 1.37 (s, 9H), 1.36 (s, 9H).

$^{13}$C NMR (101 MHz, C$_6$D$_6$) δ 154.02, 151.30, 147.79, 147.46, 147.09, 143.97, 143.38, 140.52, 137.52, 132.23, 131.69, 131.57, 130.68, 129.92, 128.97, 128.48, 128.41, 128.20, 127.24, 127.12, 125.38, 125.33, 124.77, 122.82, 122.43, 121.17, 119.51, 117.44, 116.82, 112.45, 88.86, 34.97, 34.55, 30.75, 30.70, 20.57.

Example 33—Synthesis of Procatalyst 22

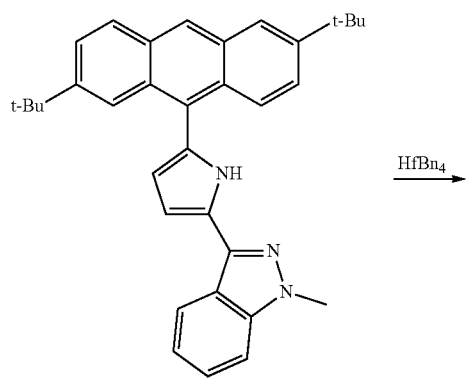

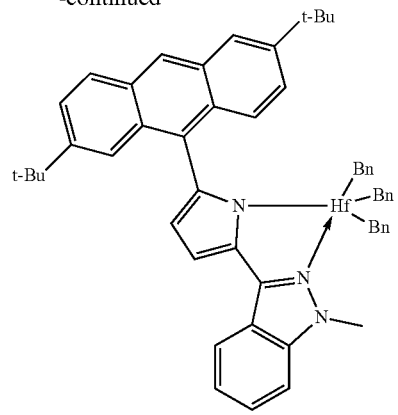

The General Procedure for Metal Complex Synthesis was used to synthesize the final procatalyst.

$^1$H NMR (400 MHz, C$_6$D$_6$) δ 8.49 (s, 1H), 8.32 (d, J=9.2 Hz, 1H), 8.24 (s, 1H), 7.92 (dd, J=5.5, 3.5 Hz, 2H), 7.73 (d, J=8.2 Hz, 1H), 7.62 (dd, J=9.3, 1.9 Hz, 1H), 7.53 (dd, J=9.0, 1.9 Hz, 1H), 7.18-6.96 (m, 8H), 6.92 (t, J=7.6 Hz, 6H), 6.76 (d, J=3.1 Hz, 1H), 6.68 (t, J=7.4 Hz, 3H), 6.49 (d, J=8.6 Hz, 1H), 6.41 (d, J=7.6 Hz, 6H), 2.76 (s, 3H), 1.82 (d, J=2.0 Hz, 6H), 1.39 (d, J=1.6 Hz, 18H).

$^{13}$C NMR (101 MHz, C$_6$D$_6$) δ 147.82, 147.03, 144.79, 144.11, 142.99, 140.57, 132.51, 132.41, 131.89, 131.58, 131.34, 130.64, 128.97, 128.25, 128.20, 127.15, 125.33, 124.76, 122.90, 122.32, 121.54, 121.20, 117.63, 115.59, 112.03, 108.75, 90.83, 35.01, 34.58, 34.03, 30.79, 30.74.

Example 34—Synthesis of Procatalyst 13

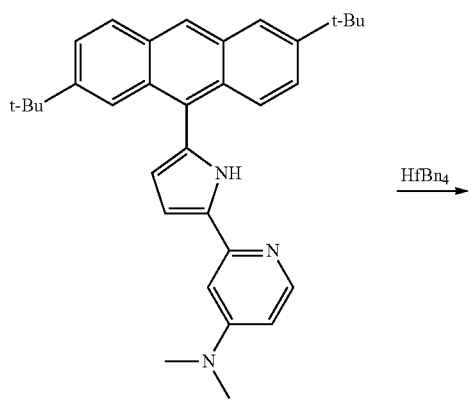

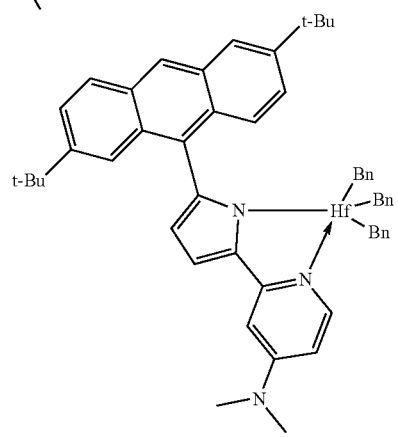

The General Procedure for Metal Complex Synthesis was used to synthesize the final procatalyst.

$^1$H NMR (400 MHz, $C_6D_6$) δ 8.47 (s, 1H), 8.28 (t, J=4.5 Hz, 2H), 7.92 (d, J=8.8 Hz, 2H), 7.58-7.45 (m, 2H), 7.14-6.95 (m, 13H), 6.83-6.73 (m, 4H), 6.55 (d, J=7.6 Hz, 6H), 6.33 (d, J=2.6 Hz, 1H), 5.36 (dd, J=6.9, 2.6 Hz, 1H), 2.03 (s, 6H), 1.97-1.80 (m, 6H), 1.36 (s, 9H), 1.35 (s, 9H).

$^{13}$C NMR (101 MHz, $C_6D_6$) δ 155.40, 154.39, 148.04, 147.53, 146.98, 144.09, 142.77, 141.07, 137.53, 132.36, 132.20, 131.81, 131.62, 130.73, 128.97, 128.39, 128.29, 128.20, 128.02, 126.86, 125.33, 125.26, 124.70, 122.71, 122.13, 121.49, 116.39, 110.37, 102.47, 96.84, 88.07, 37.90, 34.96, 34.53, 30.77, 30.71.

Example 35—Synthesis of Procatalyst 14

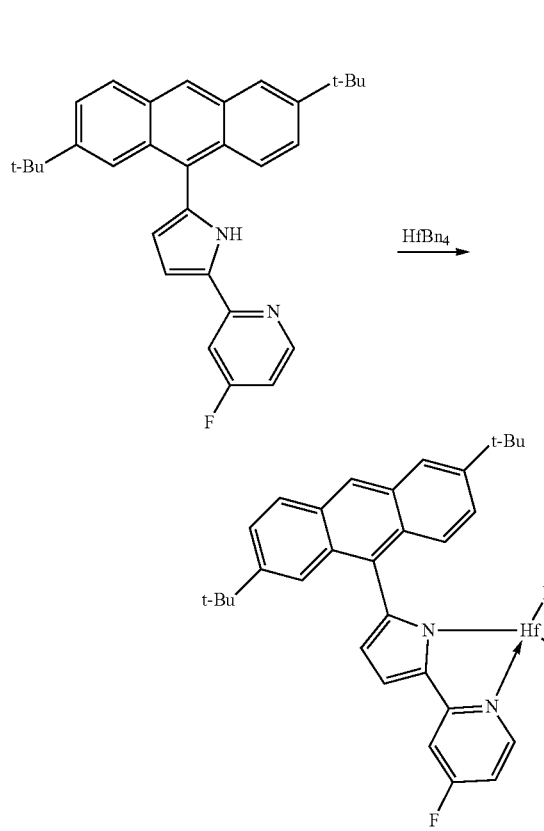

The General Procedure for Metal Complex Synthesis was used to synthesize the final procatalyst.

$^1$H NMR (400 MHz, $C_6D_6$) δ 8.35 (d, J=1.8 Hz, 1H), 8.25 (s, 1H), 8.15 (d, J=9.2 Hz, 1H), 7.96-7.83 (m, 2H), 7.56 (dd, J=9.2, 2.0 Hz, 1H), 7.49 (dd, J=9.0, 1.9 Hz, 1H), 7.13-6.87 (m, 12H), 6.72 (dd, J=8.8, 5.6 Hz, 4H), 6.65 (d, J=3.4 Hz, 1H), 6.55-6.46 (m, 2H), 6.39 (d, J=7.6 Hz, 6H), 5.64 (td, J=7.1, 2.5 Hz, 1H), 1.84-1.65 (m, 6H), 1.36 (s, 9H), 1.35 (s, 9H).

$^{13}$C NMR (101 MHz, $C_6D_6$) δ 157.46, 157.35, 151.36, 151.26, 147.98, 147.17, 144.86, 143.02, 139.79, 138.56, 132.12, 131.59, 131.52, 131.05, 130.63, 129.92, 128.97, 128.61, 128.53, 128.50, 128.20, 127.78, 127.32, 127.02, 125.47, 125.33, 124.82, 124.39, 122.89, 122.66, 120.94, 117.25, 113.91, 106.87, 106.67, 103.33, 103.13, 89.12, 34.98, 34.55, 30.73, 30.68.

Example 36—Synthesis of Procatalyst 25

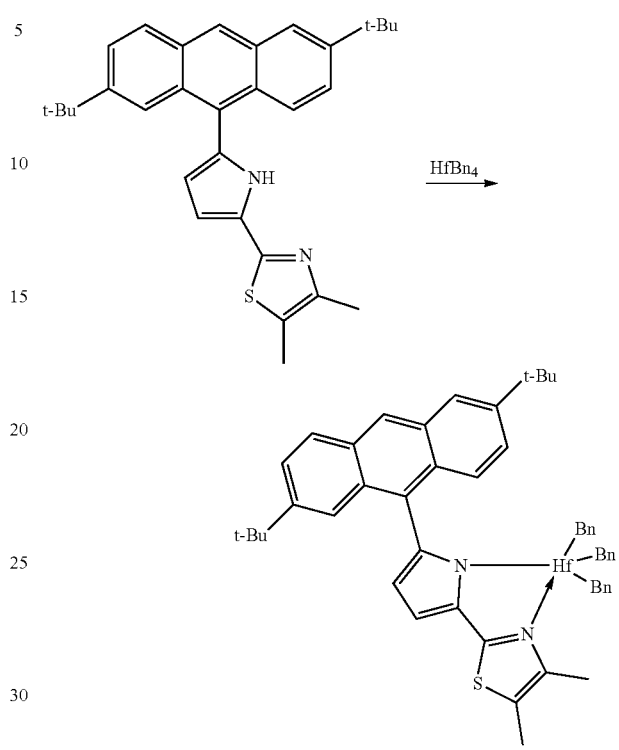

The General Procedure for Metal Complex Synthesis was used to synthesize the final procatalyst.

$^1$H NMR (400 MHz, $C_6D_6$) δ 8.34 (d, J=1.9 Hz, 1H), 8.18 (t, J=4.4 Hz, 2H), 7.94-7.83 (m, 2H), 7.61 (dd, J=9.3, 2.0 Hz, 1H), 7.51 (dd, J=9.0, 1.9 Hz, 1H), 7.14-6.95 (m, 10H), 6.79-6.72 (m, 4H), 6.58 (d, J=3.3 Hz, 1H), 6.46 (d, J=7.6 Hz, 6H), 1.80 (d, J=2.5 Hz, 6H), 1.59 (s, 3H), 1.51 (s, 3H), 1.40 (s, 18H).

$^{13}$C NMR (101 MHz, $C_6D_6$) δ 164.92, 147.94, 147.02, 144.30, 143.40, 137.52, 134.66, 132.29, 131.63, 131.44, 130.78, 130.50, 128.96, 128.62, 128.28, 128.20, 127.12, 127.04, 125.47, 125.33, 124.69, 122.98, 122.35, 122.27, 120.88, 116.76, 113.86, 91.51, 35.02, 34.59, 30.80, 30.75, 13.96, 10.38.

Example 37—Synthesis of Procatalyst 28

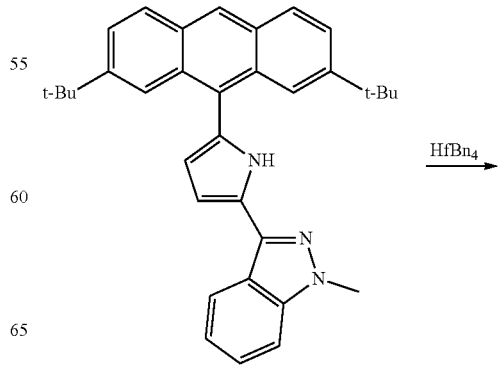

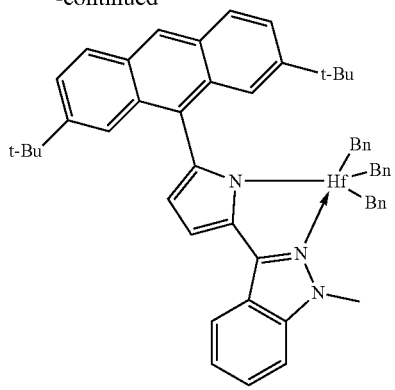

The General Procedure for Metal Complex Synthesis was used to synthesize the final procatalyst.

$^1$H NMR (400 MHz, C$_6$D$_6$) δ 8.42 (s, 2H), 8.26 (s, 1H), 7.91 (d, J=9.0 Hz, 2H), 7.68 (d, J=8.2 Hz, 1H), 7.50 (dd, J=9.1, 1.8 Hz, 2H), 7.14-6.98 (m, 6H), 6.90 (t, J=7.6 Hz, 6H), 6.85-6.79 (m, 2H), 6.65 (t, J=7.4 Hz, 3H), 6.53 (d, J=7.7 Hz, 1H), 6.45 (d, J=8.5 Hz, 1H), 6.41 (d, J=7.7 Hz, 6H), 2.75 (s, 3H), 1.82 (s, 6H), 1.38 (s, 18H).

$^{13}$C NMR (101 MHz, C$_6$D$_6$) δ 147.91, 144.72, 144.32, 143.21, 140.86, 133.12, 132.60, 131.69, 130.23, 129.92, 129.27, 128.96, 128.60, 128.26, 128.20, 126.85, 126.76, 125.33, 124.56, 124.39, 122.37, 122.28, 121.42, 121.19, 117.55, 115.54, 111.92, 108.69, 90.94, 35.00, 33.96, 30.76.

Example 38—Synthesis of Procatalyst 26

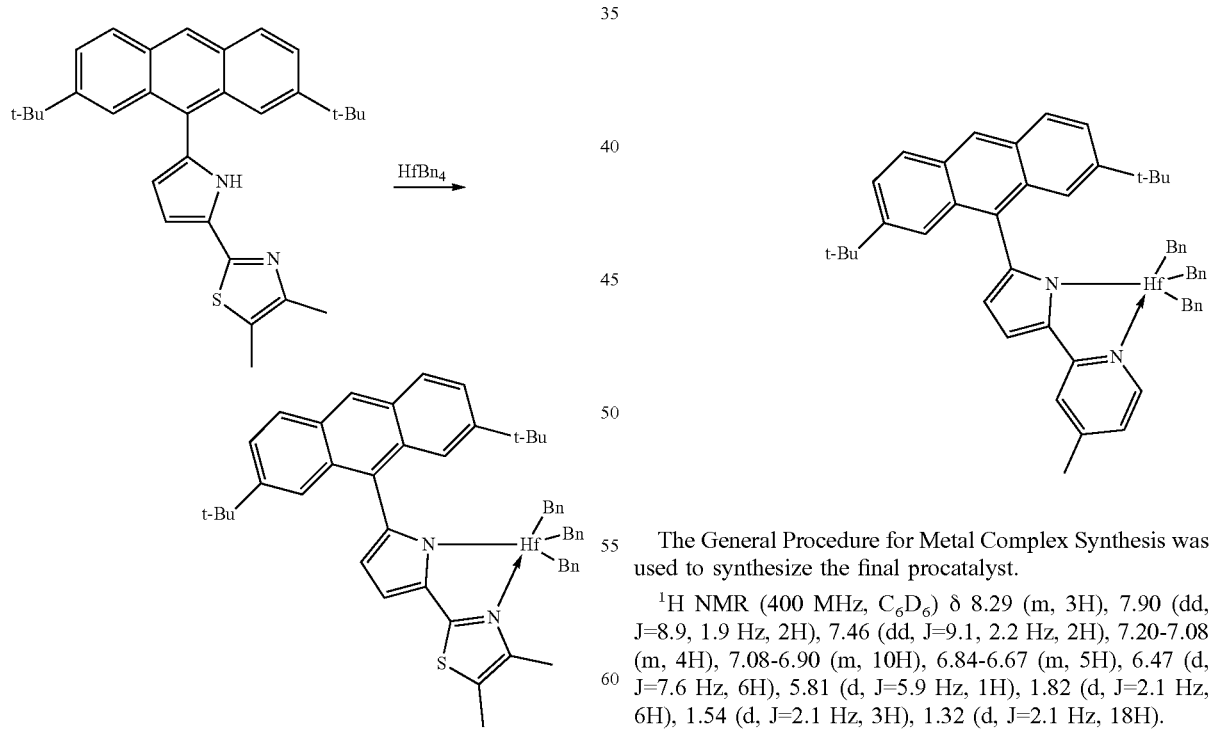

The General Procedure for Metal Complex Synthesis was used to synthesize the final procatalyst.

$^1$H NMR (400 MHz, C$_6$D$_6$) δ 8.30 (s, 2H), 8.20 (s, 1H), 7.87 (d, J=8.9 Hz, 2H), 7.49 (dd, J=8.9, 1.9 Hz, 2H), 7.12 (d, J=7.4 Hz, 1H), 7.02 (q, J=7.1, 6.4 Hz, 8H), 6.81-6.70 (m, 4H), 6.65 (d, J=3.3 Hz, 1H), 6.42 (d, J=7.6 Hz, 6H), 1.80 (s, 6H), 1.60 (s, 3H), 1.48 (s, 3H), 1.38 (s, 18H).

$^{13}$C NMR (101 MHz, C$_6$D$_6$) δ 164.84, 148.06, 144.63, 144.33, 143.75, 134.92, 132.82, 131.13, 130.12, 128.97, 128.68, 128.32, 128.20, 127.00, 126.78, 125.33, 124.52, 122.54, 122.33, 120.88, 116.74, 113.76, 91.81, 35.01, 30.74, 13.77, 10.37.

Example 39—Synthesis of Procatalyst 11

The General Procedure for Metal Complex Synthesis was used to synthesize the final procatalyst.

$^1$H NMR (400 MHz, C$_6$D$_6$) δ 8.29 (m, 3H), 7.90 (dd, J=8.9, 1.9 Hz, 2H), 7.46 (dd, J=9.1, 2.2 Hz, 2H), 7.20-7.08 (m, 4H), 7.08-6.90 (m, 10H), 6.84-6.67 (m, 5H), 6.47 (d, J=7.6 Hz, 6H), 5.81 (d, J=5.9 Hz, 1H), 1.82 (d, J=2.1 Hz, 6H), 1.54 (d, J=2.1 Hz, 3H), 1.32 (d, J=2.1 Hz, 18H).

$^{13}$C NMR (101 MHz, C$_6$D$_6$) δ 154.17, 151.30, 147.92, 147.68, 144.35, 143.28, 140.45, 132.99, 131.82, 130.20, 128.97, 128.50, 128.44, 128.20, 126.77, 125.33, 124.59, 122.54, 121.11, 119.60, 117.58, 116.80, 112.37, 88.55, 34.94, 30.66, 20.52.

Example 38—Synthesis of Procatalyst 9

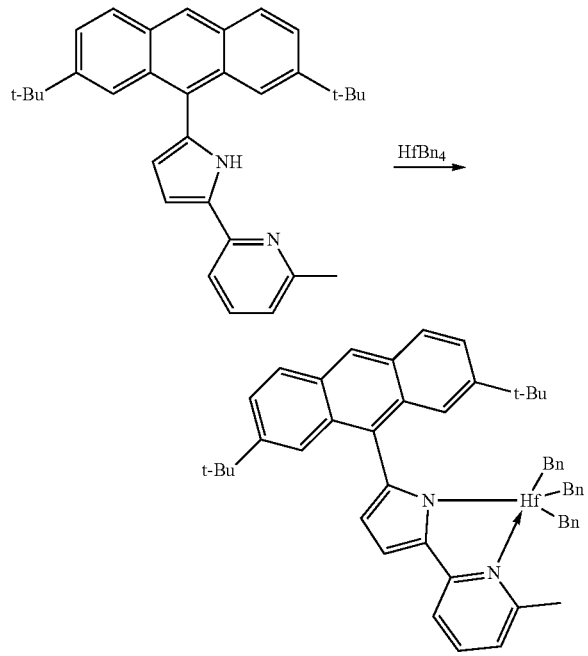

The General Procedure for Metal Complex Synthesis was used to synthesize the final procatalyst.

$^1$H NMR (400 MHz, C$_6$D$_6$) δ 8.45 (d, J=1.9 Hz, 2H), 8.26 (s, 1H), 7.90 (d, J=8.9 Hz, 2H), 7.48 (dd, J=8.9, 1.9 Hz, 2H), 7.12 (d, J=7.4 Hz, 1H), 7.07-6.92 (m, 8H), 6.90 (d, J=3.3 Hz, 1H), 6.79 (d, J=3.3 Hz, 1H), 6.72 (dt, J=14.7, 7.7 Hz, 4H), 6.63 (t, J=7.8 Hz, 1H), 6.33 (d, J=7.6 Hz, 6H), 5.80 (d, J=7.5 Hz, 1H), 1.89 (s, 3H), 1.74 (s, 6H), 1.33 (s, 18H).

$^{13}$C NMR (101 MHz, C$_6$D$_6$) δ 156.57, 153.01, 147.96, 145.30, 143.60, 139.82, 139.21, 132.71, 131.41, 130.25, 128.97, 128.58, 128.20, 128.16, 126.90, 126.81, 125.33, 124.53, 122.16, 121.25, 120.08, 116.79, 115.12, 113.14, 91.58, 34.97, 30.71, 23.74.

Example 39—Synthesis of Procatalyst 15

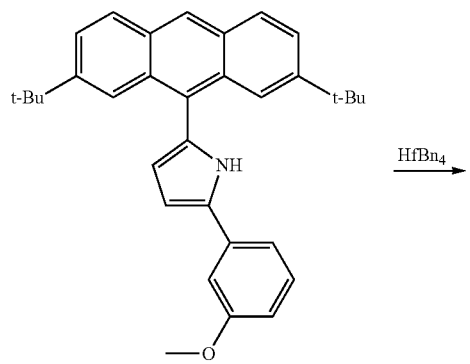

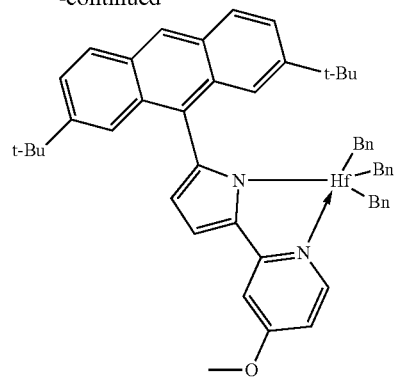

The General Procedure for Metal Complex Synthesis was used to synthesize the final procatalyst.

$^1$H NMR (400 MHz, C$_6$D$_6$) δ 8.34-8.24 (m, 3H), 7.90 (d, J=9.0 Hz, 2H), 7.47 (dd, J=9.0, 1.9 Hz, 2H), 7.14-7.03 (m, 4H), 7.02-6.95 (m, 8H), 6.78-6.69 (m, 4H), 6.55-6.45 (m, 8H), 5.72 (dd, J=6.6, 2.6 Hz, 1H), 2.90 (s, 3H), 1.82 (s, 6H), 1.33 (s, 18H).

$^{13}$C NMR (101 MHz, C$_6$D$_6$) δ 167.89, 156.54, 149.78, 147.92, 144.31, 143.38, 140.38, 133.01, 131.85, 130.20, 129.92, 128.97, 128.61, 128.50, 128.44, 128.20, 127.99, 126.77, 125.33, 124.59, 124.39, 122.54, 121.12, 116.75, 112.19, 106.97, 100.16, 88.41, 83.07, 54.44, 34.95, 30.67.

Example 40—Synthesis of Precursors to Procatalyst 29

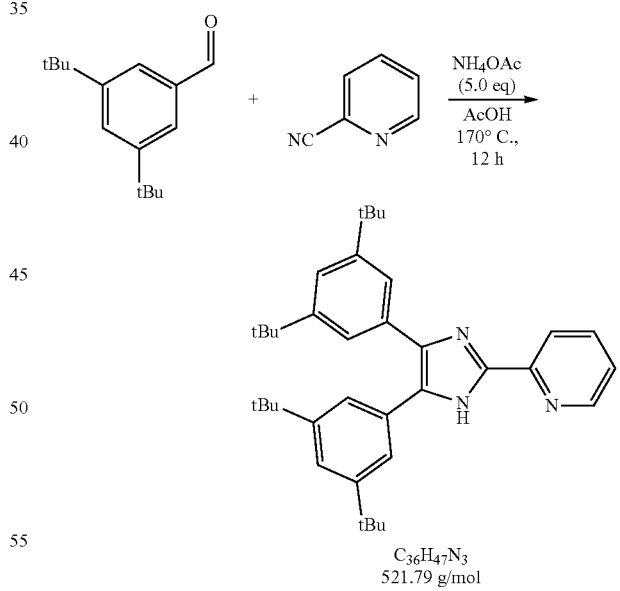

C$_{36}$H$_{47}$N$_3$
521.79 g/mol 3,5-Di-tert-butylbenzaldehyde (360 mg, 4.00 mmol, 2.00 eq), 2-pyridinecarbonitrile (208 mg, 2.00 mmol, 1.00 eq), and ammonium acetate (771 mg, 10.0 mmol, 5.00 eq) in glacial AcOH (6 mL) were placed in a capped vial and carefully heated to 170° C. for 12 h. After cooling to RT, the mixture was neutralized with an aqueous saturated solution of NaHCO$_3$ and extracted with EtOAc (2×10 mL). The combined organic phases were washed with brine, dried over MgSO$_4$, and the organic solvents were removed under vacuum. GC/MS analysis showed the formation of the desired product. The crude product was purified by flash chromatography (Biotage, $CH_2Cl_2$/EtOAc), yielding the desired product as white solid (613 mg, 59%).

$^1$H NMR (400 MHz, $CDCl_3$) δ 10.52 (br s, 1H), 8.53 (ddd, J=4.9, 1.7, 0.9 Hz, 1H), 8.32 (ddd, J=8.0, 1.1, 1.1 Hz, 1H), 7.78 (ddd, J=9.3, 7.6, 1.8 Hz, 1H), 7.42 (d, J=1.9 Hz, 2H), 7.36 (dd, J=1.8, 1.8 Hz, 1H), 7.31 (dd, J=1.9, 1.9 Hz, 1H), 7.25-7.21 (m, 3H), 1.25 (s, 36H).

$^{13}$C NMR (101 MHz, $CDCl_3$) δ 151.29, 150.58, 148.86, 148.73, 144.57, 140.63, 137.13, 134.25, 130.31, 129.43, 123.02, 122.36, 122.33, 122.19, 121.43, 120.28, 34.98, 34.92, 31.60, 31.52.

GC/MS (M+) m/z 521.39.

Example 40—Synthesis of Procatalyst 29

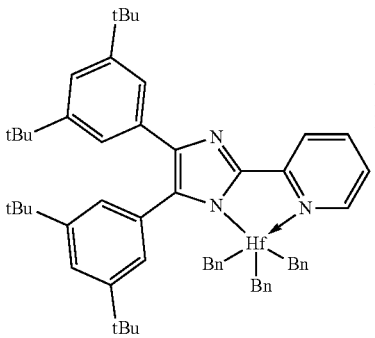

| Complex | $^1$H NMR Data |
|---|---|
| Procatalyst 29 | $^1$H NMR (400 MHZ, $C_6D_6$) δ 8.08 (d, J = 1.8 Hz, 2H), 8.06 (d, J = 8.0, 1.1 Hz, 1H), 7.71-7.63 (m, 3H), 7.45 (dd, J = 1.9 Hz, 1H), 7.26 (d, J = 5.6 Hz, 1H), 6.96 (dd, J = 7.7 Hz, 6H), 6.76-6.64 (m, 10H), 6.03 (ddd, J = 7.3, 5.7, 1.4 Hz, 1H), 2.41 (s, 6H), 1.30 (s, 18H), 1.30 (s, 18H). |

The General Procedure for Metal Complex Synthesis was used to synthesize the final procatalyst.

Procatalysts 1-30 were individually reacted using the polymerization conditions in a batch reactor system, as previously described. Properties for the resulting polymers are reported in Table 2 and Table 3.

TABLE 2

Batch Reactor Data

| Procatalyst No. | Reactor Temperature (° C.) | Efficiency (gpoly/gM) | Mw (g/mol) | PDI | Mol % Octene |
|---|---|---|---|---|---|
| Procatalyst 1 | 120 | 199,824 | 340,391 | 3.1 | 12.9 |
| Procatalyst 1 | 150 | 193,848 | 231,812 | 3.4 | 12.4 |
| Procatalyst 2 | 120 | 880,616 | 112,180 | 3.6 | 8.8 |
| Procatalyst 2 | 150 | 515,215 | 73,902 | 3.8 | 5.7 |
| Procatalyst 16 | 120 | 129,979 | 381,760 | 4.1 | 19.7 |
| Procatalyst 16 | 150 | 128,859 | 275,981 | 4 | 15.3 |
| Procatalyst 21 | 120 | 131,544 | 182,545 | 5.3 | 16.1 |
| Procatalyst 21 | 150 | 30,146 | 124,627 | 5.8 | 13.7 |
| Procatalyst 20 | 120 | 80,303 | 458,614 | 4.1 | 16.4 |
| Procatalyst 20 | 150 | 72,833 | 179,690 | 3.6 | 15.6 |
| Procatalyst 17 | 120 | 138,852 | 102,190 | 7.7 | 16.5 |
| Procatalyst 17 | 150 | 85,869 | 83,059 | 10.1 | 16.8 |
| Procatalyst 8 | 120 | 186,355 | 202,219 | 5.5 | 17.8 |
| Procatalyst 8 | 150 | 79,475 | 95,100 | 5.3 | 12.8 |
| Procatalyst 7 | 120 | 46,688 | 225,701 | 4 | 19.5 |
| Procatalyst 7 | 150 | 80,837 | 88,916 | 3.6 | 15.9 |
| Procatalyst 22 | 120 | 59,761 | 529,157 | 3.7 | 9.6 |
| Procatalyst 22 | 150 | 54,625 | 339,899 | 3.6 | 9.7 |
| Procatalyst 23 | 120 | 157,122 | 222,056 | 5.7 | 15 |
| Procatalyst 23 | 150 | 19,184 | 215,732 | 10.4 | 6.3 |
| Procatalyst 18 | 120 | 193,289 | 261,213 | 5.4 | 20 |
| Procatalyst 18 | 150 | 154,070 | 189,434 | 4.1 | 18.9 |
| Procatalyst 19 | 120 | 285,013 | 85,373 | 5.5 | 20.6 |
| Procatalyst 19 | 150 | 86,783 | 44,413 | 12.6 | 16.8 |
| Procatalyst 5 | 120 | 138,664 | 302,215 | 3.4 | 20.6 |
| Procatalyst 5 | 150 | 63,869 | 143,025 | 4 | 16.3 |
| Procatalyst 4 | 120 | 416,557 | 82,957 | 7.4 | 14.5 |
| Procatalyst 4 | 150 | 186,354 | 63,942 | 7.8 | 12.4 |
| Procatalyst 3 | 120 | 464,545 | 374,446 | 3.6 | 18.5 |
| Procatalyst 3 | 150 | 264,721 | 215,756 | 4.5 | 15.9 |
| Procatalyst 24 | 120 | 86,172 | 311,396 | 4.9 | 21 |
| Procatalyst 24 | 150 | 175,780 | 212,777 | 4.6 | 17.7 |
| Procatalyst 6 | 120 | 323,989 | 115,241 | 3.4 | 13.4 |
| Procatalyst 6 | 150 | 153,468 | 106,307 | 5.1 | 6.6 |
| Procatalyst 12 | 120 | 184,884 | 169,791 | 3.9 | 22.7 |
| Procatalyst 12 | 150 | 168,077 | 136,593 | 3.9 | 16.6 |
| Procatalyst 10 | 120 | 319,346 | 337,521 | 4.2 | 17.1 |
| Procatalyst 10 | 150 | 386,576 | 237,218 | 2.9 | 15.4 |
| Procatalyst 27 | 120 | 408,986 | 218,699 | 4.3 | 24.5 |
| Procatalyst 27 | 150 | 228,304 | 202,030 | 4.6 | 15.8 |
| Procatalyst 13 | 120 | 190,487 | 503,488 | 6.8 | 12.2 |
| Procatalyst 13 | 150 | 252,115 | 299,269 | 4.5 | 11.7 |
| Procatalyst 14 | 120 | 95,243 | 195,944 | 4.2 | 19.4 |
| Procatalyst 14 | 150 | 173,679 | 180,462 | 4.6 | 10.7 |
| Procatalyst 25 | 120 | 252,115 | 237,563 | 4.4 | 22 |
| Procatalyst 25 | 150 | 196,089 | 245,753 | 4.3 | 16.3 |
| Procatalyst 28 | 120 | 2,840,495 | 260,527 | 7.2 | 22.4 |
| Procatalyst 28 | 150 | 430,463 | 218,662 | 3.1 | 17.6 |
| Procatalyst 26 | 120 | 227,837 | 323,581 | 5 | 21.7 |
| Procatalyst 26 | 150 | 160,607 | 235,005 | 3.2 | 17.7 |
| Procatalyst 11 | 120 | 448,204 | 374,359 | 7.3 | 18.6 |
| Procatalyst 11 | 150 | 331,351 | 265,191 | 9.4 | 16.2 |
| Procatalyst 9 | 120 | 134,461 | 235,597 | 3.1 | 18.3 |
| Procatalyst 9 | 150 | 230,825 | 53,307 | 2.9 | 19.3 |
| Procatalyst 15 | 120 | 235,307 | 353,795 | 4.7 | 17.2 |
| Procatalyst 15 | 150 | 265,188 | 285,141 | 3.4 | 14.9 |
| Procatalyst 29 | 120 | 14,970 | 172,494 | 4.4 | 29.9 |

In Table 2, when the reaction temperature in the ethylene-octene semi-batch copolymerization is 120° C., there is 46.3 g ethylene; 302 g 1-octene; 612 g IsoparE; 1.2 eq. [HNMe(C$_{18}$H$_{37}$)$_2$][B(C$_6$F$_5$)$_4$]activator to catalyst; 10 μmol MMAO-3A; and 290 psi reactor pressure. When the reaction temperature in the ethylene-octene semi-batch copolymerization is 150° C., there is 43 g ethylene; 301 g 1-octene; 548 g IsoparE; 1.2 eq. [HNMe(C$_{18}$H$_{37}$)$_2$][B(C$_6$F$_5$)$_4$] activator to catalyst; 10 μmol MMAO-3A; and 327 psi reactor pressure.

TABLE 3

Chain Transfer Data

| Catalyst | DEZ (μmol) | Efficiency (gpoly/gM) | Mn (g/mol) | PDI | Mol % Octene |
|---|---|---|---|---|---|
| Procatalyst 1 | 0 | 70,592 | 95,211 | 2.7 | 10.2 |
| Procatalyst 1 | 50 | 53,224 | 41,733 | 3.4 | 5.4 |
| Procatalyst 1 | 200 | 48,182 | 23,919 | 5.1 | 2.9 |
| Procatalyst 2 | 0 | 211,933 | 29,731 | 3.2 | 7.6 |
| Procatalyst 2 | 50 | 181,970 | 22,086 | 2.8 | 3.8 |
| Procatalyst 2 | 200 | 188,547 | 13,928 | 3.1 | 3.0 |
| Procatalyst 16 | 0 | 41,459 | 77,436 | 4.2 | 16.8 |
| Procatalyst 16 | 50 | 19,609 | 21,228 | 4.2 | 16.5 |
| Procatalyst 16 | 200 | 15,687 | 8,683 | 5.2 | 17.3 |
| Procatalyst 21 | 0 | 38,367 | 38,376 | 4.4 | 14.4 |
| Procatalyst 21 | 50 | 30,694 | 20,034 | 3.8 | 11.9 |
| Procatalyst 21 | 200 | 32,886 | 6,639 | 3.3 | 14.7 |
| Procatalyst 23 | 0 | 40,619 | 78,442 | 3.7 | 16.0 |
| Procatalyst 23 | 50 | 32,215 | 18,373 | 4.3 | 15.7 |
| Procatalyst 23 | 200 | 28,013 | 6,084 | 4.1 | 16.2 |
| Procatalyst 17 | 0 | 17,905 | 3,792 | 20.0 | 13.3 |
| Procatalyst 17 | 50 | 12,332 | 2,558 | 27.9 | 11.9 |
| Procatalyst 17 | 200 | 11,181 | 2,404 | 9.8 | 15.5 |
| Procatalyst 8 | 0 | 38,367 | 39,675 | 3.6 | 15.3 |
| Procatalyst 8 | 50 | 32,241 | 22,147 | 3.5 | 15.0 |
| Procatalyst 8 | 200 | 27,405 | 9,455 | 4.3 | 14.0 |
| Procatalyst 7 | 0 | 26,892 | 46,136 | 3.1 | 17.8 |
| Procatalyst 7 | 50 | 22,410 | 19,556 | 3.8 | 17.6 |
| Procatalyst 7 | 200 | 20,169 | 8,338 | 4.7 | 17.1 |
| Procatalyst 22 | 0 | 16,808 | 74,574 | 3.8 | 10.3 |
| Procatalyst 22 | 50 | 11,205 | 14,173 | 3.9 | 9.7 |
| Procatalyst 22 | 200 | 11,205 | 3,376 | 4.1 | 10.7 |
| Procatalyst 23 | 0 | 16,443 | 25,908 | 10.4 | 7.5 |
| Procatalyst 23 | 50 | 12,332 | 11,731 | 6.0 | 7.1 |
| Procatalyst 23 | 200 | 12,058 | 2,641 | 9.9 | 10.3 |
| Procatalyst 18 | 0 | 59,761 | 103,654 | 2.6 | 18.4 |
| Procatalyst 18 | 50 | 44,820 | 32,774 | 3.3 | 14.0 |
| Procatalyst 18 | 200 | 32,993 | 11,023 | 3.4 | 12.4 |
| Procatalyst 4 | 0 | 118,755 | 11,030 | 6.6 | 11.5 |
| Procatalyst 4 | 50 | 85,504 | 9,065 | 5.5 | 11.0 |
| Procatalyst 4 | 200 | 81,119 | 6,486 | 4.6 | 10.2 |
| Procatalyst 3 | 0 | 117,280 | 98,994 | 3.2 | 17.5 |
| Procatalyst 3 | 50 | 46,501 | 35,314 | 3.4 | 13.6 |
| Procatalyst 3 | 200 | 48,182 | 23,342 | 3.3 | 15.6 |
| Procatalyst 24 | 0 | 51,544 | 109,108 | 3.2 | 18.8 |
| Procatalyst 24 | 50 | 42,783 | 40,004 | 4.4 | 17.1 |
| Procatalyst 24 | 200 | 22,037 | 10,192 | 5.1 | 17.8 |
| Procatalyst 6 | 0 | 59,926 | 28,071 | 3.4 | 12.6 |
| Procatalyst 6 | 50 | 52,618 | 22,765 | 4.1 | 7.9 |
| Procatalyst 6 | 200 | 43,848 | 12,370 | 5.3 | 10.3 |
| Procatalyst 12 | 0 | 42,783 | 62,249 | 3.1 | 18.8 |
| Procatalyst 12 | 50 | 29,880 | 30,494 | 3.6 | 16.8 |
| Procatalyst 12 | 200 | 24,058 | 13,357 | 4.1 | 16.0 |
| Procatalyst 10 | 0 | 95,243 | 115,523 | 2.7 | 14.3 |
| Procatalyst 10 | 50 | 44,820 | 33,252 | 3.7 | 9.4 |
| Procatalyst 10 | 200 | 39,840 | 10,471 | 5.9 | 9.6 |
| Procatalyst 27 | 0 | 52,291 | 94,394 | 3.0 | 20.3 |
| Procatalyst 27 | 50 | 31,748 | 25,569 | 3.5 | 17.9 |
| Procatalyst 27 | 200 | 18,675 | 7,272 | 3.7 | 18.2 |
| Procatalyst 13 | 0 | 67,231 | 135,866 | 3.1 | 11.8 |
| Procatalyst 13 | 50 | 30,814 | 24,863 | 4.7 | 9.0 |
| Procatalyst 13 | 200 | 26,145 | 9,191 | 6.1 | 7.3 |
| Procatalyst 14 | 0 | 46,688 | 74,059 | 3.0 | 15.1 |
| Procatalyst 14 | 50 | 34,549 | 30,745 | 3.1 | 6.8 |
| Procatalyst 14 | 200 | 28,013 | 10,560 | 3.9 | 6.9 |
| Procatalyst 25 | 0 | 58,516 | 95,897 | 3.6 | 18.6 |
| Procatalyst 25 | 50 | 44,820 | 38,261 | 4.8 | 17.4 |
| Procatalyst 25 | 200 | 34,046 | 11,279 | 6.5 | 17.9 |
| Procatalyst 28 | 0 | 83,416 | 104,250 | 2.8 | 18.9 |
| Procatalyst 28 | 50 | 93,376 | 37,985 | 3.4 | 17.6 |
| Procatalyst 28 | 200 | 85,639 | 18,843 | 3.5 | 19.1 |
| Procatalyst 26 | 0 | 75,634 | 132,148 | 2.9 | 19.1 |
| Procatalyst 26 | 50 | 55,559 | 53,416 | 3.5 | 18.2 |
| Procatalyst 26 | 200 | 58,332 | 28,062 | 3.1 | 17.8 |
| Procatalyst 11 | 0 | 146,911 | 78,306 | 4.9 | 16.5 |
| Procatalyst 11 | 50 | 61,628 | 43,484 | 3.9 | 15.4 |
| Procatalyst 11 | 200 | 46,113 | 15,793 | 3.9 | 14.9 |
| Procatalyst 9 | 0 | 201,692 | 37,912 | 2.6 | 19.2 |
| Procatalyst 9 | 50 | 86,840 | 23,054 | 2.9 | 18.5 |
| Procatalyst 9 | 200 | 77,143 | 12,704 | 3.1 | 18.7 |
| Procatalyst 15 | 0 | 147,907 | 162,012 | 2.9 | 16.5 |
| Procatalyst 15 | 50 | 58,516 | 46,696 | 3.4 | 16.0 |
| Procatalyst 15 | 200 | 44,389 | 18,257 | 3.1 | 15.6 |

In Table 3, the reaction temperature was 120° C. for the ethylene-octene copolymerization data under chain transfer conditions for a series of pyrrole-heterocycle catalysts. The semi-batch reactor conditions include 11.3 g ethylene, 57 g 1-octene, 557 g IsoparE, 1.2 eq. [HNMe(C$_{18}$H$_{37}$)$_2$][B(C$_6$F$_5$)$_4$] activator to catalyst, 10 μmol MMAO-3A, 138 psi reactor pressure.

The invention claimed is:
1. A polymerization process comprising:
   polymerizing ethylene and one or more olefins in the presence of a catalyst system under olefin polymerization conditions to form an ethylene-based polymer, the catalyst system comprising a metal-ligand complex according to formula (I):

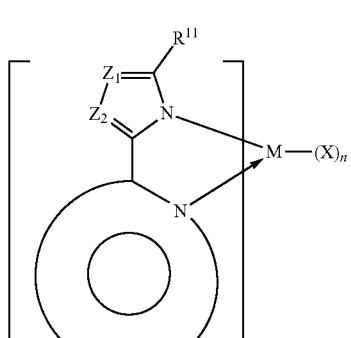

where:
   M is a metal chosen from titanium, zirconium, or hafnium, the metal having a formal oxidation state of +2, +3, or +4;
   each X is a monodentate or bidentate ligand independently chosen from unsaturated (C$_2$-C$_{20}$)hydrocarbon, unsaturated (C$_2$-C$_{50}$)heterohydrocarbon, (C$_1$-C$_{50}$)hydrocarbyl, (C$_6$-C$_{50}$)aryl, (C$_6$-C$_{50}$) heteroaryl, cyclopentadienyl, substituted cyclopentadienyl, (C$_4$-C$_{12}$)diene, halogen, —N(R$^N$)$_2$, and —NCOR$^C$;
   m is 1 or 2;
   n is 2 or 3;
   m+n=4;

each A is independently chosen from —C($R^{3a}$)C($R^{4a}$)C($R^{5a}$)C($R^{6a}$)—, —C($R^{3a}$)C($R^{4a}$)C($R^{5a}$)N—, —C($R^{3a}$)C($R^{4a}$)NC($R^{6a}$)—, —C($R^{3a}$)NC($R^{5a}$)C($R^{6a}$)—, —NC($R^{4a}$)C($R^{5a}$)C($R^{6a}$)— or —NC($R^{4a}$)NC($R^{6a}$)—, in which optionally $R^{3a}$ and $R^{4a}$, or $R^{4a}$ and $R^{5a}$, or $R^{5a}$ and $R^{6a}$ are covalently connected to form an aromatic ring or a non-aromatic ring, or —C($R^{3b}$)C($R^{4b}$)G- or -GC($R^{4c}$)C($R^{5c}$)—, wherein G is N($R^{3c}$), N($R^{5b}$), O or S, and optionally $R^{3b}$ and $R^{4b}$, or $R^{4c}$ and $R^{5c}$ are covalently connected to form an aromatic ring or a non-aromatic ring, and;

each $z_1$ is independently selected from N or C($R^1$);
each $z_2$ is independently selected from N or C($R^2$);
each $R^{11}$ is anthracene-9-yl substituted with $R^S$ or more than one $R^S$, wherein each $R^S$ is independently selected from ($C_1$-$C_{12}$)alkyl, ($C_6$-$C_{15}$)aryl, or ($C_3$-$C_{12}$)cycloalkyl;

each $R^1$, $R^2$, $R^{3a}$, $R^{3b}$, $R^{3c}$, $R^{4a}$, $R^{4b}$, $R^{4c}$, $R^{5a}$, $R^{5b}$, $R^{5c}$, and $R^{6a}$ is independently selected from the group consisting of ($C_1$-$C_{50}$) hydrocarbyl, ($C_1$-$C_{50}$) heterohydrocarbyl, ($C_6$-$C_{50}$) aryl, ($C_4$-$C_{50}$) heteroaryl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, —P(O)($R^P$)$_2$, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen, and —H, wherein each $R^N$, $R^C$, and $R^P$ is independently selected from the group consisting of ($C_1$-$C_{20}$)hydrocarbyl, ($C_1$-$C_{20}$)heterohydrocarbyl, and —H;

when $z_1$ is C($R^1$), $R^1$ and $R^{11}$ are not linked to form an aromatic ring or a non-aromatic ring:

when $z_2$ is C($R^1$) and $z_2$ is C($R^2$), $R^1$ and $R^2$ are optionally linked to form an aromatic ring or a non-aromatic ring:

provided that:
when $z_1$ is CR$^1$ and $z_2$ is CR$^2$, where $R^1$ and $R^2$ are not covalently connected to form an aromatic ring or a non-aromatic ring, m is 1 and n is 3.

2. The polymerization process of claim 1, wherein A is —C($R^{3a}$)C($R^{4a}$)C($R^{5a}$)C($R^{6a}$)—, in which optionally $R^{3a}$ and $R^{4a}$, or $R^{4a}$ and $R^{5a}$, or $R^{5a}$ and $R^{6a}$ are covalently connected to form an aromatic ring or a non-aromatic ring, and the metal-ligand catalyst has a structure according to formula (II):

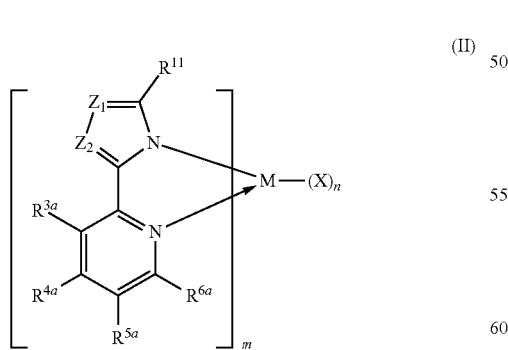

(II)

where each $z_1$, $z_2$, $R^{11}$, $R^{3a}$, $R^{4a}$, $R^{5a}$, $R^{6a}$, X, n, m, and M are defined as in formula (I).

3. The polymerization process of claim 1, wherein A is -GC($R^{4c}$)C($R^{5c}$)— in which G is N($R^{3c}$), and optionally $R^{4c}$ and $R^{5c}$ are covalently connected to form an aromatic ring or a non-aromatic ring, and the metal-ligand catalyst has a structure according to formula (III):

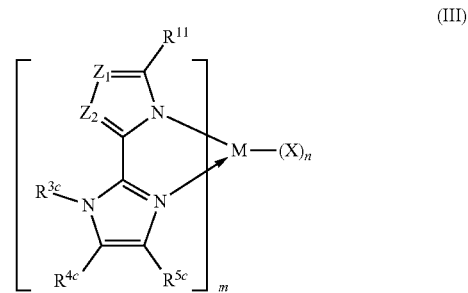

(III)

where each $z_1$, $z_2$, $R^{11}$, $R^{3c}$, $R^{4c}$, $R^{5c}$, X, n, m, and M are defined as in formula (I).

4. The polymerization process of claim 1, wherein A is —C($R^{3b}$)C($R^{4b}$)G- in which G is N($R^{5b}$), and optionally $R^{3b}$ and $R^{4b}$ are covalently connected to form an aromatic ring or a non-aromatic ring, and the metal-ligand catalyst has a structure according to formula (IV):

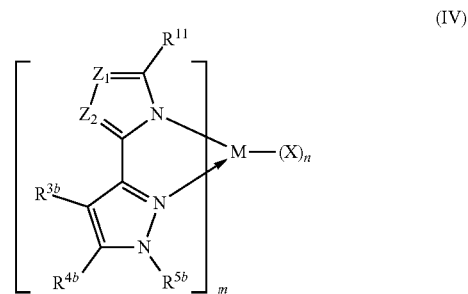

(IV)

where each $z_1$, $z_2$, $R^{11}$, $R^{3b}$, $R^{4b}$, $R^{5b}$, X, n, m, and M are defined as in formula (I).

5. The polymerization process of claim 1, wherein A is -GC($R^{4c}$)C($R^{5c}$)— in which G is S, and optionally $R^{4c}$ and $R^{5c}$ are covalently connected to form an aromatic ring or a non-aromatic ring, and the metal-ligand catalyst has a structure according to formula (V):

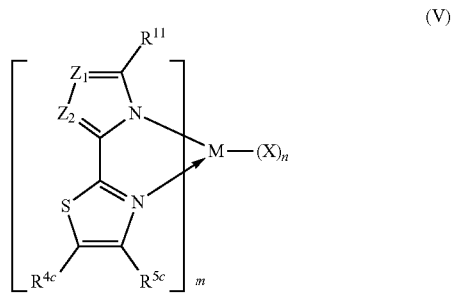

(V)

where each $z_1$, $z_2$, $R^{11}$, $R^{4c}$, $R^{5c}$, X, n, m, and M are defined as in formula (I).

6. The polymerization process of claim 1, wherein m is 1.
7. The polymerization process of claim 1, wherein $z_1$ is N.
8. The polymerization process of claim 1, wherein X is benzyl, phenyl, or chloro.
9. The polymerization process of claim 1, wherein $R^{11}$ is a radical of formula (VI):

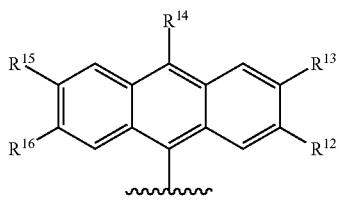
(VI)

wherein $R^{12}$, $R^{13}$, $R^{14}$, $R^{15}$, and $R^{16}$ is chosen from $(C_1\text{-}C_{10})$alkyl, $(C_6\text{-}C_{10})$aryl, or —H.

10. The polymerization process of claim 9, wherein $R^{12}$, $R^{13}$, $R^{14}$, $R^{15}$, and $R^{16}$ is chosen from tert-butyl, 3,5-di-tert-butylphenyl, or —H.

11. The polymerization process of claim 1, wherein $z_2$ is N.

12. The polymerization process of claim 1, wherein when $z_2$ is N and $z_1$ is $CR^1$, $R^1$ and $R^{11}$ are not covalently connected to form an aromatic or non-aromatic ring.

13. The polymerization process of claim 1, wherein the metal-ligand complex is selected from:

Procatalyst 1
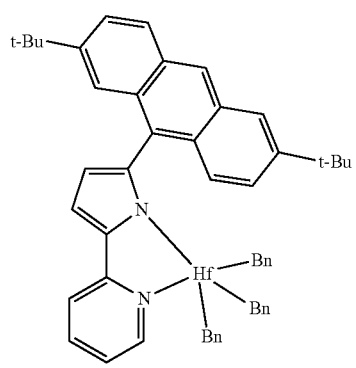

Procatalyst 2
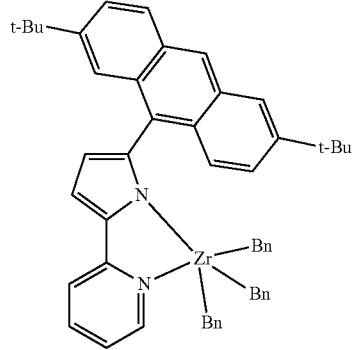

Procatalyst 3
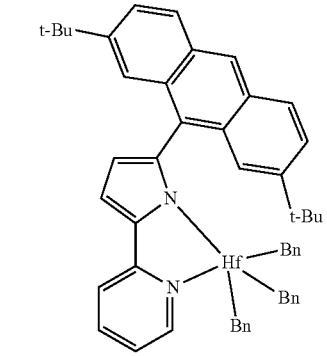

-continued

Procatalyst 4
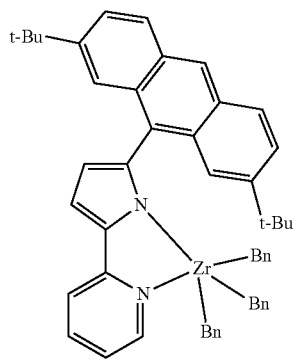

Procatalyst 5
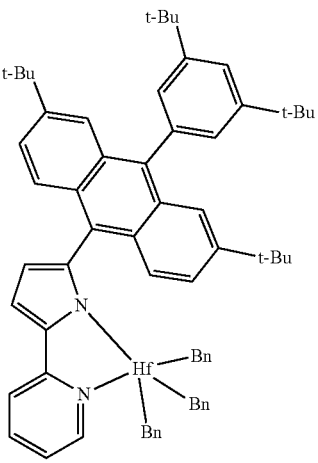

Procatalyst 6
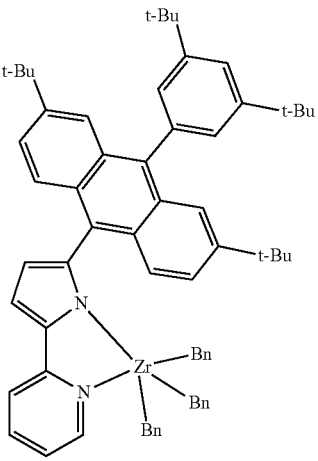

Procatalyst 7
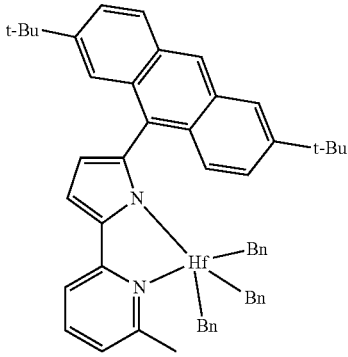

Procatalyst 8
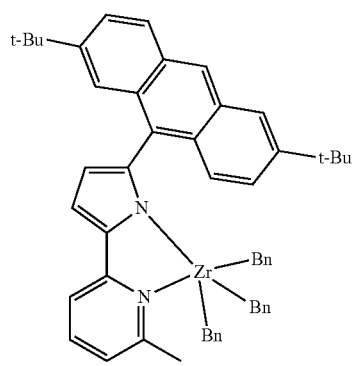
Procatalyst 9
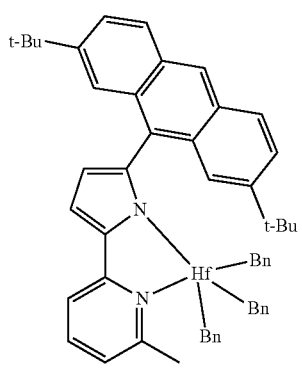
Procatalyst 10
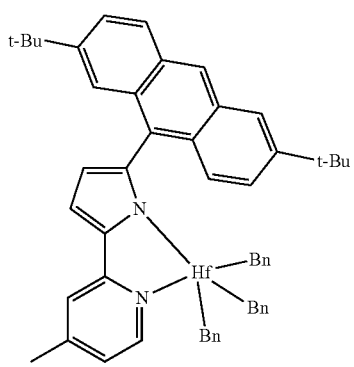
Procatalyst 11
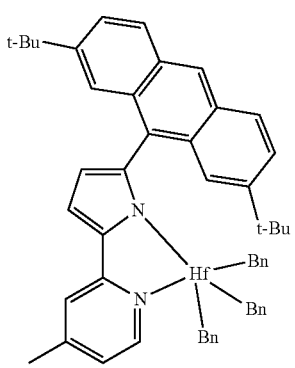
Procatalyst 12
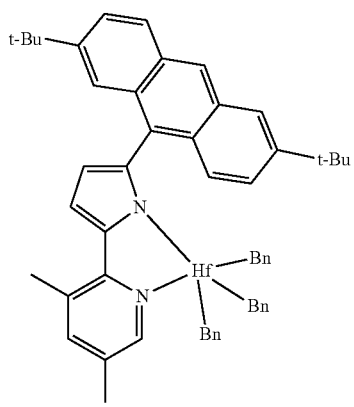
Procatalyst 13
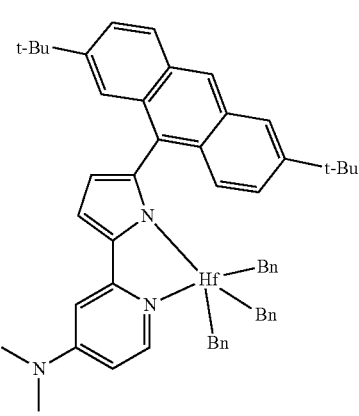
Procatalyst 14
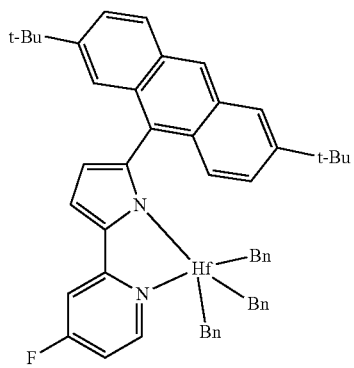
Procatalyst 15
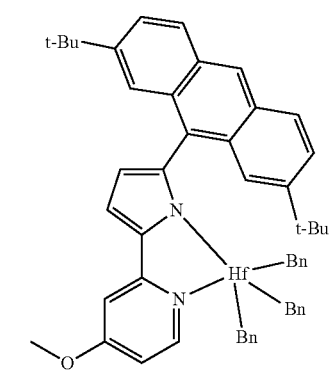

Procatalyst 16
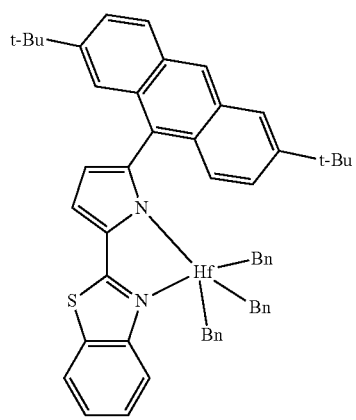
Procatalyst 17
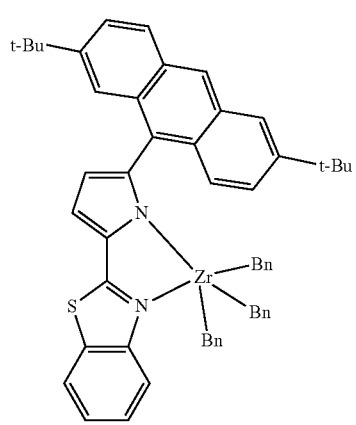
Procatalyst 18
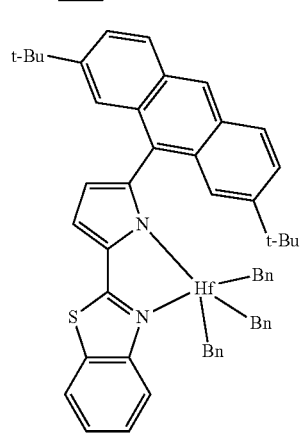
Procatalyst 19
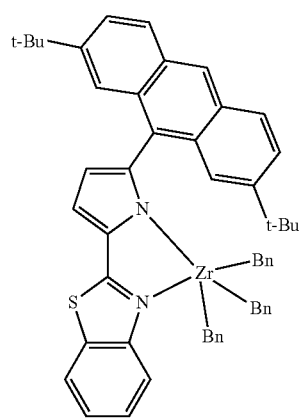
Procatalyst 20
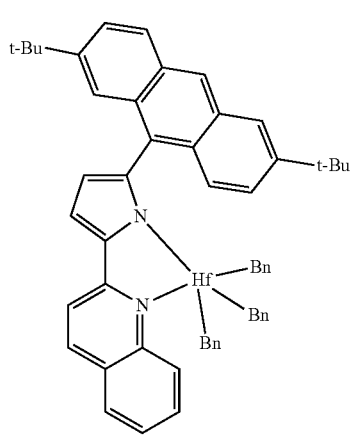
Procatalyst 21
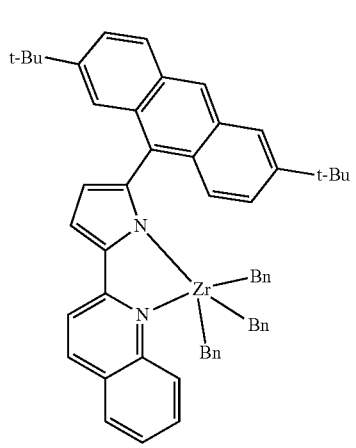
Procatalyst 22
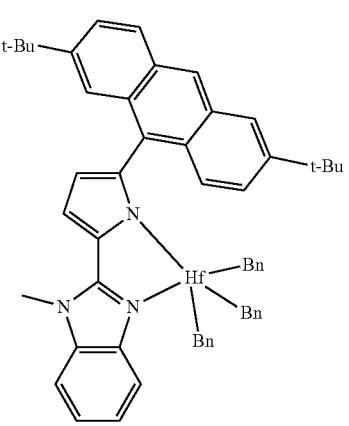

-continued
Procatalyst 23
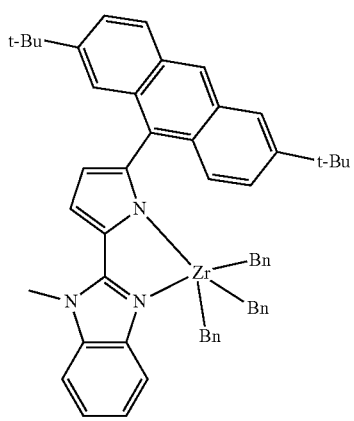
Procatalyst 24
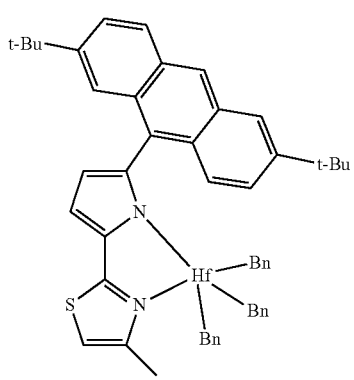
Procatalyst 25
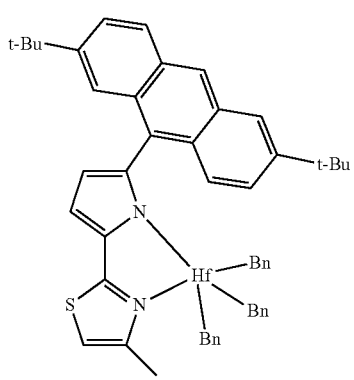
-continued
Procatalyst 26
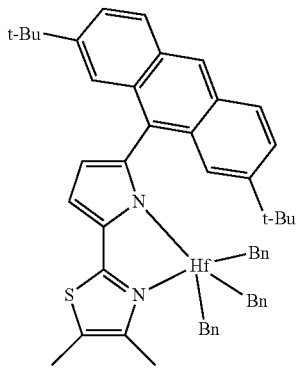
Procatalyst 27
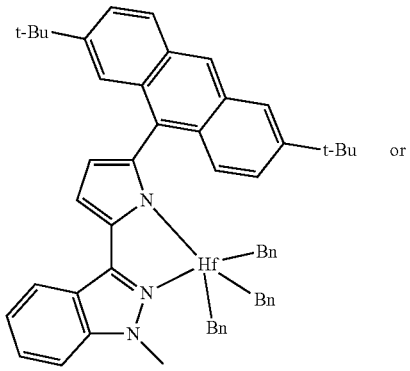 or
Procatalyst 28
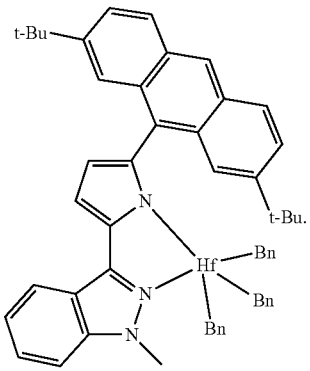
* * * * *